(12) United States Patent
Vanneste et al.

(10) Patent No.: US 12,440,957 B2
(45) Date of Patent: Oct. 14, 2025

(54) MECHANISM FOR POSITIONING A MEASURING INSTRUMENT ON A WALL OR SURFACE

(71) Applicant: CSPECT, BESLOTEN VENNOOTSCHAP, Ostend (BE)

(72) Inventors: Hendrik Vanneste, Bruges (BE); Jurgen Moerman, Jabbeke (BE)

(73) Assignee: CSPECT, BESLOTEN VENNOOTSCHAP, Ostend (BE)

( * ) Notice: Subject to any disclaimer, the term of this patent is extended or adjusted under 35 U.S.C. 154(b) by 273 days.

(21) Appl. No.: 18/270,899

(22) PCT Filed: Dec. 14, 2021

(86) PCT No.: PCT/IB2021/061681
§ 371 (c)(1),
(2) Date: Jul. 5, 2023

(87) PCT Pub. No.: WO2022/149025
PCT Pub. Date: Jul. 14, 2022

(65) Prior Publication Data
US 2024/0051113 A1 Feb. 15, 2024

(30) Foreign Application Priority Data
Jan. 7, 2021 (BE) .................. 2021/5011

(51) Int. Cl.
*B25H 1/10* (2006.01)
*B25H 1/00* (2006.01)
*G01B 21/08* (2006.01)
*G01N 29/04* (2006.01)
*G01N 29/22* (2006.01)

(52) U.S. Cl.
CPC ............. *B25H 1/10* (2013.01); *B25H 1/0035* (2013.01); *G01B 21/08* (2013.01); *G01N 29/043* (2013.01); *G01N 29/226* (2013.01); *G01N 2291/0289* (2013.01); *G01N 2291/267* (2013.01)

(58) Field of Classification Search
CPC ........ B25H 1/10; B25H 1/0035; G01B 21/08; G01N 29/043; G01N 29/226; G01N 2291/0289; G01N 2291/267
See application file for complete search history.

(56) References Cited

U.S. PATENT DOCUMENTS 11,673,272 B2 * 6/2023 Loosararian ........... G01C 21/12
73/865.8

FOREIGN PATENT DOCUMENTS

EP 1428972 A2 6/2004

OTHER PUBLICATIONS

International Search Report and Written Opinion dated Apr. 4, 2022 pertaining to PCT application No. PCT/IB2021/061681 filed Dec. 14, 2021, pp. 1-11.

* cited by examiner

*Primary Examiner* — Tarun Sinha
(74) *Attorney, Agent, or Firm* — Dinsmore & Shohl LLP

(57) ABSTRACT

A mechanism for positioning at least two tools on a surface, which includes: a first body that is provided with a support section (3); driving means for moving the tools; and, control means for controlling the driving means and the tools, which are such that the tools can be brought with the driving means alternately with a tangent plane on their relevant machining surface or their relevant measuring surface adjoiningly against the surface against which the mechanism is supported.

20 Claims, 33 Drawing Sheets

MECHANISM FOR POSITIONING A MEASURING INSTRUMENT ON A WALL OR SURFACE

CROSS-REFERENCE TO RELATED APPLICATIONS

The present application is the National Phase entry of International Patent Application No. PCT/IB2021/061681 filed Dec. 14, 2021, which claims priority to Belgium Patent Application No. 2021/5011 filed Jan. 7, 2021, the entire contents of which are hereby incorporated by reference into this application.

TECHNICAL FIELD

First and foremost, the present disclosure relates to a mechanism for positioning tools, such as an implement or a measuring instrument, on a wall or surface.

Both the indication "implement" and "measuring instrument" need to be conceived very broadly here and it may concern all kinds of tools with which a task, an operation or inspection can be performed.

The surface or wall can also relate to the most diverse sections of objects, buildings, vehicles, constructions, pipelines, rock formations, sculptures and the like.

The present disclosure also relates to a device for detecting and/or performing measurements and/or operations at a relatively large distance or height containing such mechanism.

More specifically, the present disclose relates to such mechanism that is or can be controlled by control means.

In a typical embodiment, a mechanism and a device according to the present disclose are intended for measuring wall thicknesses, for performing ultrasound inspections of welded joints, for measuring thicknesses of layers of paint or the like, but according to the present disclose it is not excluded to realise such mechanism or such device according to the present disclose differently for use in other applications, for example for photographing, for performing visual close-up inspections or for measuring other parameters of wall sections or sections of a surface, for inspecting walls of pipelines or for performing totally different operations and the like.

Without limiting the present disclose to this, a mechanism or a device according to the present disclose is suitable for performing measurements or operations on walls, such as walls of storage tanks in the chemical industry or walls of ships, for example of cargo holds of cargo ships, or for performing measurements or operations on pipelines, but the present disclose is not limited to this application.

BACKGROUND

Devices are already known, such as drones and telescopic posts, which are provided with one or more implements and/or measuring instruments and with which a measurement of a thickness or another operation on a wall can be performed and this at a greater distance from a user, more specifically in locations that are not directly accessible by the user.

A problem that occurs with such known devices is that for correctly performing a measurement and/or for correctly treating or machining a certain section of a wall, typically several actions are best performed.

For example, when measuring a wall thickness or performing an ultrasound inspection of a welded joint with an ultrasound sensor, typically the surface where the measurement needs to be performed has to be even and clean, whereby for example impurities such as rust and old paint first need to be removed to realise a good contact between the ultrasound sensor and the wall or surface.

Removing the impurities can for example be performed by a sanding or grinding operation using a sanding implement or grinding implement.

In other applications it may be necessary to perform different consecutive operations or different measurements.

Performing a preparatory operation before performing a measurement or consecutive measurements or operations is simple in locations that are easily accessible and visible by a user.

However, things are totally different when such consecutive operations and/or measurements need to be performed at a greater distance from the user, which as a rule definitely cannot be reached with one's hands and which may not even be visible for the user.

The difficulty herein lies in ensuring that implements and/or measuring instruments can be interchanged, whereby it is necessary to ensure that the relevant implements and/or measuring instruments after switching can operate in exactly the same section of the wall or surface.

It is understood that when the operations or measurements need to be performed at a great distance from the user, the smallest position change when switching implements and measuring equipment results in errors or makes the whole operation pointless or impossible.

According to the current state of the art no good solution has yet been offered for this problem.

Document EP 1.428.972 for example describes a tool for drilling purposes which is not very relevant in the present context in that no different operations have to be executed on the same section of a wall or surface.

The purpose of the present disclosure is therefore to provide a solution to one or several of the aforementioned and/or possible other disadvantages.

SUMMARY

More specifically the present disclosure aims to provide a mechanism that is provided with two or more tools in the form of an implement or measuring instrument, with which a composed task includes several consecutive operations and/or measurements can be performed, whereby the mechanism allows the tools to be interchanged and whereby it is ensured that the tools to be switched when performing the composed task operate on one and the same section of a surface.

Another purpose of the present disclosure includes in providing such mechanism which can be controlled from a great distance and/or which completely automatically performs different actions and switches tools.

Yet another purpose of the present disclosure includes providing a mechanism that is relatively simple, works very accurately and has a relatively small weight.

Yet another additional purpose of the present disclosure includes providing a mechanism which can in a simple manner, in some embodiments detachably, be attached to a device for performing measurements and/or operations at a relatively large distance or height.

To this end, the present disclosure relates primarily to a controlled or controllable mechanism for positioning two or several tools, for example in the form of an implement or a measuring instrument, on a wall or surface, whereby the mechanism comprises at least the following elements:

a first body comprising a support section with which the mechanism can support and/or drive on a surface or wall;

at least two tools, which each have a machining surface or a measuring surface, which are movably arranged relative to the first body and the support section; and, driving means for moving the tools relative to the support section and the first body;

wherein the at least two tools are movably arranged relative to the first body and the support section in such a way that a movement of the tools relative to the support section, allows a tangent plane on the relevant machining surface or the relevant measuring surface, hereinafter referred to as the extended operating surface of the tool, to be brought adjoiningly against the wall or surface against which the mechanism supports;

wherein the mechanism further comprises control means for controlling the driving means and the tools, which are such that, when the mechanism supports itself with the support section in a fixed position on the wall or surface, by means of the driving means tools of the mechanism can be or are brought with the aforementioned tangent plane alternately on their relevant machining surface or their relevant measuring surface, adjoiningly against the wall or surface against which the mechanism supports, whereby the relevant tools are alternately centred on a same surface section of the wall or surface which is located at a fixed distance from the support section and whereby the tools alternately operate on the surface section.

An aspect of such mechanism according to the present disclosure is that alternately performing an operation or measurement on a surface section which is located at a fixed distance from the at least one support wheel of the mechanism, can be performed very accurately and that in addition the relevant tools are centred on the relevant surface section.

Consequently there is no or barely any danger of measurements, operations or inspections being performed carelessly which for example could occur due to problems when focusing on a same surface section when switching tools, which forms a problem with the means currently known in accordance with the state of the art.

The at least one support wheel of the mechanism plays a key role hereby, whereby the tools are always positioned relative to the location with which the support wheel supports on a wall or surface, such that it can be ensured that operations and measurements with the tools are performed in the same place.

Another aspect a mechanism according to the present disclosure is that it is provided with one or more such support wheels, such that for positioning the mechanism on a surface or wall to find support thereon the relevant support wheels can easily be brought into the right position by driving and/or gliding.

In some embodiments of a mechanism according to the present disclosure, the tools are movably arranged relative to the first body using an assembly of movable elements that has at least two degrees of freedom and the driving means have at least two degrees of freedom for driving the movable elements.

Such embodiment of a mechanism according to the present disclosure allows, in a simple manner, at least two tools to be controlled independently from each other with the driving means by having the driving means engage on the assembly of movable elements with two degrees of freedom which in turn engages on the tools.

Thus, a robust performance of the mechanism can be realised.

However, in another embodiment of a mechanism according to the present disclosure it is not excluded to have sections of the driving means act directly on one or more of the tools.

In some embodiments of a mechanism according to the present disclosure the support section of the first body has one of the following forms:

a) the support section comprises at least one support wheel which is rotatably mounted around a central shaft in the first body;

b) the support section comprises a pair of support wheels which are rotatably mounted around a central shaft in the first body;

c) the support section comprises a first pair of support wheels and an additional support wheel;

d) the support section comprises two pairs of support wheels which are mounted rotatably at a distance from each other on the first body;

e) the support section is formed by a sole or foot which is fixedly or mounted movably on the first section; or, f) the support section is formed by a section with a support or support point.

The embodiments whereby the support section is provided with one or more support wheels have the aspect that the mechanism can easily drive over the wall or surface up into in a desired position.

But then the embodiments of mechanisms according to the present disclosure whereby the support section forms a foot, sole or support point have the aspect that the mechanism can easily be held in a desired position, whereby there is less danger that the mechanism displaces itself during operation thereof.

The foot, sole or the support point can hereby for example be hingedly mounted on the first body, such that they can lock or orientate themselves relative to the wall or surface, for example into a position adjacent to the wall or surface to be able to support on it with a flat section of the support section or reversely into a position that is perpendicular or practically perpendicular to the wall or surface to support on it with a sharp tip.

In another embodiment of a mechanism according to the present disclosure the mechanism comprises a second body that is movable relative to the first body and the support section and the driving means comprise first driving means for moving the second body relative to the first body and the support section.

In some embodiments, such second body is part of the aforementioned assembly of elements that has at least two degrees of freedom.

In this way tools which in one or another way, either directly, or indirectly, are connected with the second body or mounted thereon, can be easily controlled using the first driving means.

In some embodiments, the second body of the mechanism is rotatably attached around a shaft in the first body, but in some embodiments the second body of the mechanism is movable up and down or reciprocatingly according to a linear movement in the first body of the mechanism.

Depending on the desired method of moving the relevant tools upon interchanging the tools between an operational position and a non-operational position, a rotating motion or a linear movement between the second body and the first body can be chosen.

In some embodiments, according to the present disclosure it is not excluded to choose a more complicated movement which is a combination of a linear movement and a rotating movement.

In some embodiments of a mechanism according to the present disclosure, the second body of the mechanism is rotatable around the central shaft of the at least one support wheel.

Such embodiment is very interesting, because it allows the second body to orientate relative to the at least one support wheel of the mechanism.

In this way there is a reasonably direct connection between the location on which the mechanism supports on a surface or wall with the at least one support wheel and the movements of tools which are directly or indirectly connected with the second body, the connection being usable by the control means for controlling the movements of the tools using the driving means.

In some embodiments a mechanism according to the present disclosure which can be interesting, all tools of the mechanism are mounted movably reciprocatingly or up and down in the second body of the mechanism and the tools are directly moved by second driving means.

Thus a system with two degrees of freedom is obtained using very few elements.

On the one hand there is a first possible independent movement of the second body relative to the first body which can be controlled by the first driving means and on the other hand a second possible independent movement of the tools in the second body which is directly controlled by the second driving means.

In some embodiments of a mechanism according to the present disclosure the mechanism comprises a third body that is movable relative to the first body and the driving means comprise second driving means for moving the third body relative to the first body.

In some embodiments, the third body is hereby part of the assembly of elements that has at least two degrees of freedom.

The third body hereby ensures an additional element with which the tools which are directly or indirectly connected to it can be controlled by controlling the second driving means with the control means.

This contributes to a robust and precise execution of the mechanism.

In some embodiments a mechanism according to the present disclosure, at least one tool is fixedly mounted on the third body.

In this way a movement of the at least one tool relative to the support body can be controlled by controlling the movement of the third body.

In some embodiments of a mechanism according to the present disclosure the third body is mounted movably on the second body, such that the relevant at least one tool can be oriented or positioned relative to the first body by a combination of the movements of the second body and the third body and the second driving means move the third body relative to the second body and thus also indirectly relative to the first body.

In this embodiment the conditions are such that there are clearly two degrees of freedom for the positioning and orientation of the at least one tool that is fixedly mounted on the third body.

Indeed, a first degree of freedom includes moving the second body relative to the first body and/or the support section using the first driving means and a second degree of freedom includes moving the third body relative to the second body using the second driving means.

In some embodiments of a mechanism according to the present disclosure all tools of the mechanism are fixedly mounted on the third body, such that every relevant tool can be oriented or positioned relative to the first body by a combination of the movements of the second body and the third body and whereby the second driving means move the third body relative to the second body and thus also indirectly relative to the first body.

This embodiment of a mechanism according to the present disclosure is special because the principle behind it includes that changing the different tools can be realised by displacing and/or orienting the relevant tools over the third body using the second driving means and that a movement of the second body relative to the first body serves to position the tools in a position away from the surface or wall on which the operation or measurement needs to be performed, to allow switching tools with the second driving means, and toward the surface or wall to perform the operation or measurement with the relevant tool after the switch.

In some embodiments of a mechanism according to the present disclosure, the third body is rotatably attached around a rotation shaft to the second body and whereby in in some embodiments of a mechanism according to the present disclosure the third body is attached movably up and down or reciprocatingly to the second body.

It is understood that these simple ways in which the third body is attached to the second body contribute to an easier control of the tools to switch them for an operation or measurement on the level of the relevant surface section of the wall or surface on which the mechanism supports.

However, according to the present disclosure it is not excluded to attach the third body to the second body differently thus allowing a different movement than a mere linear or rotating movement.

In some embodiments of a mechanism according to the present disclosure, all tools of the mechanism are mounted movably reciprocatingly or up and down in the third body of the mechanism.

As will become clearer further down in the text based on figures, this also allows the tools to move in an efficient way between an operational position and a non-operational position for performing an operation or measurement by a movement of the tools in the third body, for example supporting directly on a profile of the second body, whereby the movement of the tools in the third body in essence is not controlled by the second driving means which only move the third body.

In yet another embodiment of a mechanism according to the present disclosure, at least one tool is fixedly mounted on the second body, such that it can only be oriented or positioned by movement of the second body.

The purpose of this embodiment is that the second body can move relative to the first body in such a way that the relevant tool can always be positioned with its extended operating surface against the surface or wall.

To this end, in some embodiments, the second body of the mechanism can be mounted rotatably around the central shaft of the at least one support wheel and in addition it can be ensured that a tangent plane on the relevant machining surface or the relevant measuring surface of the tool is tangent to the at least one support wheel of the mechanism, whereby the tangent plane is called the extended operating surface of the relevant tool.

The combination of these characteristics ensures that by rotating the second body around the central shaft of the at least one support wheel the extended operating surface of the tool can be brought adjoiningly up against the surface or wall, regardless of the orientation of the surface or wall relative to the support wheel, as the wall or surface is also tangent to the at least one support wheel, because the mechanism is supported by the at least one support wheel on the surface or wall.

In this embodiment, the correct positioning and/or orienting of a first tool on the surface or wall is thus very simple.

In some embodiments of a mechanism according to the present disclosure, the third body is rotatably attached around a rotation shaft to the second body and the rotation shaft is parallel to the central shaft of the at least one support wheel of the mechanism.

Moreover, in this embodiment of the mechanism two or several tools are consecutively and fixedly provided on the third body, whereby all of the tools have a machining surface or a measuring surface which on the level of a tangent is tangential to one and the same cylinder surface which has the aforementioned rotation shaft of the second body as its central shaft.

The tangents of consecutive tools hereby each form a wedge with a certain top angle with the rotation shaft or central shaft.

A first aspect of such mechanism according to the present disclosure includes that it is constructed from three rotating components, relative to each other, which are very simple to control and whereby thus the tools which are mounted on the third body have a sufficient range of movement relative to the first body and the support section to be able to make the necessary movements with it for interchanging the position thereof and to be able to carry out measurements and operations.

Yet another aspect of such mechanism according to the present disclosure is that the tools each have a measuring or machining surface which on the level of a tangent or tangent plane is tangential to one and the same cylinder surface that has the rotation shaft of the second body as central shaft, whereby the tangents or tangent planes form a wedge with a certain top angle with the central shaft.

Consequently, through a simple rotation of the third body around the central shaft or hinge shaft over an angle which corresponds with the top angle or a plurality thereof the position first taken by a first tool, can later be assumed by a second tool and vice versa.

In another embodiment of a mechanism according to the present disclosure, the third body is executed as a revolver on which several tools are fixedly provided, whereby each tool has a machining surface or a measuring surface which on the level of a point of tangency is tangent to one and the same base of a conus, whereby moreover the rotation shaft of the second body forms the central shaft of the conus and whereby the points of tangency are arranged rotationally symmetrical around the rotation shaft, whereby the relevant rotational symmetry is of a certain order and the order is equal to the number of tools mounted on the revolver.

In this embodiment it is also possible to change the position of the tools on the third body relative to each other by a simple rotation of the third body over an angle corresponding with the rotational symmetry of the arrangement.

For a better understanding, the arrangement of the tools on the revolver can be compared to the arrangement of lens objectives on a revolver of a microscope.

In some embodiments a mechanism according to the present disclosure, the second driving means can therefore additionally place the third body in different positions which are rotated over a fixed angle or a plurality thereof relative to each other, whereby the fixed angle corresponds with the top angle or with an angle of the rotational symmetry equal to a full revolution divided by the order of the rotational symmetry.

In some embodiments, in every position one of the tools is always positioned in such a way that a tangent plane on the measuring or machining surface of the relevant tool, hereinafter referred to as the extended operating surface of the tool, also extends tangentially to at least one support wheel.

In addition to the already aforementioned aspects that the tools can be switched by a simple rotation, this embodiment of a mechanism according to the present disclosure has the important aspect that in a first position and a second position a tangent plane on the measuring or machining surface of a first tool, respectively a second tool, always extends tangentially to the at least one support wheel.

The second body of the mechanism is hereby rotatable relative to the first body and the support section of the mechanism and more specifically around the central shaft of the at least one support wheel.

Consequently, when the third body is positioned in such first position or in such second position relative to the second body and thereafter the second body undergoes a rotation around the central shaft of the at least one support wheel relative to the first body and the support section of the mechanism, regardless of the size of the angle rotation, the aforementioned tangent plane on the measuring or machining surface of the first tool, respectively the second tool, always tangentially extends to the at least one support wheel.

The big aspect of this is that flat walls or surfaces against which the mechanism supports with the at least one support wheel also tangentially extend to the at least one support wheel, such that by the aforementioned rotation of the second body relative to the first body or the support section, the tangent plane on the measuring or machining surface of the first tool, or the second tool, can always be brought fittingly against such flat wall or surface, when the third body is positioned in the first position or the second position respectively.

This is the purpose when a quality operation or measurement is the objective.

In some embodiments of a mechanism according to the present disclosure, the first driving means can moreover rotate the second body over an angle relative to the first body and the support section into a random position between a minimum angle position and a maximum angle position.

The big aspect of such embodiment of a mechanism according to the present disclosure follows from the aforementioned properties of the mechanism.

More specifically with the first driving means a tangent plane on the measuring or machining surface of the tools can thus be brought adjoiningly against a wall or surface, against which the mechanism supports with the at least one support wheel, such that the measurement or operation can be performed correctly, at least to the extent that the wall or surface which is tangent to the at least one support wheel, forms an angle with the first body or support section which lies within the scope between the minimum angle position and the maximum angle position within which the second body is rotatable relative to the first body or the support section.

In some embodiments of a mechanism according to the present disclosure, the mechanism comprises a first tool which is a grinding implement or a sanding implement with a cylindrical machining surface and the mechanism furthermore comprises a second tool which is a sensor for measuring a thickness or for performing an ultrasound inspection which has a flat measuring surface.

With a mechanism according to the present disclosure in such embodiment, the sanding implement or the grinding implement can be used at a location or on a section of a wall or surface for a sanding operation or grinding operation by way of preparatory operation, for example with the intention of removing impurities, and thereafter in the same place or on the same section of the wall or surface, a measurement of the thickness of the wall or an ultrasound inspection of a welded joint with the sensor can be performed.

As already stated, the present disclosure also relates to a device for detecting and/or performing measurements and/or operations at a relatively large distance or height containing such mechanism.

The distances and heights relative to the user of such device to which the present disclosure relates, can range from in excess of 2 m, to more than 10 m and can certainly also amount to more than 20 m.

The purpose of a device according to the present disclosure can for example be to check the presence or absence of certain things, phenomena, parameters or circumstances at the referred to distance or height, by performing a detection or measurement, for example using one or more sensors.

In other cases or additionally, a device according to the present disclosure can be used to actually measure the size of certain parameters, such as physical, chemical, mechanical or other parameters, with one or other measuring instrument.

The mechanism according to the present disclosure that is part of the device hereby ensures that one or more preparatory operations can be performed before performing the actual detection or measurement, whereby the mechanism ensures that the preparatory operation and the measurement or detection are performed in the same place or on the same section.

In still other cases or additionally, a device according to the present disclosure can be used to effectively intervene in the environment by performing certain composed operations, for example by consecutively using two or several different implements.

In all this, the great distance or height between the user and the location where a measurement and/or an operation need to be performed forms a big difficulty again.

Such device according to the present disclosure can for example typically be used for performing inspections of cargo spaces, but can also be applied in many other domains, such as for example for inspecting storage tanks, for example in the chemical industry or in other branches of industry or agriculture, for inspecting silos for storage of all kinds of bulk goods, for measuring or inspecting pipelines and the like.

To this end, the present disclosure also relates to a device for detecting and/or performing measurements and/or operations at a relatively large distance or height, whereby the device comprises an oblong, telescopic section whereby at the free end of the telescopic section a head is provided which is executed as, executed with or is provided with a mechanism according to one or more of the previous claims.

The aspects of such device according to the present disclosure include that a composed action including a prior operation which was followed up by a measurement or which includes several measurements or operations, can be correctly performed on a chosen surface section of a wall or surface.

In some embodiments of a device according to the present disclosure, first a grinding operation or sanding operation can be performed with the device on a section of a wall for removing impurities, such as rust and/or old paint, and afterwards a wall thickness measurement or an ultrasound inspection of a welded joint can be performed on the cleaned section, whereby to this end a first tool of the mechanism of the device is a grinding implement or sanding implement with a cylindrical machining surface and whereby a second tool is a sensor for measuring a thickness or for performing an ultrasound analysis which has a flat measuring surface.

By way of alternative for an ultrasound inspection, measurements with X-rays can also be opted for.

It goes without saying that such embodiment of a device according to the present disclosure is exceptionally suitable for performing measurements of wall thicknesses or ultrasound inspections of welded joints at greater heights or relatively long distances from a user.

BRIEF DESCRIPTION OF THE DRAWINGS

With the present disclosure of better showing the characteristics of the present disclosure, the following embodiments of a mechanism and a device according to the present disclosure are described by way of an example without any limiting nature, with reference to the accompanying drawings, wherein.

BRIEF DESCRIPTION OF THE DRAWINGS

Figure 1:
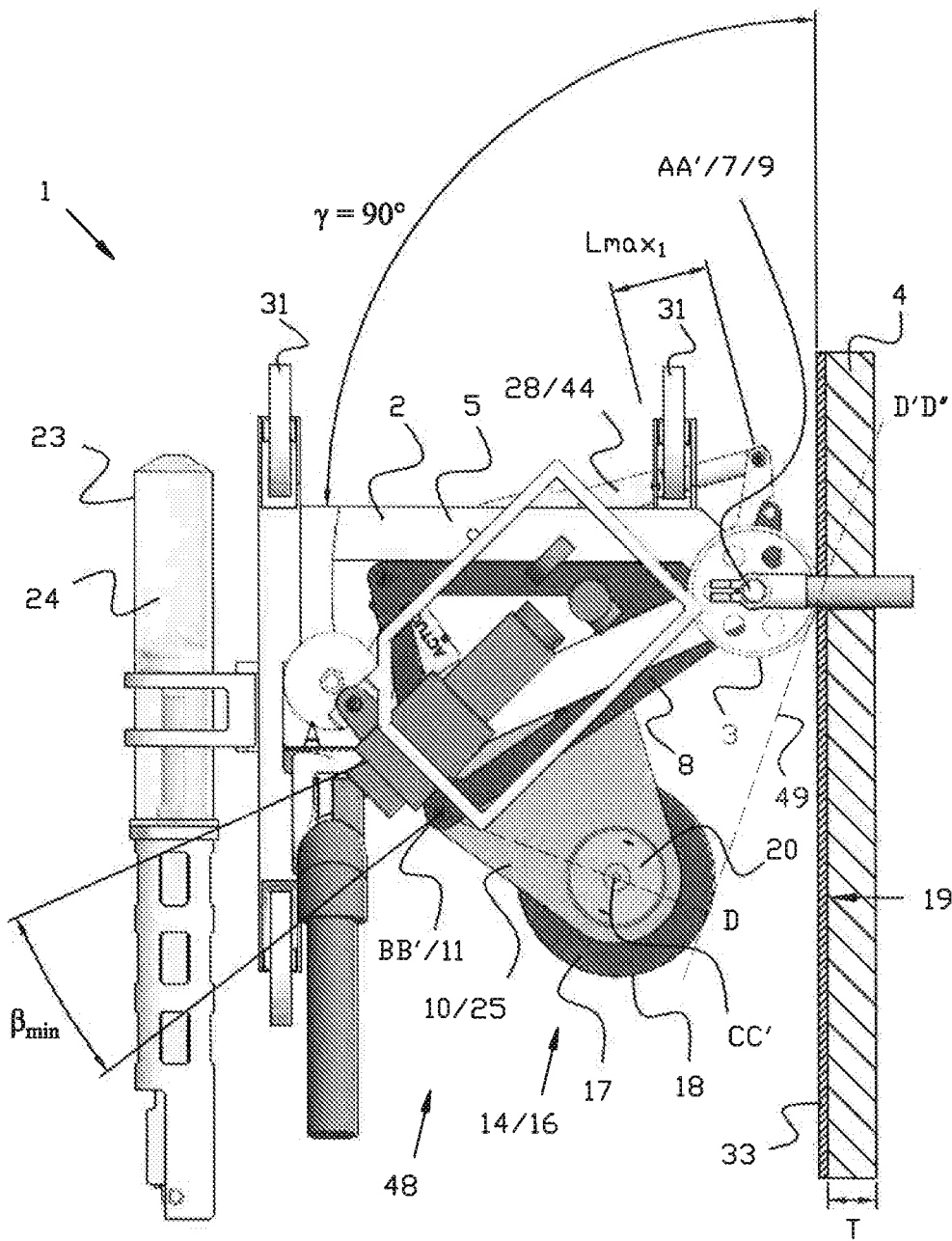
FIG. 1 shows a side view of an embodiment of a mechanism according to the present disclosure, more specifically in a starting position of the mechanism.

In FIGS. 1 to 9 a mechanism 1 according to the present disclosure is illustrated in different positions during operation thereof.

The mechanism 1 comprises a first body 2 which is provided with a support section 3 which in some embodiments comprises at least one support wheel 3, in this case a pair of support wheels 3 on either side of the mechanism 1, with which the mechanism 1 can support and/or drive or in some embodiments glide on a surface or wall 4.

In the examples of FIGS. 1 to 5 this wall 4 extends vertically.

The pair of support wheels 3 is rotatably mounted around a central shaft AA' in the first body 2 of the mechanism 1.

The first body 2 of the mechanism 1 forms a kind of skeleton with contours in the form of a prismatic body with two parallel, similar side surfaces 5 and 6 which are more or less formed from two rectangular triangles of which one acute angle is cut to form a front tip 7 in which the central shaft AA' of the support wheels 3 is mounted.

The support wheels 3 are laterally mounted on either side of the first body 2.

Moreover, the mechanism 1 according to the present disclosure comprises a second body 8 which is rotatable around the central shaft AA' of the support wheels 3.

In this case, this second body 8 is executed as a skeleton 2 with contours in the form of a triangular prism and mounted between the side surfaces 5 and 6 of the first body 2, hingedly around the central shaft AA' on the level of a first corner 9 of the triangular, second body 8.

In addition the mechanism 1 also comprises a third body 10 which is rotatably attached around a rotation shaft BB' on the second body 8 on the level of a second corner 11 of the triangular, second body 8.

The rotation shaft BB' is parallel to the central shaft AA' of the support wheels 3.

The third body 10 is hingedly attached between two sidewalls 12 and 13 of the second body 8.

On this third body 10 a first tool 14 and a second tool 15 are fixedly attached, which according to the present disclosure are each typically either a measuring instrument or an implement.

In this case, the first tool 14 is an implement, more specifically a grinding implement or sanding implement 16 with a grinding wheel or sanding disk 17 which has a cylindrical machining surface 18 with which a grinding operation or sanding operation can be performed on a surface section 19 of a wall 4.

For driving the grinding wheel or sanding disk 17, the grinding implement or sanding implement 16 is provided with an electrically driven motor 20.

The second tool 15 in the example shown is a measuring instrument in the form of a sensor 21 for measuring a thickness T of a wall 4 or of layer of paint or for performing an ultrasound inspection of a welded joint or the like, whereby the sensor 21 has a flat measuring surface 22.

In some embodiments, the second tool 15 is an ultrasound sensor 21, whereby the mechanism 1 is also provided with a dispenser 23 with coupling fluid 24, which ensures a good contact between the ultrasound sensor 21 and the surface section 19.

The electric motor 20 and the grinding wheel or sanding disk 17 of the first tool 14 are mounted on either side of a first side flank 25 of the third body 10 concentrically around a central shaft CC' which is also parallel to the shafts AA' and BB', whereas the second tool 15 is housed in a cavity in the third body between the first side flank 25 and a second side flank 26 with smaller dimensions and extends radially in a direction away from the hinge shaft BB'.

In the example discussed here the first tool 14 and the second tool are an implement and a measuring instrument respectively, but in other embodiments it may concern two or more implements or two or more measuring instruments and all possible combinations thereof.

According to the present disclosure such measuring instrument need not be a thickness meter and it can, for example, also be a spectroscope, a microscope or a photographic device or a camera or any other measuring instrument.

A tool that is executed as an implement need not be a grinding or sanding implement either, but it can be any implement.

It is also not excluded that the present disclosure provides the mechanism 1 with yet another tool, which primarily would not be described as an implement or measuring instrument, such as for example a camera or the like, but whereby tools of the mechanism need to be interchanged to correctly perform a certain composed action.

The first tool 14 and the second tool 15 are fixedly attached to the third body 10, whereby the third body can be rotated relative to the second body 8 around the hinge shaft BB'.

The intention is that the first tool 14 and the second tool 15, for machining or measuring on the level of one and the same surface section 19 of a wall 4, can be switched by a rotation of the third section 10, such that they, after the switch, can operate on the same surface section 19.

To this end, the first tool 14 and the second tool 15 respectively have a cylindrical machining surface 18 and a flat measuring surface 22 which on the level of a tangent or tangent plane, respectively tangent X and tangent Y, is tangential to one and the same cylinder surface Z which has rotation shaft BB' of the second body 8 as central shaft.

These tangents X and Y, with the central shaft of rotation shaft BB', form a wedge 27 with a certain top angle $\alpha_0$.

Figure 4:
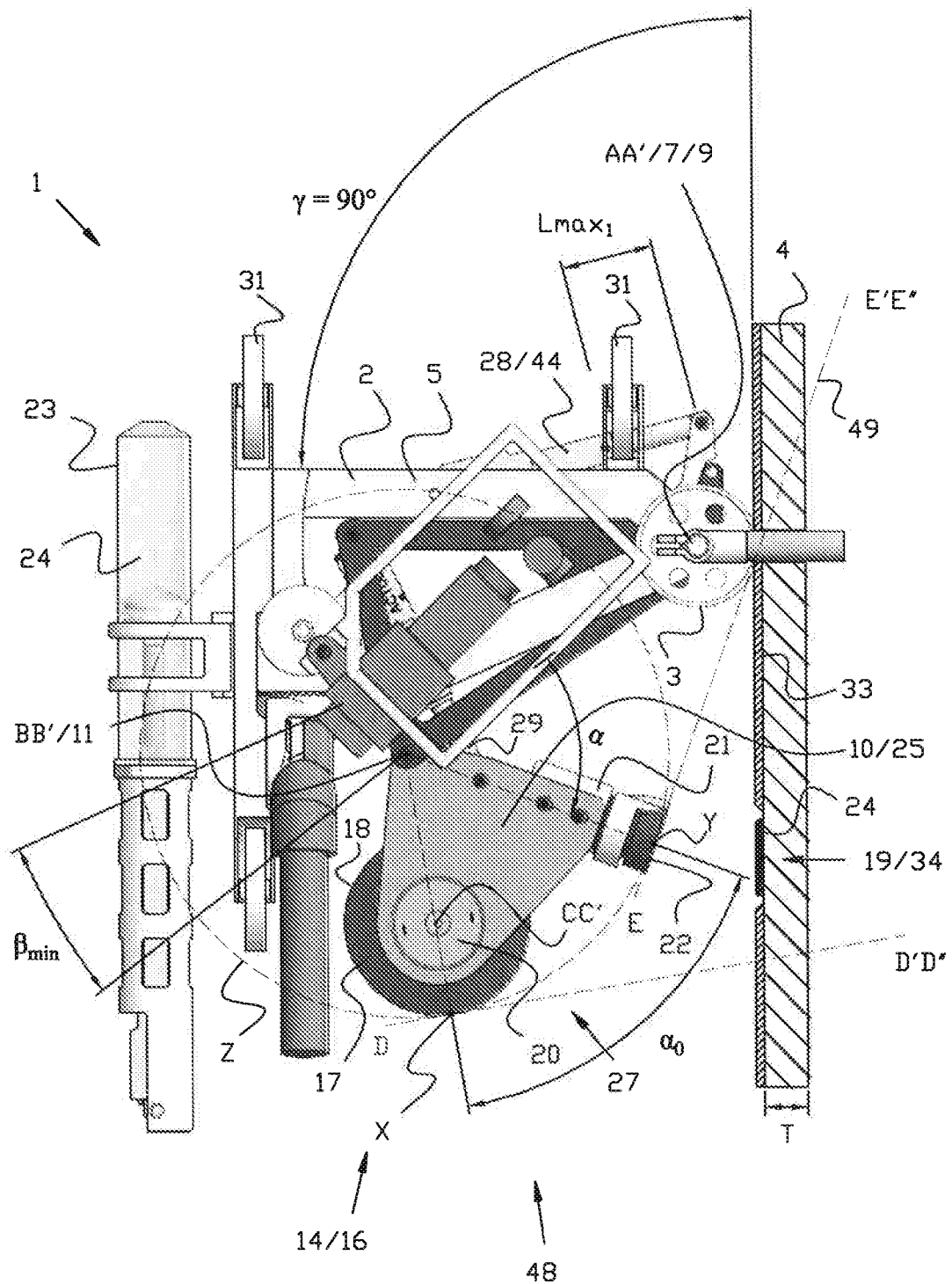
FIG. 4 shows a side view of the mechanism shown in FIG. 3, in a consecutive position during the operation thereof for performing a measurement of a wall thickness or an ultrasound inspection.

This is clearly illustrated in FIG. 4, for example.

In the example shown, the top angle $\alpha_0$ is equal to 600, but this does not necessarily have to be the case according to the present disclosure.

Moreover, the mechanism 1 is provided with first driving means 28 for rotating the second body 8 relative to the first body 2.

The mechanism further also contains second driving means 29 for rotating the third body 10 relative to the second body 8.

In the example discussed here, the first driving means 28 and the second driving means 29 are linear driving means with a movable section that can move over a certain maximum length, maximum length $Lmax_1$ and maximum length $Lmax_2$ respectively, between a fully retracted position and a completely extended position.

FIG. 4, for example, shows a condition of the mechanism 1 whereby both the first driving means 28 and the second driving means 29 are in the fully extended position.

Figure 7:
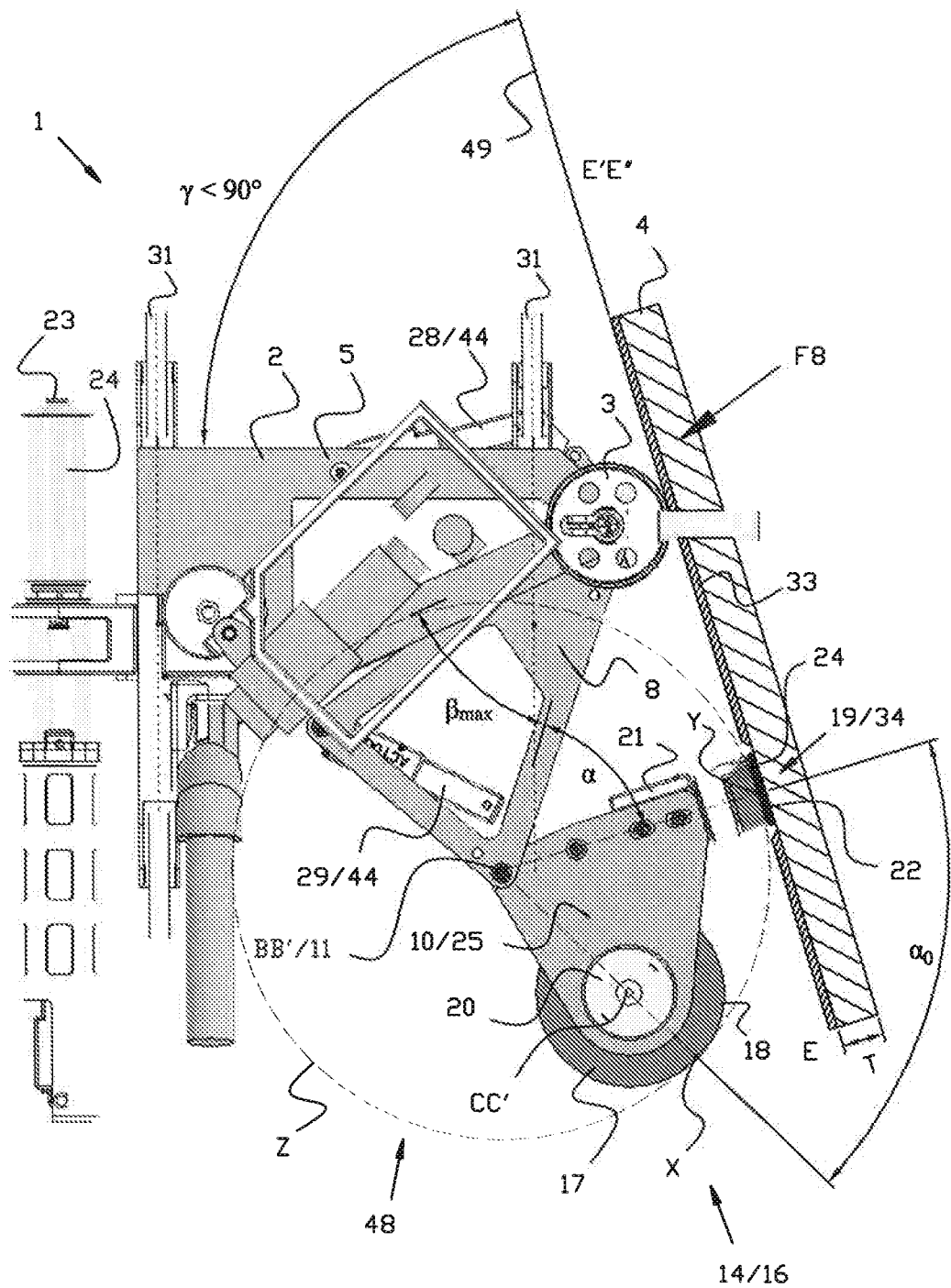
FIG. 7 shows a final position corresponding to that of FIG. 5, whereby the wall or surface to be measured makes a different angle every time with the first body or support section of the mechanism.

FIG. 7 shows a condition of the mechanism 1 whereby the first driving means 28 are brought in the fully retracted position and the second driving means 29 in the fully extended position, whereas in FIG. 1 exactly the reverse condition is shown, whereby the first driving means 28 are brought in the fully extended position and the second driving means 29 in the fully retracted position.

From these examples it can be easily concluded that retracting the first driving means 28 causes a movement of the second body 8 relative to the first body 2, whereby the second body 8 moves more and more out of the first body 2.

Upon retracting the second driving means 29 the third body 10 moves more and more toward the second body 8.

According to the present disclosure it is not excluded to execute the mechanism 1 with entirely different driving means 28 and 29 that are not necessarily linear and which for example are formed by a rotating electric motor or the like.

In the example shown in the figures the first driving means 28 can rotate the second body 8 over an angle β relative to the first body 2 into a random position between a minimum angle position $β_{min}$ and a maximum angle position $β_{max}$.

From a condition in which the second body 8 is positioned under a minimum angle position $β_{min}$ relative to the first body 2, the second body 8 in principle, more specifically when the second body 8 is able to move without obstruction, is brought in a position which corresponds with the maximum angle position $β_{max}$ of the second body 8 relative to the first body 2, by a maximum retraction of the first driving means 28 over the maximum length $L_{max1}$.

This is shown in FIG. 7 for example.

Figure 2:
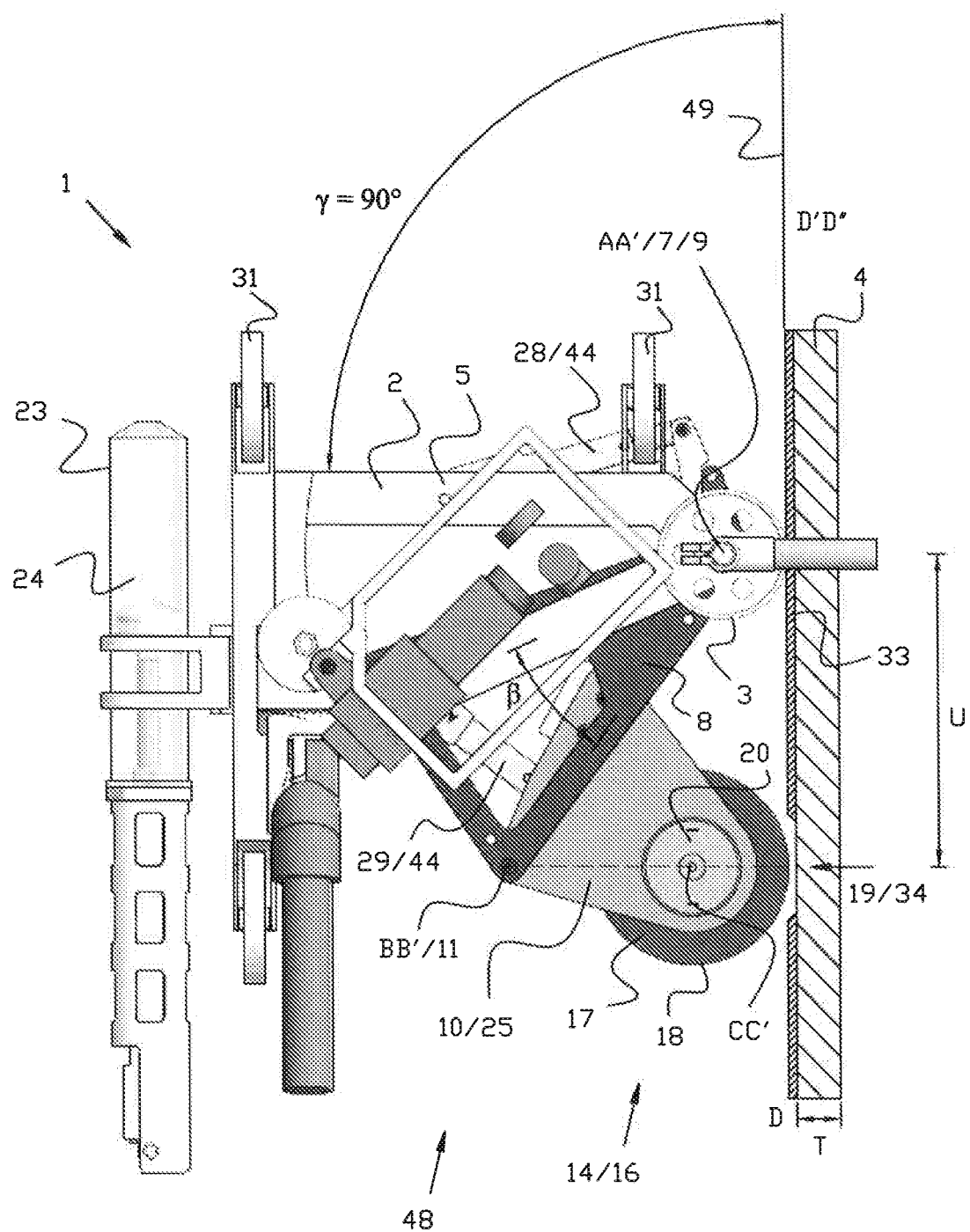
FIG. 2 shows a side view of the mechanism shown in FIG. 1, in a position during the operation thereof for performing a measurement of a wall thickness or an ultrasound inspection.
Figure 5:
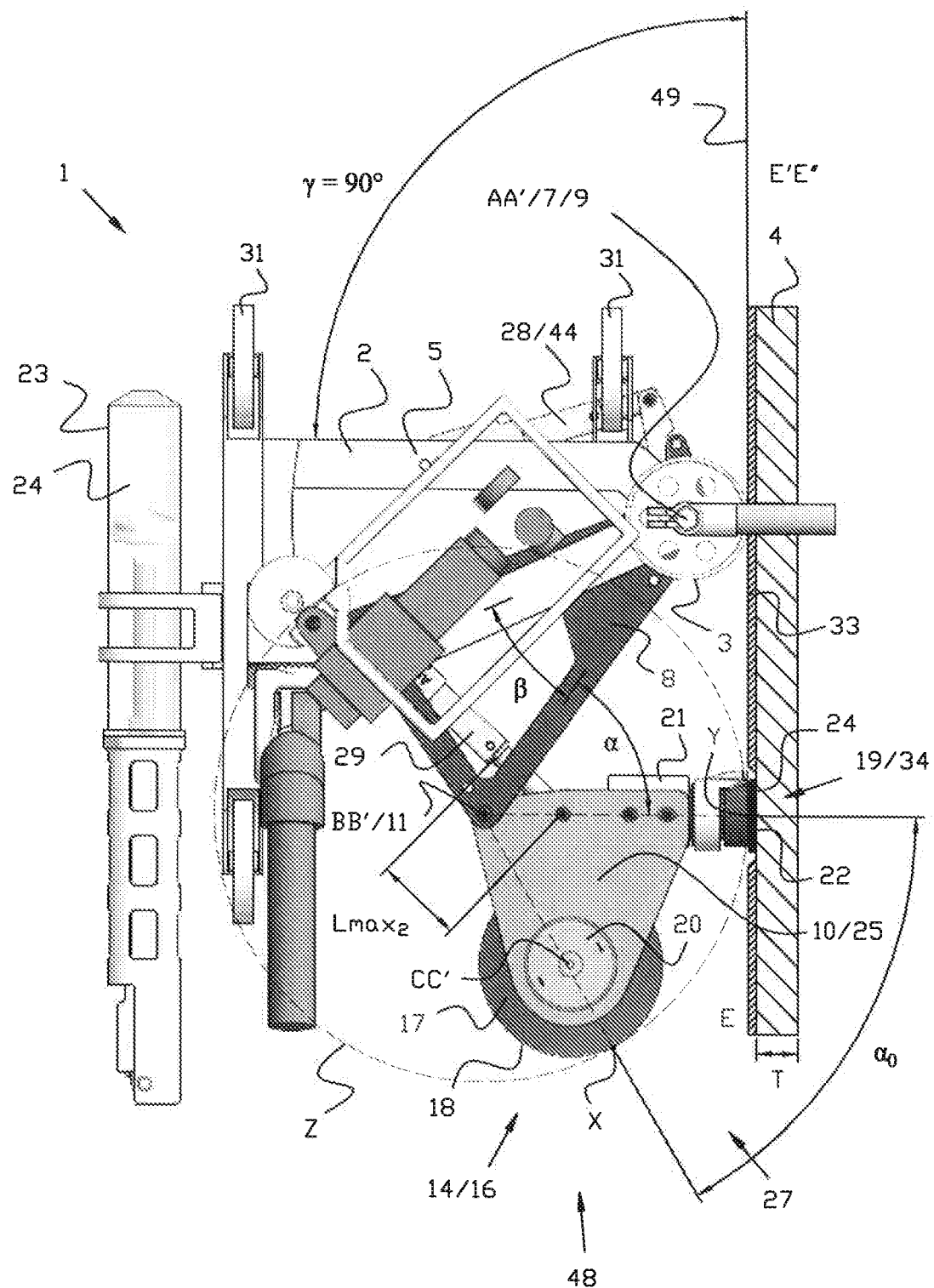
FIG. 5 shows a side view of the mechanism shown in FIG. 4, in a consecutive position during the operation thereof for performing a measurement of a wall thickness or an ultrasound inspection.

However, when the movement of the second body 8 is limited to an angle position β, which is the case for example in FIGS. 2 and 5, whereby the first tool 14 and the second tool 15 respectively come into contact with the wall 4 before reaching the maximum angle position $β_{max}$, in principle it suffices that the first driving means 28 is retracted over a length that is less than the maximum length $L_{max1}$.

Further retraction of the first driving means 28 could in such circumstances possibly even result in damage.

However, in the case of the figures the first driving means 28, which on one side are fixedly connected to the first body 2, work indirectly via an intermediate spring system of torsion springs 30 on the second body 8 for the rotatable driving thereof relative to the first body 2.

In this way it is possible to always move the first linear driving means 28 over the full length $L_{max1}$ in a reciprocating movement, which on the one hand strongly simplifies the control of the first driving means 28 and whereby on the other hand, upon reaching the wall 4, the torsion springs 30 exercise a compressive force on the relevant tool 14 or 15 which is useful for performing the relevant operation, or the relevant measurement.

Figure 8:
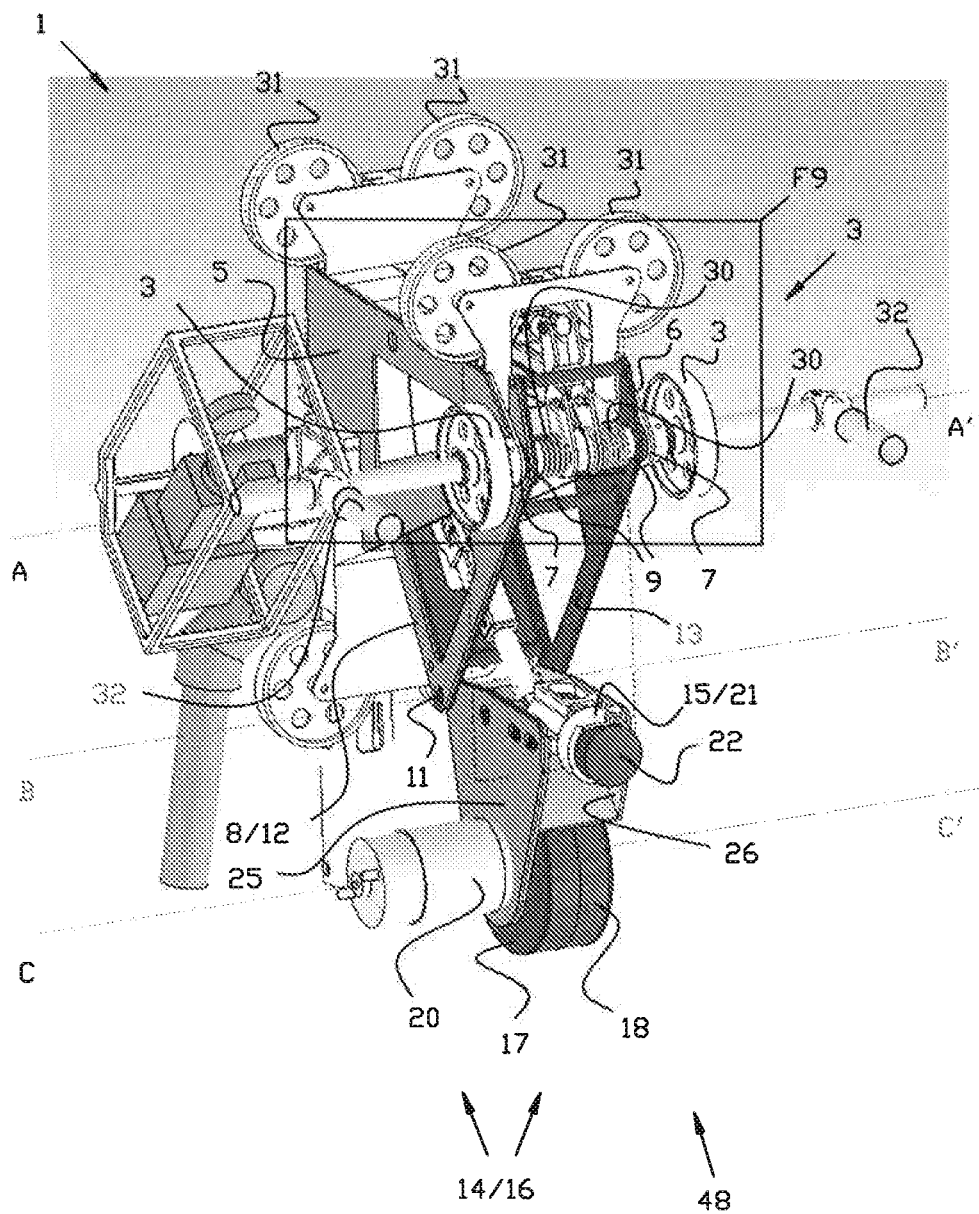
FIG. 8 shows a perspective view according to arrow F8 in FIG. 7 on the mechanism.
Figure 9:
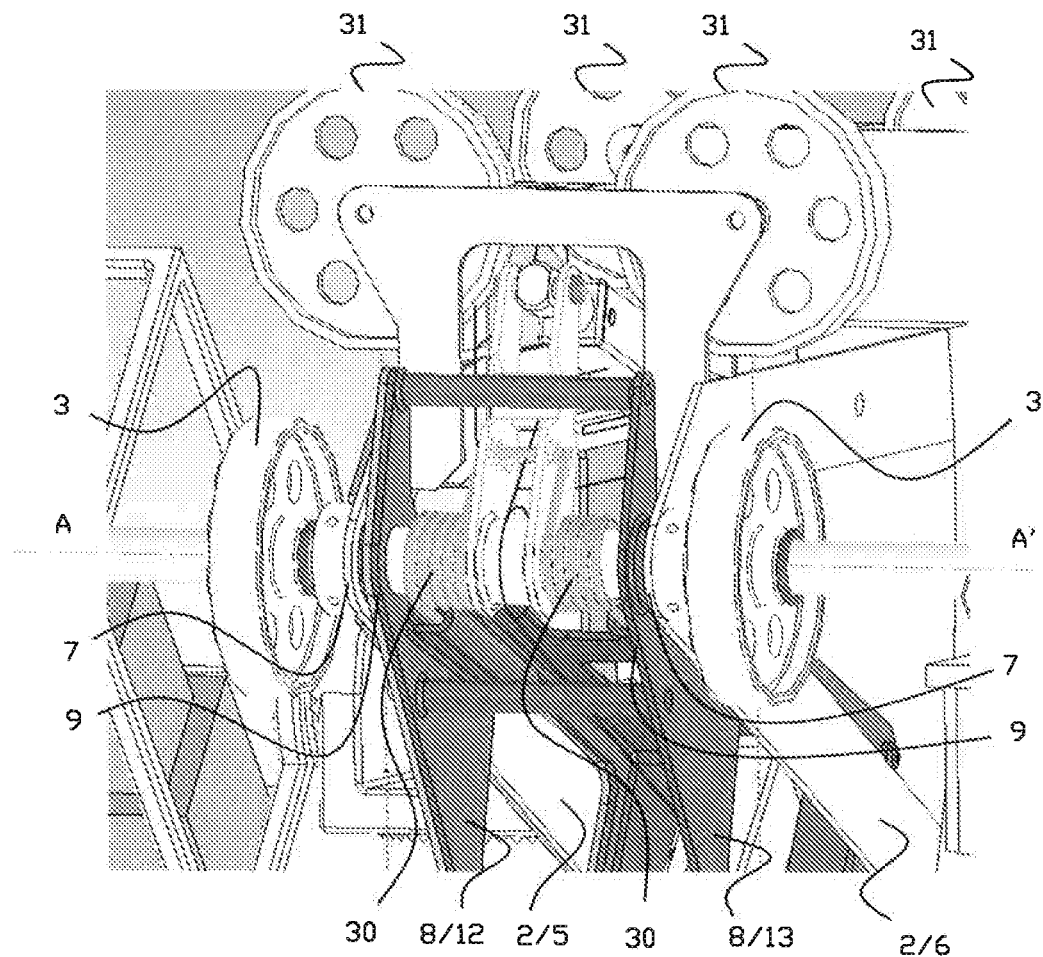
FIG. 9 shows a perspective view on a larger scale of the section of the mechanism indicated with F9 in FIG. 8.

The spring system with torsion springs 30 is shown in more detail in FIGS. 8 and 9.

The second driving means 29 allow the third body 10 to rotate over a fixed angle α, which corresponds with the aforementioned top angle $α_0$ between the first tool 14 and the second tool 15, relative to the second body 8.

More specifically the second driving means 29 allow a rotation of the third body 10 relative to the second body 2 between a first position, whereby a tangent plane D-D'-D" on the measuring or machining surface 18 of the first tool 14 also extends tangentially to the at least one support wheel 3, and a second position, whereby a tangent plane EE' on the measuring or machining surface 22 of the second tool 15 also extends tangentially to the at least one support wheel 3.

Figure 3:
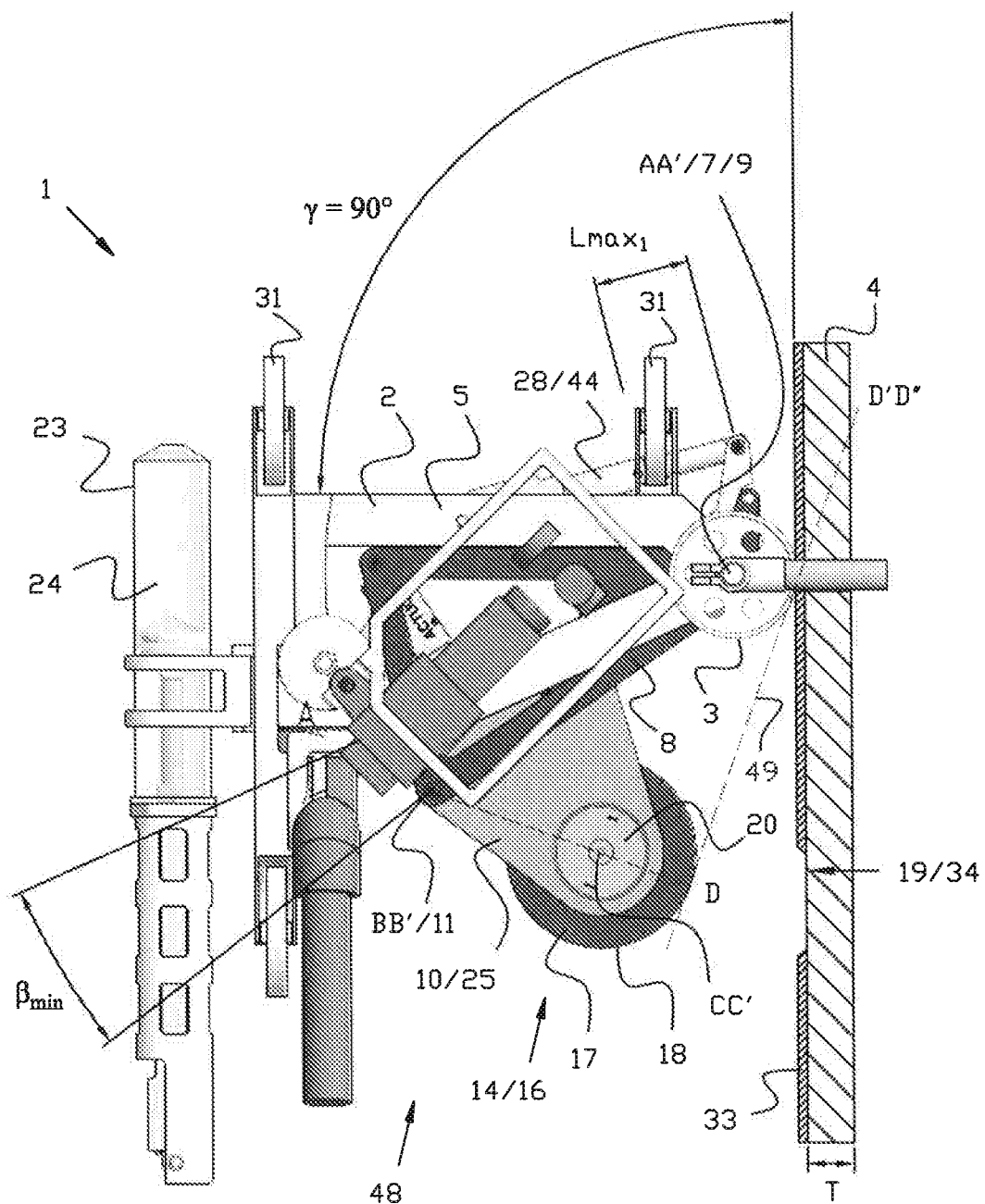
FIG. 3 shows a side view of the mechanism shown in FIG. 2, in a consecutive position during the operation thereof for performing a measurement of a wall thickness or an ultrasound inspection.

The first position of the third body 10 relative to the second body 8 is for example shown in FIGS. 1 to 3.

The second position of the third body 10 relative to the second body 8 is for example shown in FIGS. 4 to 7.

As already explained in the introduction, it is an aspect that depending on the chosen position, the tangent plane D-D'-D" or the tangent plane EE' is tangential to the at least one support wheel 3, because this means a rotation β around the central shaft AA' of the support wheels 3 using the first driving means 28 can bring the relevant tangent plane D-D'-D" or E-E'-E" adjoiningly against the wall 4, such that the operation or measurement can be executed perfectly.

In a similar embodiment of a mechanism 1 according to the present disclosure whereby this time more than two tools 14, 15, etc. are consecutively and fixedly provided on the third body 10, a similar functionality can be obtained by ensuring that all the tools have a machining surface 18 or a measuring surface 22 which on the level of a tangent X, Y, etc. is tangential to one and the same cylinder surface Z which has the rotation shaft BB' of the third body 10 as central shaft, whereby the tangents X, Y, etc. of consecutive tools 14, 15, etc. each form a wedge 27 with a certain top angle $\alpha_0$ with the central shaft of rotation shaft BB'.

In this case it is also necessary to ensure that the second driving means 29 are able to position the third body 10 in different positions which are rotated relative to each other over a fixed angle $\alpha$ or a plurality thereof, whereby the fixed angle $\alpha$ corresponds with the top angle $\alpha_0$.

In some embodiments, it is also ensured that in every position of the third body 10 one of the tools 14, 15, etc. is always positioned such that a tangent plane D-D'-D", E-E'-E", F-F'-F", etc. on the measuring or machining surface 18 of the relevant tool 14 also extends tangentially to the at least one support wheel 3, such that the corresponding tangent plane D-D'-D", E-E'-E", F-F'-F", etc. can be brought adjoiningly against the wall or surface 4.

Such embodiment offers a more general functionality and can thus be obtained by applying the principles that are explained here based on FIGS. 1 to 12 to come to a more general form of a mechanism 1 according to the present disclosure.

Furthermore, the mechanism 1 is also provided with control means for controlling the first and second driving means 28 and 29, as well as the tools 14 and 15.

In some embodiments, the control means can also operate the dispenser 23 to apply coupling fluid 24 from the dispenser 23 on the wall section 19 to be measured before the ultrasound sensor 16 is brought to that wall section 19.

The control means are not shown in the figures and can take on all kinds of forms.

In some embodiments, they are electric and/or electronic control means which are able to fully or partly automatically perform actions with the mechanism 1 and which may or may not be activated by a user.

Depending on the embodiment it can be ensured that a user can intervene more or less on the control means and therefore on the mechanism for positioning and operating the tools 14 and 15 and for controlling the driving means 28 and 29 and still other elements of such mechanism 1.

In the examples of the figures, the first body 2 is additionally provided with several guide wheels 31 to guide the mechanism 1 upon moving the mechanism 1 over a wall or surface 4.

Figure 12:
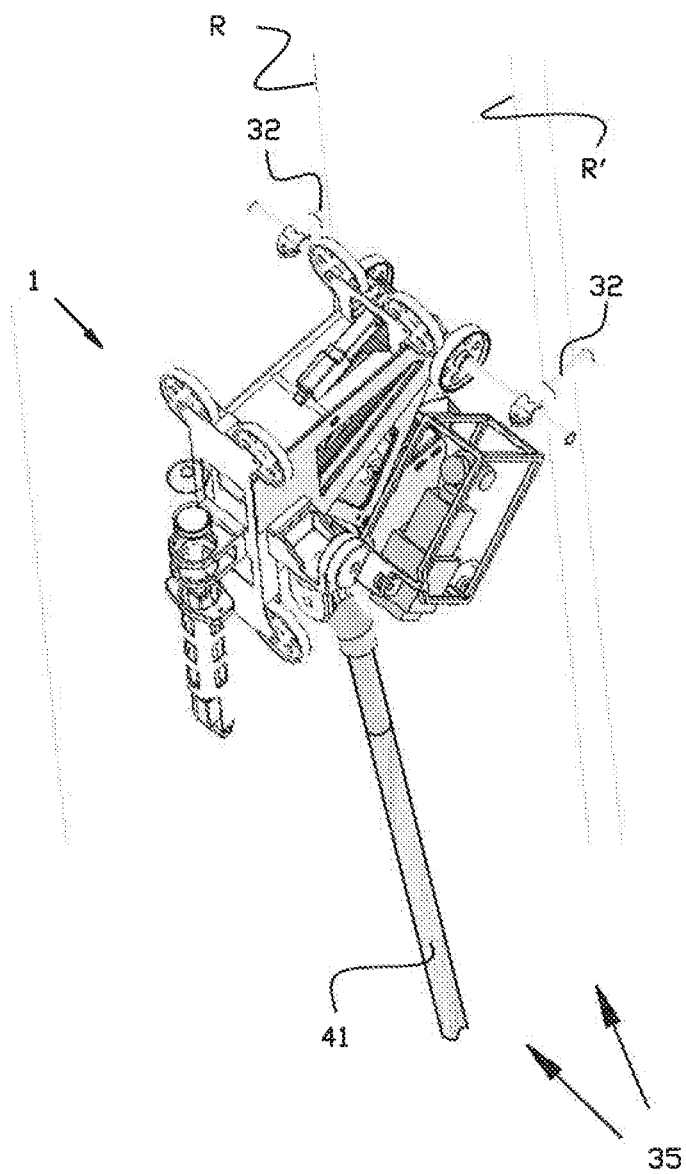
FIG. 12 shows a perspective view on an even greater scale of a section of FIG. 11 according to arrow F12.

Moreover, in this case the first body 2 of the mechanism 1 is also provided laterally with a guidance pin 32 or provided on either side with such guidance pin 32, whereby each guidance pin 32 extends radially to beyond the contour of the at least one support wheel 3, and whereby the guidance pins 32 serve to guide the mechanism 1 along an edge R or a pair of edges R and R', which is illustrated in FIG. 12 by way of example.

In some embodiments, the first body 2 is provided with one or more of the described support wheels 3 and/or one or more adjustable guide wheels 31 and/or one or more adjustable guidance pins 32.

The operation and the use of a mechanism 1 according to the present disclosure is simple and will be discussed in more detail below based on the figures.

The condition of the mechanism 1 according to the present disclosure, as shown in FIG. 1, can be considered as a starting position of the mechanism 1, whereby the at least one support wheel 3 rests against a wall or surface 4 and the second body 8 is brought in the nearest possible position against the first body 2 and the third body 10 in the nearest possible position against the second body 8.

To this end in this case the first driving means 28 are brought into the most extended position and the second driving means 29 into the most retracted position, but in other embodiments of a mechanism 1 according to the present disclosure this may be completely different.

The first body 2 of the mechanism 1 is hereby oriented in a certain way relative to the wall or surface 4 on which it supports.

Figure 6:
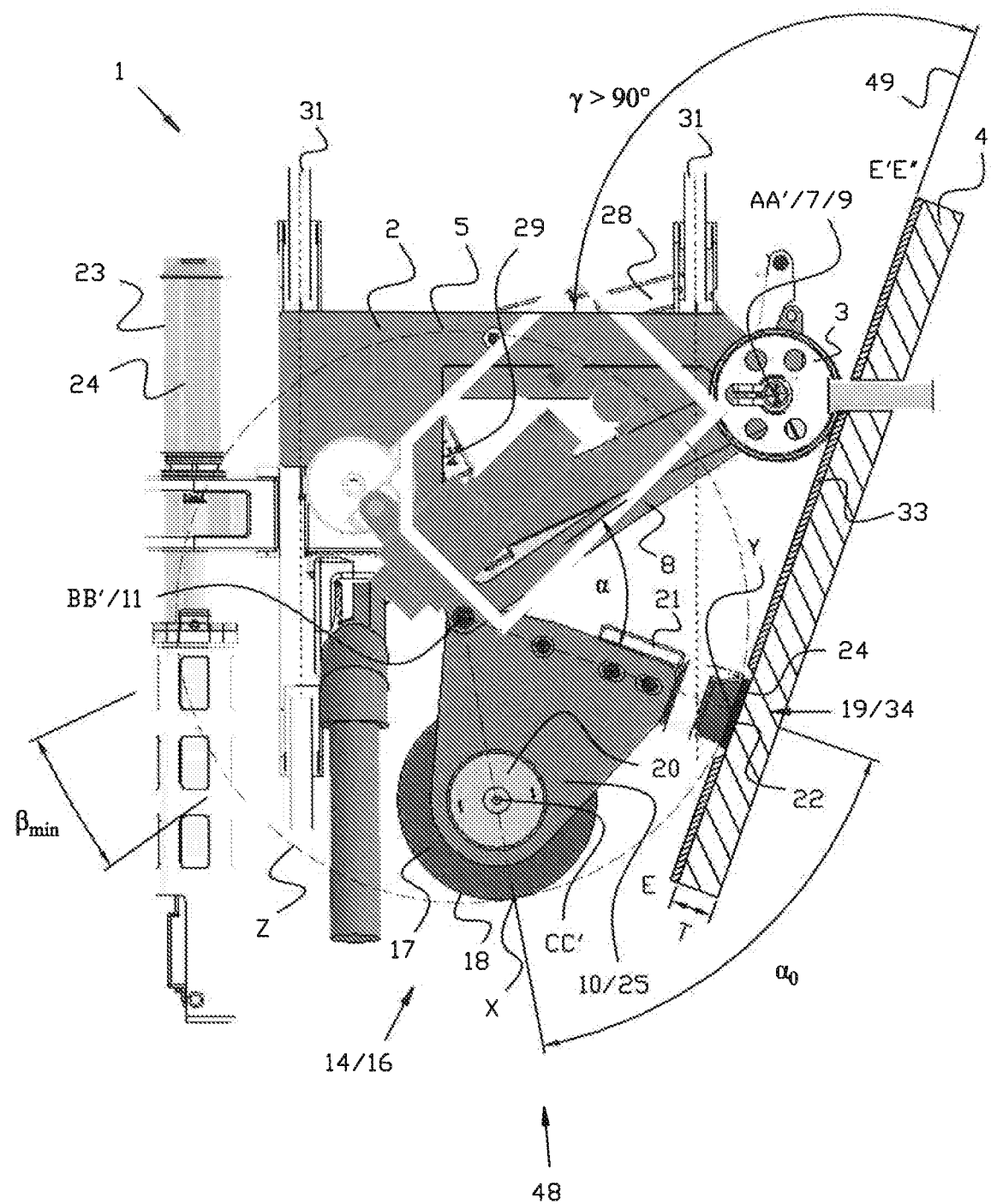
FIG. 6 shows a final position corresponding to that of FIG. 5, whereby the wall or surface to be measured makes a different angle every time with the first body or support section of the mechanism.

In the case of FIG. 1 the angle $\gamma$ between one side of the first body 2 and the wall 4 is exactly 90°, but in FIGS. 6 and 7 positions of the mechanism 1 are shown whereby the angle $\gamma$ between the first body 2 and the relevant wall or surface 4 is less than 90° and greater than 90° respectively, for example as a result of another orientation of the mechanism 1 or of the wall or surface 4.

To perform a preparatory operation and a measurement with the mechanism 1 from the starting position of the mechanism 1 described here, in some embodiments the following steps are performed according to the present disclosure.

In a first step the first driving means 28 are activated and the second body 8 is rotated from the starting position of the second body 8 close to the first body 2, which is shown in FIG. 1, away from the first body 2, into a final position of the second body 8, whereby the first tool 14 supports against the wall or surface 4, more specifically on the level of a surface section 19.

This final position of the second section 8 is shown in FIG. 2.

The tangent plane D-D'-D" on the grinding wheel or sanding disk 17 is hereby brought from a random tangential position on the support wheels 3, shown in FIG. 1, into a tangential position, shown in FIG. 2, which coincides with the tangential position of the wall 4 on the support wheels 3. In this final position the torsion springs 30 are also partially tensioned.

In a second step the first tool 14 is activated and more specifically the electric motor 20 is started to perform the grinding operation or sanding operation with the first tool 14 on the wall or surface 4.

Grinding or sanding removes impurities, such as paint or rust, from an unclean section of a layer 33, which results in a clean surface section 34 on the level of the surface section 19.

A third step includes reactivating the first driving means 28 and rotating the second body 8 from the final position of the second body 8, shown in FIG. 2, back to the starting position of the second body, the starting position being shown in FIG. 3.

During this third step first the torsion springs 30 are relaxed again and only thereafter is the second body 8 moved upon moving further toward the extended position of the first driving means 28.

In a fourth step the second driving means 29 are activated and the third body 10 is rotated from the starting position of the third body 10 close to the second body 8, shown in FIG. 3, away from the second body 8 over an angle $\alpha$ equal to the aforementioned top angle $\alpha_0$, which in this case is 60°, into a final position of the third body 10, shown in FIG. 4.

In some embodiments, before performing the fifth step, a coupling fluid 24 is applied on the clean surface section 34, for example by activating the dispenser 23 with the control means.

In the fifth step the first driving means 28 are activated again to rotate the second body 8 from the starting position of the second body 8, shown in FIG. 4, into the final position of the second body 8, shown in FIG. 5, whereby the second tool 15 or the sensor 21 supports against the wall or surface 4.

The tangent plane EE' on the ultrasound sensor 21 is hereby brought from a random tangential position on the support wheels 3, shown in FIG. 4, to a tangential position, shown in FIG. 5, and which coincides with the tangential position of the wall 4 on the support wheels 3.

In the final position the torsion springs 30 are again partially tensioned, such that the flat measuring surface 22 of the ultrasound sensor 21 via the coupling fluid 24 is properly pressed against the surface section 19 or 34 to be measured.

Upon comparing FIGS. 2 and 5, it is clear that during the previous steps the first tool 14 and the second tool 15 have switched as it were.

In a sixth step, the second tool 15 is activated to perform an operation or measurement with the second tool 15 on the wall or surface 4.

In other words, in the case discussed here a measurement of the thickness T of the wall 4 or surface or an ultrasound inspection of a welded joint is performed.

After performing the measurement a seventh step includes reactivating the second driving means 29 for rotating the third body 10 from the final position of the third body 10, shown in FIG. 5, over an angle $\alpha$ equal to the aforementioned top angle $\alpha_0$ of the wedge 27 formed by the two tools 14 and 15 into the starting position of the third body 10, shown in FIG. 4.

In an eighth step the first driving means 28 are reactivated and the second body 8 is rotated from the final position of the second body 8, shown in FIG. 4, back to the starting position of the second body 8, shown in FIG. 3.

Thus the mechanism 1 is put back in the starting position and the cycle is completed.

According to the present disclosure the control means are configured to be able to perform or perform the aforementioned consecutive steps 1 to 8 automatically from the starting position of the mechanism 1.

In some embodiments according to the present disclosure it is not excluded to work from another starting position or to add steps or to change orders.

Moreover, in the case discussed here, the mechanism 1 only contains two tools 14 and 15, but it is understood that the idea behind the present disclosure can easily be extended to more tools which are spread at an angle $\alpha_0$ relative to each other over the third body 10 and whereby by applying other angle rotations the tools can also be switched for consecutive operations and/or measurements on a surface section 19 of a wall or surface 4.

FIGS. 6 and 7 also illustrate that within certain limits it does not matter under which angle $\gamma$ the mechanism 1 with the first body 2 is oriented relative to the wall or surface 4 while supporting on the wall or surface 4, as the tools 14 and 15 can always be brought adjoiningly against the wall or surface 4 by a rotation around the central shaft AA' of the at least one support wheel 3, and this regardless of whether the third body is brought in the first position, like in FIGS. 1 to 3, or in the second position, like in FIGS. 4 to 7.

The present disclosure also relates to a device 35 for detecting and/or performing measurements and/or operations at a relatively large distance or height.

Figure 10:
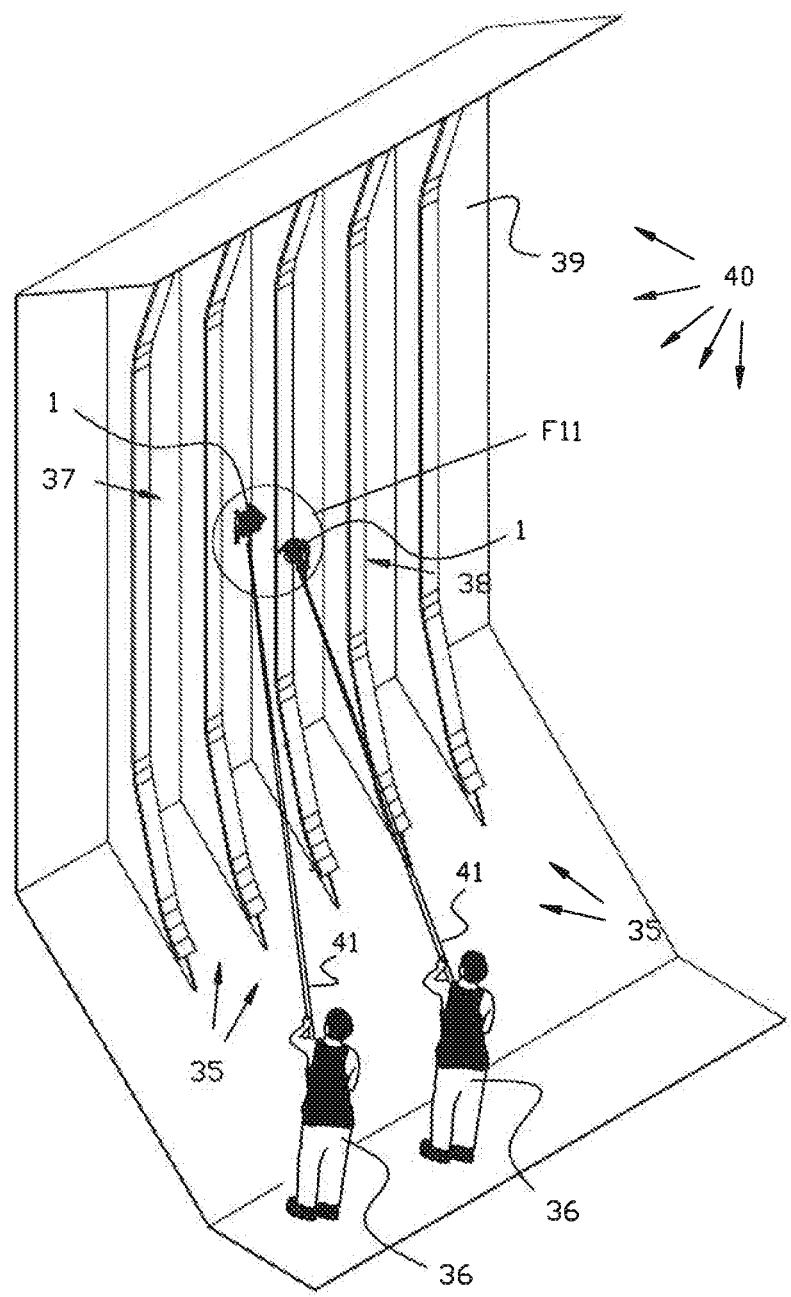
FIG. 10 shows a perspective view of the use of an embodiment of a device according to the present disclosure by a user in a hold of a ship.
Figure 11:
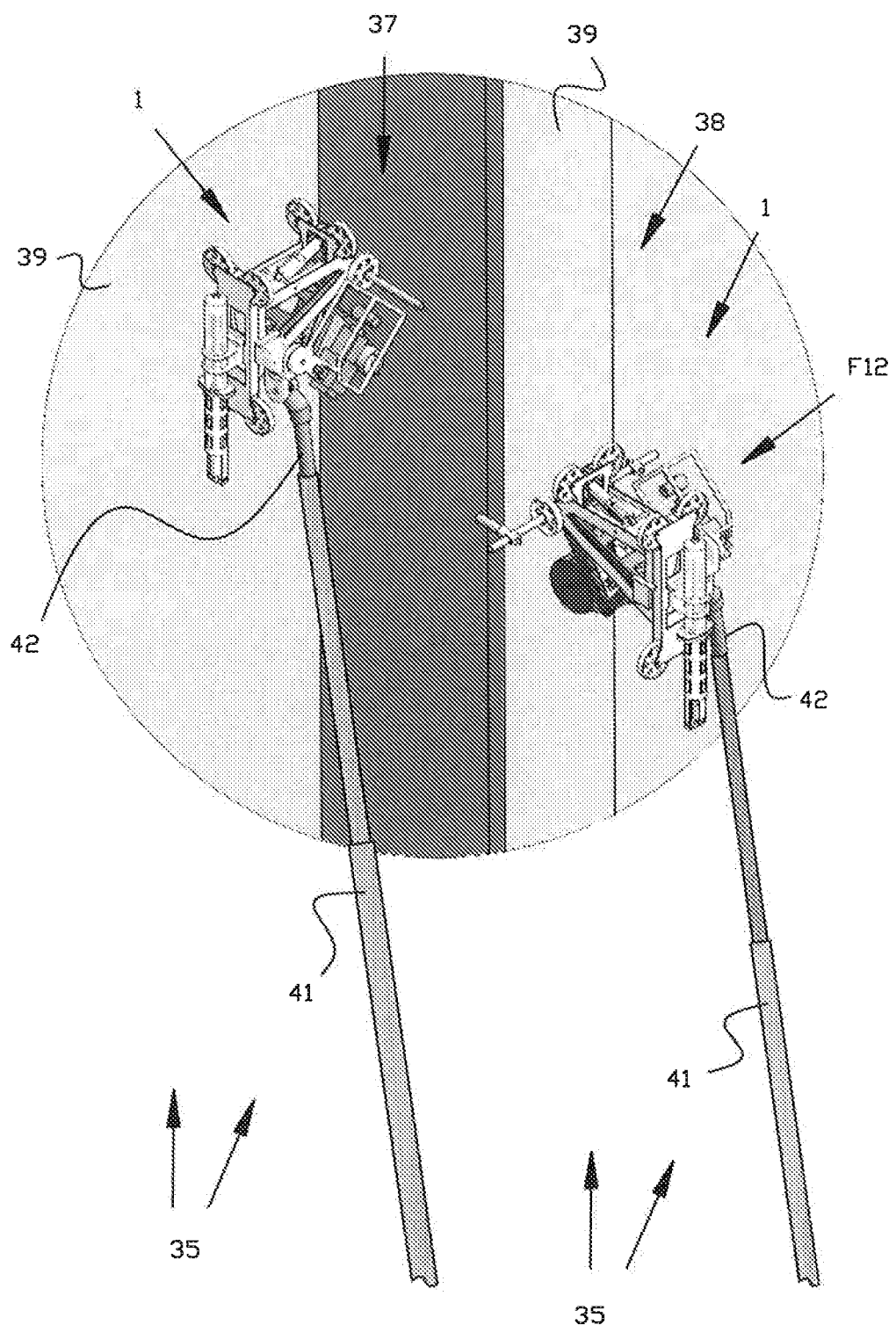
FIG. 11 shows the part indicated in FIG. 10 with frame F11 on a larger scale.

The use of such device 35 is illustrated in FIG. 10, whereby a user 36 uses the device 35 to measure the thickness T of the wall 39 or to perform an ultrasound inspection of a welded joint in different locations 37 and 38 of a hull 39 in the hold 40 of a ship.

Such device 35 according to the present disclosure comprises an oblong, telescopic section 41, whereby at a free end 42 of the telescopic section 41, a head 43 is provided which is executed as, executed with or is provided with a mechanism 1 according to the present disclosure as discussed before based on FIGS. 1 to 9.

In the example shown the user 36 slides the telescopic section 41 out to the desired length and the user 36 aims and/or guides the telescopic section 41 to the location 37 or 38 to be measured, whereby the support wheels 3 and or the guide wheels 31 help to position the mechanism 1 over the hull 39 into the desired position.

In other embodiments it is not excluded to also mount the telescopic section 41 on a chassis and to provide means that may or may not be automated with which the mechanism 1 of the device 35 can be guided to the measuring location.

As soon as the mechanism 1 is brought to the right location, supporting on the support wheels 3, the measurement can start, as explained above, for example by performing steps 1 to 8.

When the acting forces become too big to adequately keep the mechanism in place, for example because of the weight of the mechanism 1, it can be chosen to additionally provide the mechanism 1 with a suction cup system whereby by vacuum suction the mechanism is sucked against the wall or surface or the mechanism can additionally be provided with magnets which can exercise a magnetic force to hold the mechanism against a metal wall.

The first tool 15 of the mechanism 1 of the device 35 is in this case a grinding implement or sanding implement 16 with a cylindrical machining surface 18 and the second tool 15 is a sensor 21 for measuring a thickness T which has a flat measuring surface 22, but in other embodiments the mechanism 1 of a device according to the present disclosure may comprise completely different implements or measuring instruments.

This changes nothing to the operation of the device 35.

The example described based on FIGS. 1 to 12 is only one of the many examples.

Hereafter more embodiments will be described, whereby a number of other principles are applied, which results in other designs.

In the description of these embodiments of a mechanism 1 according to the present disclosure, every detail will not be described again, but it is understood that things such as the system with torsion springs 30, the guidance pins 31 or any other elements can be applied in the same or similar ways with similar intentions to these embodiments.

It is also clear that the mechanisms 1 can also be part of a device 35 according to the present disclosure and for example can be provided at a free end 42 of a telescopic section 41.

Figure 13:
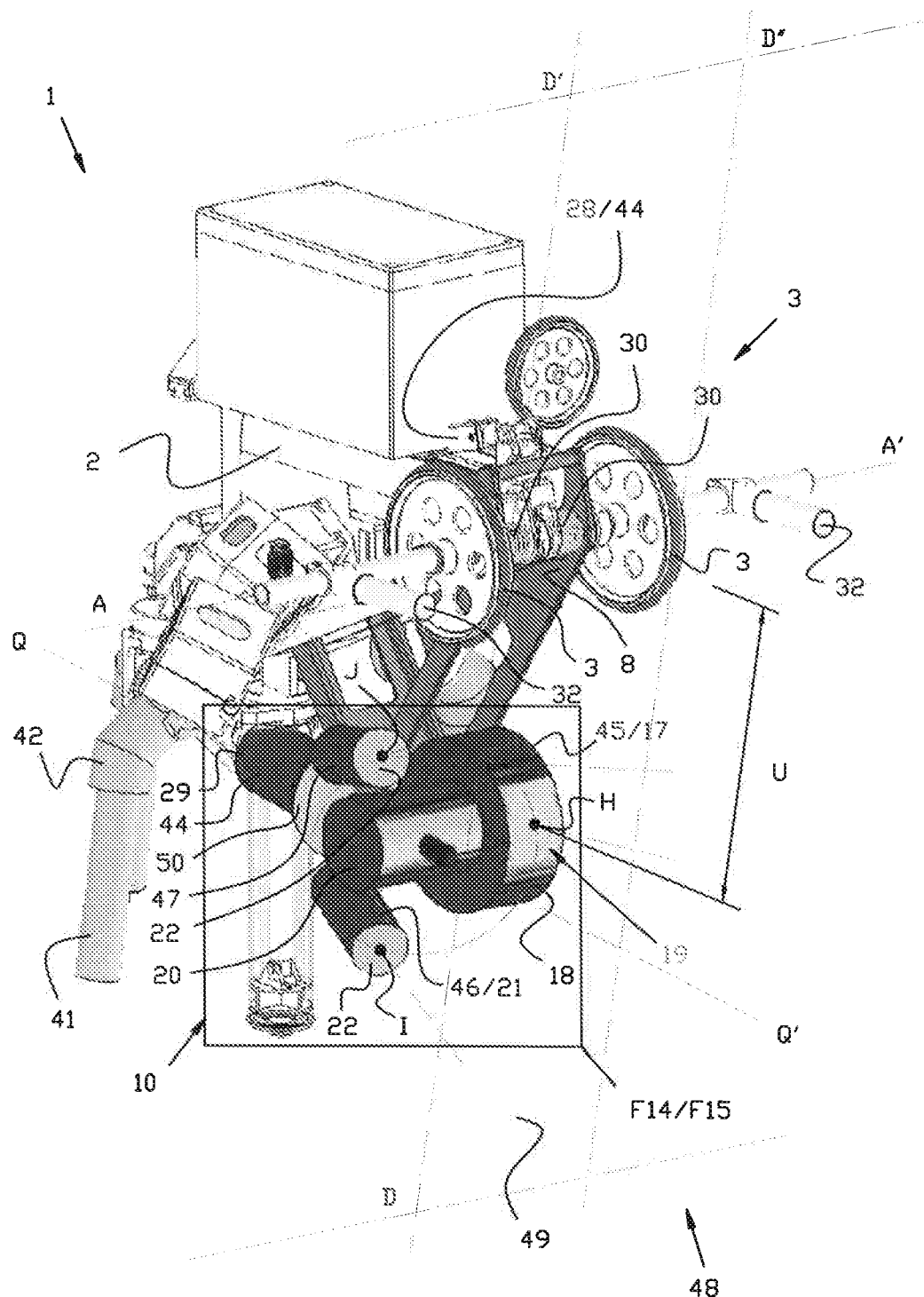
FIG. 13 shows a perspective view of a embodiment of a mechanism according to the present disclosure.
Figure 14:
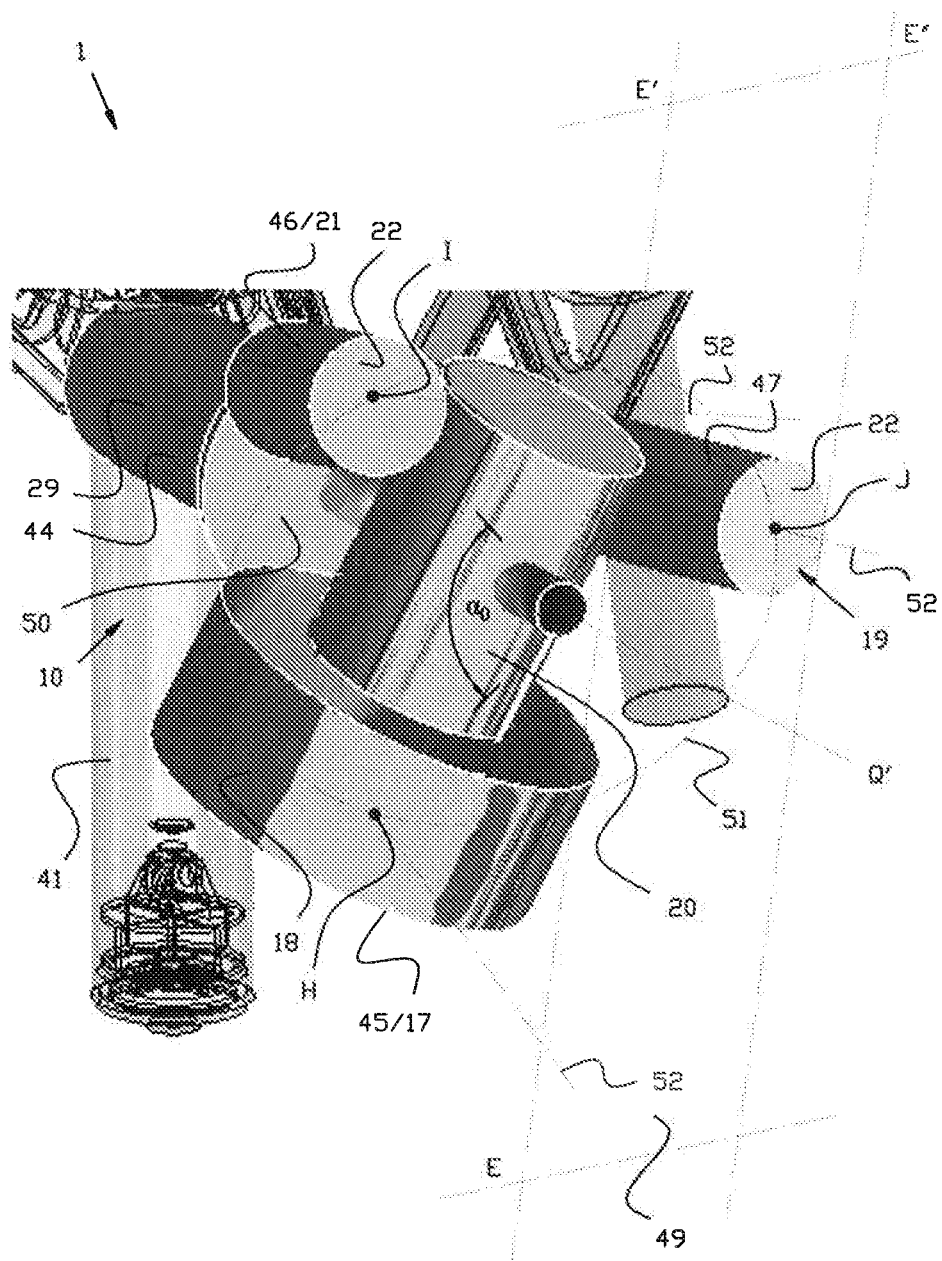
FIG. 14 shows the section of FIG. 13 which is indicated with F14/F15 but in a rotated position on a larger scale.
Figure 15:
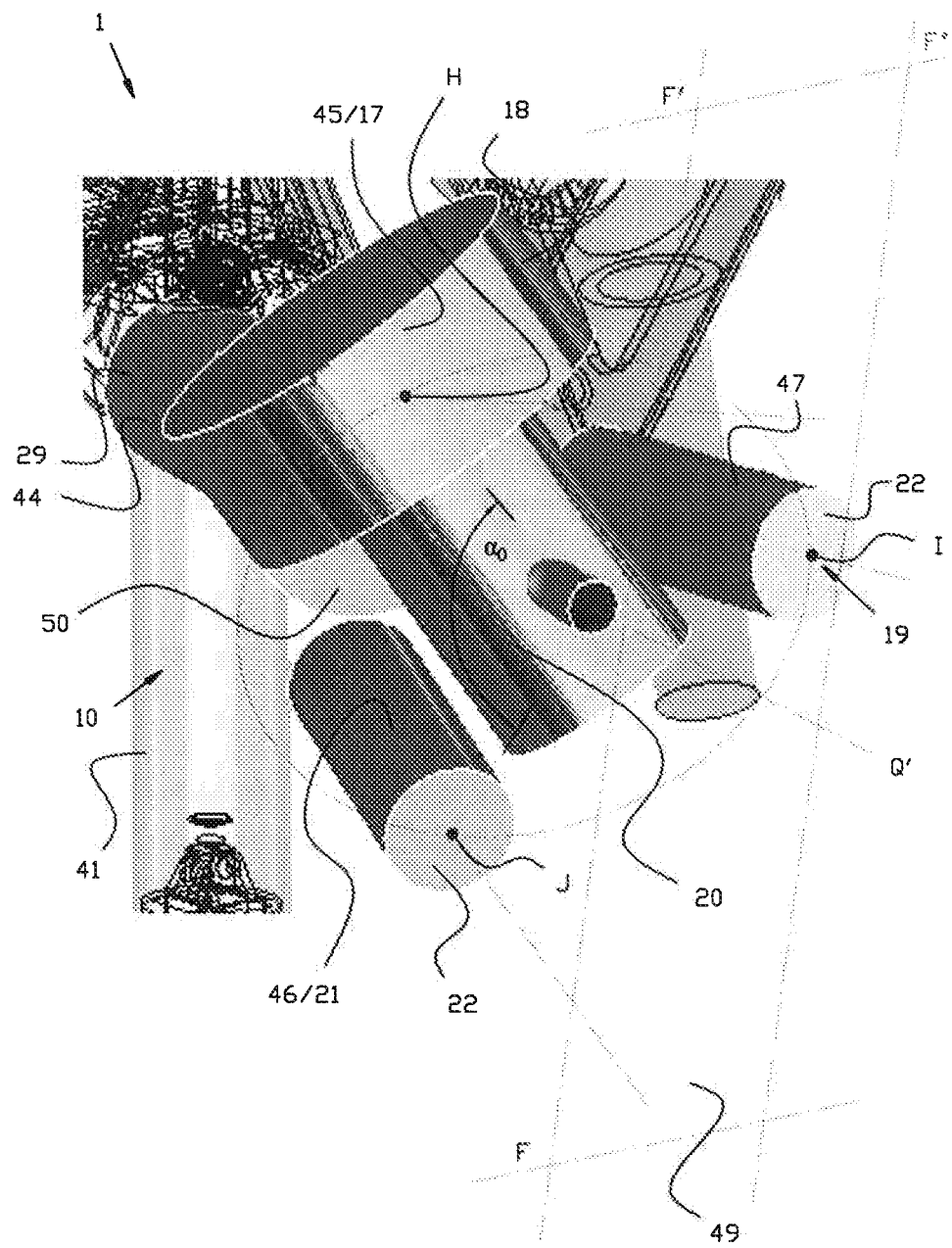
FIG. 15 shows the section of FIG. 13 which is indicated with F14/F15 but in another rotated position on a larger scale.

A second alternative embodiment of a mechanism 1 according to the present disclosure is illustrated based on FIGS. 13 to 15.

The mechanism 1 is again provided with a first body 2 of the mechanism 1 which is provided with a pair of support wheels 3, which are applied on either side of the mechanism 1 and with which the mechanism 1 can support and/or drive on a surface or wall 4 (which is not shown in the figures).

The pair of support wheels 3 is rotatably mounted around a central shaft AA' in the first body 2 of the mechanism 1.

Just as in the previous embodiment of FIGS. 1 to 12 the mechanism 1 comprises a second body 8 which is movable relative to the first body 2 and is provided with driving means 44 which comprise first driving means 28 for moving the second body 8 relative to the first body 2.

More specifically, the second body 8 of the mechanism 1 is again rotatably attached around a shaft in the first body 2, whereby the shaft in this case is again the central shaft AA' of the pair of support wheels 3.

In this example of FIGS. 13 to 15, the first body 2, the second body 8 and the first driving means 28 are executed identically or practically identically to the first body 2, the second body 8 and the first driving means 28 of the previous embodiment from FIGS. 1 to 12.

The mechanism 1 also comprises a third body 10 which is movable relative to the first body 2 and the driving means 44 of the mechanism 1 also comprise second driving means 29 for moving the third body 10 relative to the second body 10 and thus indirectly also relative to the first body 2.

Just as in the previous embodiment, the third body 10 is rotatably attached around a rotation shaft QQ' to the second body 8, but the rotation shaft QQ' is no longer parallel to the central shaft AA' of the support wheels 3, as was the case with the shaft BB' in the previous embodiment.

According to the present disclosure the mechanism 1 is again provided with at least two tools, more specifically in this case three tools 45, 46 and 47.

The first tool 45 is, for example, a grinding implement or sanding implement 16 again in the form of a grinding wheel 17 or sanding disk 17 with a cylindrical machining surface 18 and which is driven by an electric motor 20.

The two other tools 46 and 47 can, for example, be two measuring instruments, for example an ultrasound sensor 21 and a thickness meter 47, but they can also be completely different measuring instruments or implements.

In this example, the tools 46 and 47 have a measuring surface 22 that is executed in a flat manner.

In the embodiment shown in FIGS. 13 to 15, all tools 45 to 47 of the mechanism 1, just as in the previous embodiment, are fixedly mounted on the third body 10, such that every relevant tool 45 to 47 can be oriented or positioned relative to the first body 2 by a combination of the movements of the second body 8 and the third body 10.

Hereby, the second driving means 29 move the third body 10 relative to the second body 8 and thus indirectly relative to the first body 2 as well.

The assembly 48 includes the first body 2, the second body 8 and the third body 10 can be considered as an assembly 48 of movable elements that has at least two degrees of freedom, with which the tools 45 to 47 are movably arranged relative to the first body 2.

The driving means 44 which includes the first driving means 28 and the second driving means 29 also have two degrees of freedom for driving the movable elements 8 and 10 and moving the tools 45 to 47 relative to the first body 2.

Just as in the previous embodiment, the purpose is that the tools 45 to 47 are movably arranged relative to the support wheels 3 and the first body 2 in such a way that a movement of the tools 45 to 47 relative to the first body 2 allows a tangent plane D-D'-D'', E-E'-E'' or F-F'-F'' on the relevant machining surface 18 or the relevant measuring surface 22 of such tool 45 to 47, to be brought adjoiningly against the wall 4 or surface against which the mechanism 1 supports.

An aforementioned tangent plane D-D'-D'', E-E'-E'' or F-F'-F'' will hereafter be referred to as the extended operating surface 49 of the relevant tool 45 to 47.

For the tools 46 and 47 and for the second tool 15 from the previous embodiment, which all have a flat measuring surface 22 or a flat machining surface 22, the extended operating surface 49 is simply the extension of the flat measuring surface or machining surface 22.

For the cylindrical machining surface 18 of the tool 45 or of the first tool 14 in the previous embodiment, the extended operating surface 49 is a tangent plane D-D'-D'' which is tangent to the cylindrical machining surface 18 as well as to the at least one support wheel 3 or the pair of support wheels 3, which is clearly illustrated in FIG. 13, for example.

In the embodiment of FIGS. 13 to 15 the mechanism 1 is also provided with control means, which are not shown in the figures, for controlling the driving means 44 and the tools 45 to 47.

Just as in the previous embodiment, the control means are such that, when the mechanism 1, with the support wheels 3, is supported on the wall or surface 4 in a fixed position, the tools 45 to 47 of the mechanism 1 can be brought, using the driving means 44, alternately with the aforementioned tangent plane D-D''-D', E-E''-E', F-F'-F''' on their relevant machining surface 18 or their relevant measuring surface 22 adjoiningly against the wall 4 or surface The purpose is again that the relevant tools 45 to 47 are alternately centred on a same surface section 19 of the wall or surface 4 that is located at a fixed distance U from the at least one support wheel 3. The tools 45 are each activated to 47 to operate on the surface section 19.

In the example shown in FIGS. 13 to 15 this is realised by executing the third body 10 as a revolver 50 on which the tools 45 to 47 are fixedly provided and which is rotatably mounted around the shaft QQ' on the second body 8, whereby second driving means 44 in the form of an electric motor drive the revolver for a rotation thereof around the shaft QQ' relative to the second body 8.

Every tool 45 to 47 hereby has a machining surface 18 or a measuring surface 22 which on the level of a point of tangency, the points of tangency H, I and J respectively, is tangent to one and the same base 51 of a conus 52 which is perpendicular to the rotation shaft QQ'.

This rotation shaft QQ' around which the third body 10 or the revolver 50 rotates around the second body 8, forms the central shaft QQ' of the conus 52.

The aforementioned points of tangency H, I and J are hereby rotationally symmetrically arranged around the rotation shaft QQ', whereby the relevant rotational symmetry is of a certain order n.

This order n is equal to the number of tools 45 to 47 mounted on the revolver and thus the order n in this case equals 3.

According to the present disclosure, the second driving means 29 can position the third body 10 or the revolver 50 in different positions which are rotated over a fixed angle $\alpha$ or a plurality thereof relative to each other, whereby the fixed angle $\alpha$ in this case corresponds with an angle $\alpha_0$ of the rotational symmetry equal to a full revolution divided by the order n of the rotational symmetry ($\alpha_0=360°/n$).

In every aforementioned position one of the tools 45 to 47 is always positioned and oriented such that a tangent plane D-D'-D'', E-E'-E'' or F-F'-F'' on the machining surface 18 or the measuring surface 22 of the relevant tool 45, 46 or 47, hereafter referred to as the extended operating surface 49 of that tool 45, 46 or 47, also extends tangentially to the at least one support wheel 3 or pair of support wheels 3.

The operation of such embodiment of a mechanism 1 according to the present disclosure is completely similar to the operation of the embodiment of FIGS. 1 to 12 and the steps 1 to 8 as described above can in essence be applied again.

The difference is mostly in the fourth step, more specifically in that the tools 45 to 47 on the third body 10 are interchanged by a rotation of the revolver 50 with the second driving means 29 around a rotation shaft QQ' which this time is not parallel to the central shaft AA' of the support wheels 3.

Bringing the tools 45 to 47 to, and removing the tools 45 to 47 again from, the surface or wall 4 is still done with the first driving means 28, in accordance with the steps one, three, five and seven described above.

FIGS. 16 to 20 show another embodiment of a mechanism 1 according to the present disclosure.

The mechanism 1 again contains a first body 2 intended to being attached to a telescopic section 41 and in which support wheels 3 are rotatably attached around a central shaft AA' such that the section is able to support on a wall or surface 4 via the support wheels 3.

A second body 8 is also rotatably mounted around the central shaft AA' and the mechanism 1 also comprises a third body 10 which is movably arranged relative to the second body 10.

However, this time the third body 10 is attached movably reciprocatingly (or up and down) to the second body 8.

To this end the third body 10 is suspended on two pins 53 which are provided on the second body 8 and which extend through an oblong groove 54 of the third body 10.

The mechanism 1 comprises second driving means 29 for moving the third body 10 reciprocatingly over the second body 8.

The driving means 29 contain a gearwheel 55 that is rotatably driven by an electric motor, which is not shown in the figures, and the gearwheel 55 engages in a toothing 56 which is provided on the third body 10, whereby the third body 10 is thus executed as a gear rack 57.

In the example shown, the mechanism 1 contains two tools 46 and 47 which can each be a sensor for example, but there could also be more and of a different type.

These tools 46 and 47 are, as in previous embodiments of a mechanism 1 according to the present disclosure, all fixedly mounted on the third body 10, such that each relevant tool 46 and 47 can be oriented and/or positioned relative to the first body 2 by a combination of the movements of the second body 8 and the third body 10.

The second driving means 29 move the third body 10 relative to the second body 8 and thus also indirectly relative to the first body 2.

The tools 46 and 47 are located at a certain distance from each other and if more tools are provided, in some embodiments, they are mounted at a regular distance from each other on the third body 10.

The intention hereby is that the machining surfaces 18 or the measuring surfaces 22 of all relevant tools 46 and 47 (and possibly others) have a joint tangent plane E-E'-E", hereafter referred to as the extended operating surface 49 of the relevant tools 46 and 47, whereby the tangent plane E-E'-E" also extends tangentially to the at least one support wheel 3.

Figure 16:
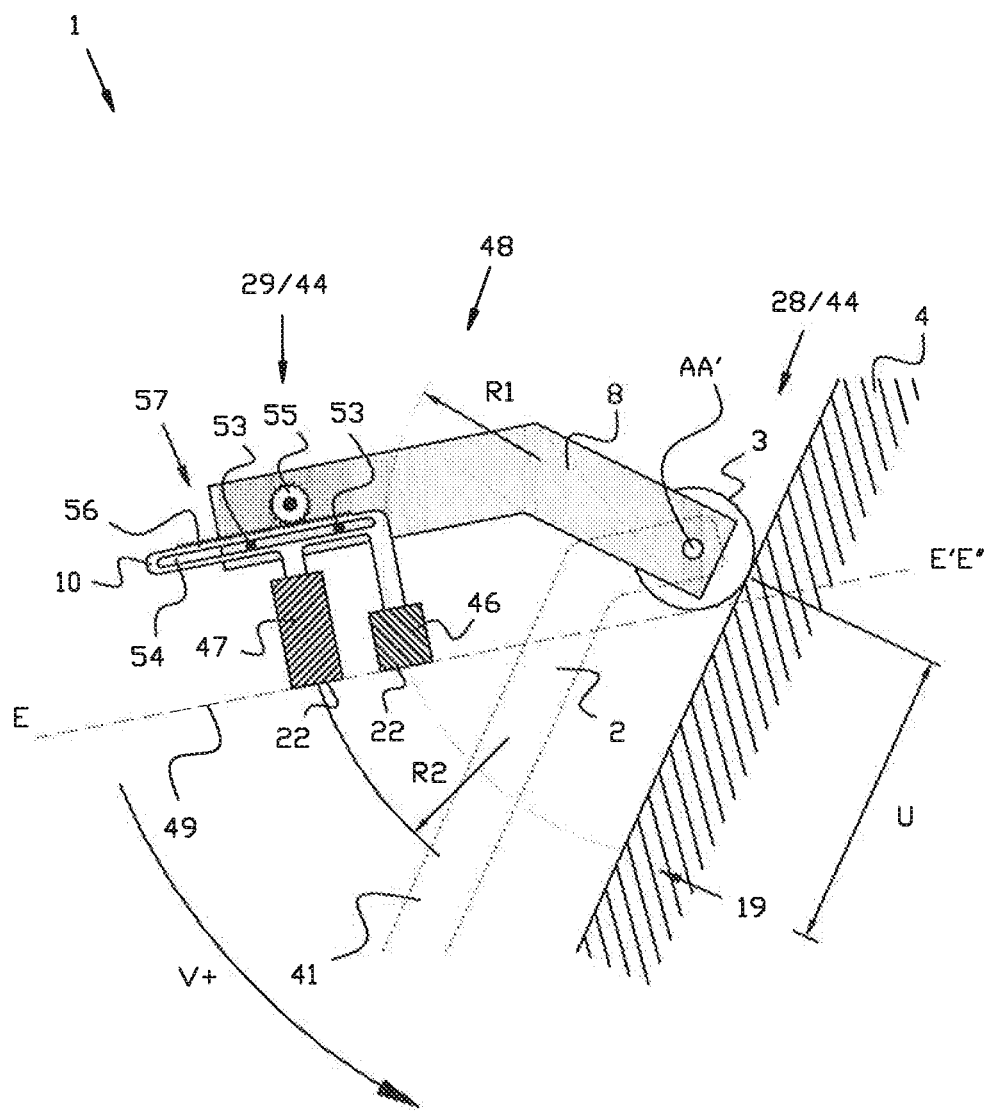
FIG. 16 schematically shows a side view of yet another embodiment of a mechanism according to the present disclosure.

This is clearly illustrated in FIG. 16 for example.

In this FIG. 16 the second body 8 and the third body 10 which bears the tools 46 and 47 are brought by the first driving means 28 in a position away from the surface or wall 4 and the tool 46 is in an operational position at a radial distance R1 from the central shaft AA' of the support wheels 3, whereas the other tool 47 is in a non-operational position at a distance R2 from the central shaft AA'.

By rotating the second body 8 with the first driving means 28 according to the arrow V+ over a certain angle around the central shaft AA', the tool 46 is brought against the wall or surface 4, such that it can operate on a surface section 19 at a certain distance U from the support wheel 3.

Figure 17:
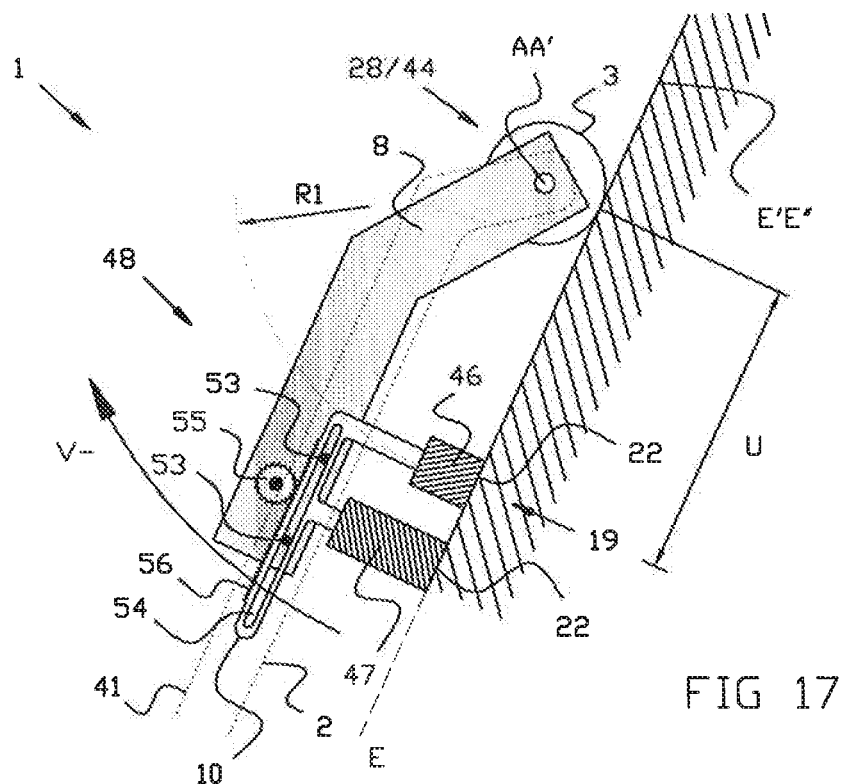
FIG. 17 shows the mechanism in FIG. 16 in a position during operation thereof.
Figure 18:
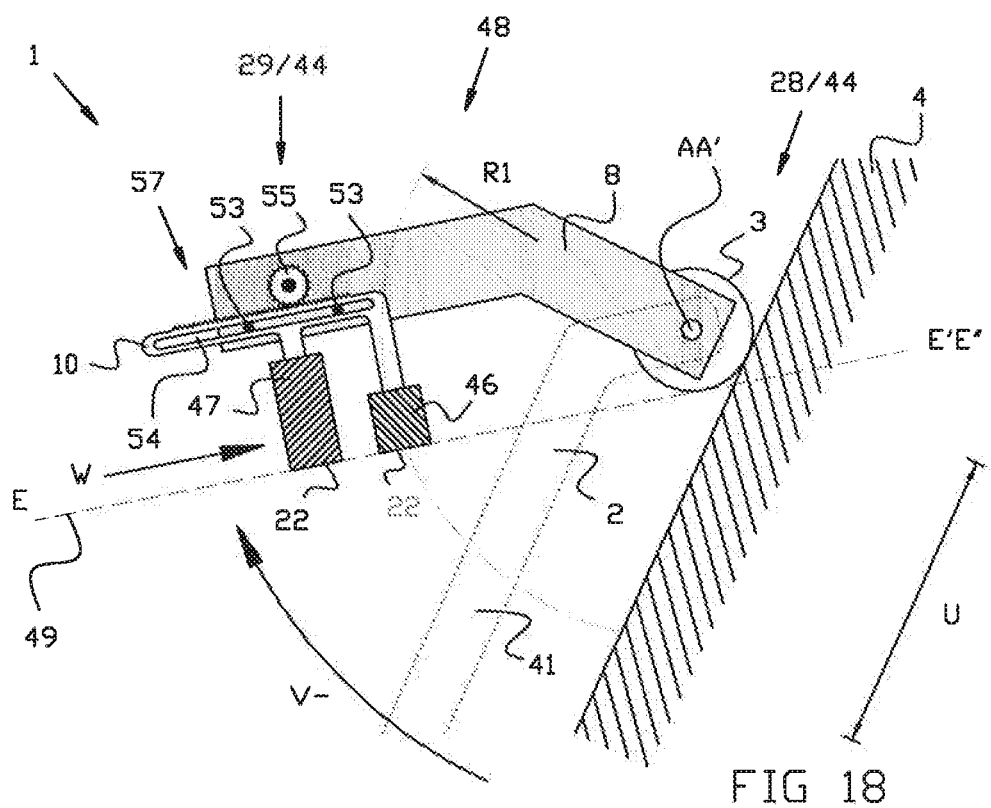
FIG. 18 shows the mechanism in FIG. 17 in a consecutive position during operation thereof.

This position is shown in FIG. 17. After performing the measurement or operation on the surface section 19 with the tool 46, a reverse movement according to the arrow V− brings the mechanism 1 back in the original position, which is shown in FIG. 18.

In a next step the second driving means 29 move the third body 10 radially to the central shaft AA' according to the arrow W over a distance R2-R1 by rotating the gearwheel 55 accordingly and moving the gear rack 57.

Thus the tool 47 is brought from a non-operational position at a radial distance R2 to an operational position at a radial distance R1, whereas the tool 46 is brought in a non-operational position closer to the central shaft AA'.

Figure 19:
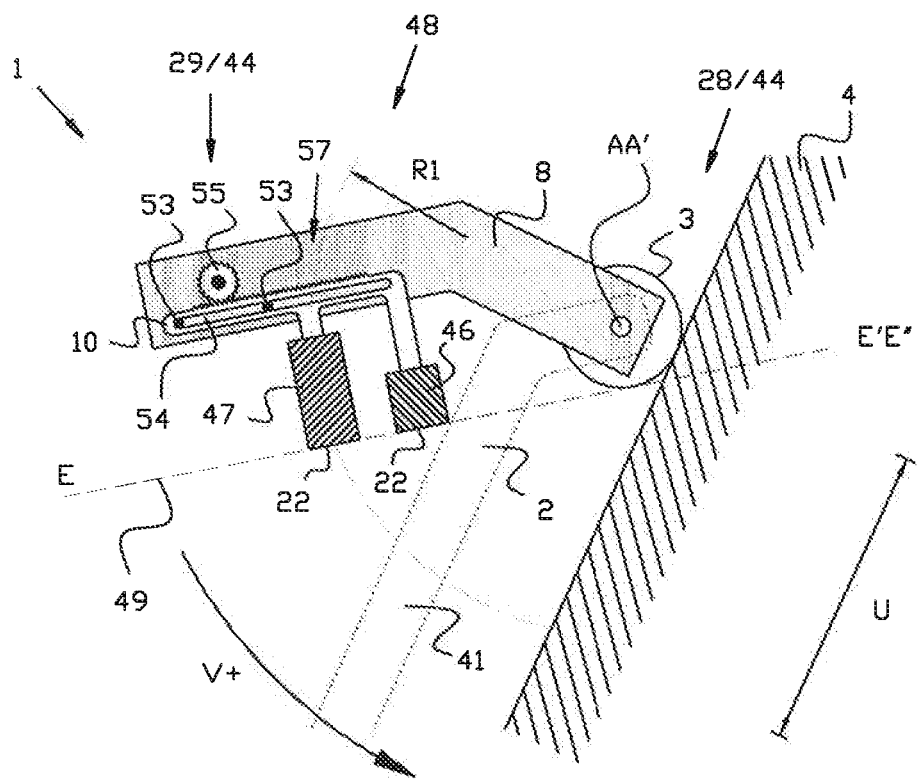
FIG. 19 shows the mechanism in FIG. 18 in consecutive position during operation thereof.
Figure 20:
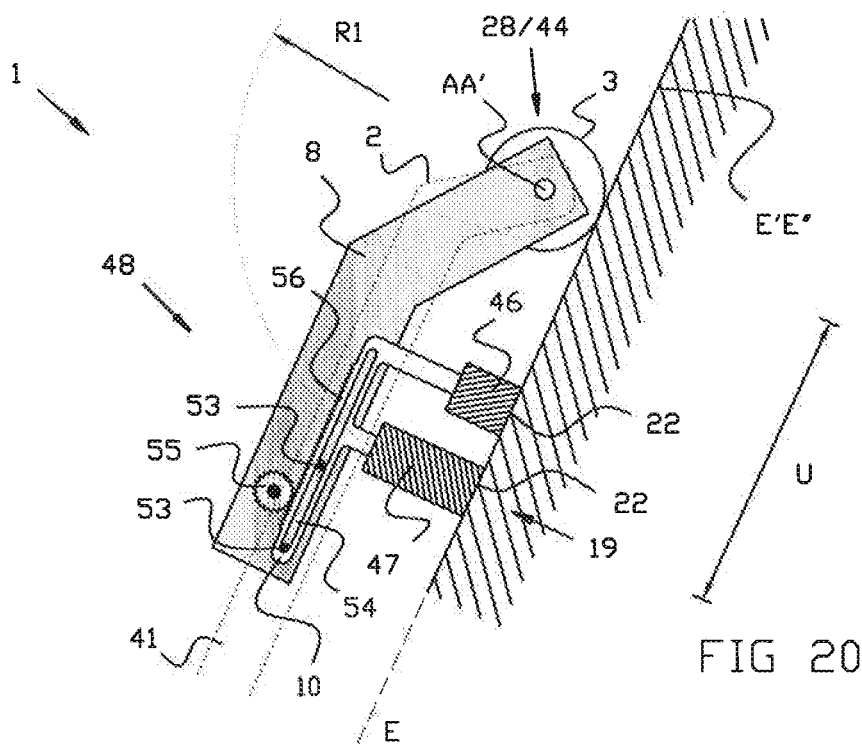
FIG. 20 shows the mechanism in FIG. 19 in consecutive position during operation thereof.

This is shown in FIG. 19.

Finally, a rotation of the second body 8 relative to the first body 2 with the first driving means 28 according to the arrow V+, brings the tool 47 against the wall or surface 4 to operate on the same surface section 19 at a distance U from the support wheel 3.

In some embodiments, the intention is that the mechanism 1, for performing the steps, is provided with control means which depending on the design can control to a greater or lesser extent automatically the driving means 44 and tools 46 and 47 for performing the steps.

FIGS. 21 to 25 illustrate yet another embodiment of a mechanism 1 according to the present disclosure.

This time the mechanism 1 again comprises an assembly of elements 48 with two degrees of freedom which comprises a second body 8 that is rotatably attached to a first body 2, more specifically around a central shaft AA' of support wheels 3, as well as a third body 10 which is rotatably attached to the second body 8 around a rotation shaft BB' which is parallel to the central shaft AA' of the support wheels 2.

In this case a first tool 14 is an ultrasound sensor 21 and the first tool 14 is fixedly mounted on the second body 8, such that it can only be oriented or positioned by movement of the second body 8 under the driving force of the first driving means 28, which in this case are of a same type as in FIG. 1, but this does not necessarily have to be the case.

A tangent plane D-D'-D" on the relevant measuring surface 22 of the first tool 14 is tangent to the support wheels 3 of the mechanism 1 and again forms a so-called extended operating surface 49 of the relevant tool 14.

Further, the example shown has only one other second tool 15 in the form of a grinding wheel or sanding disk 17 which is fixedly mounted on the third body 10.

This second tool 15 can thus be oriented or positioned relative to the first body 2 by a combination of the movements of the second body 8 and the third body 10, realised by means of first driving means 28 and second driving means 29 respectively, which are also executed as shown in FIG. 1.

Figure 21:
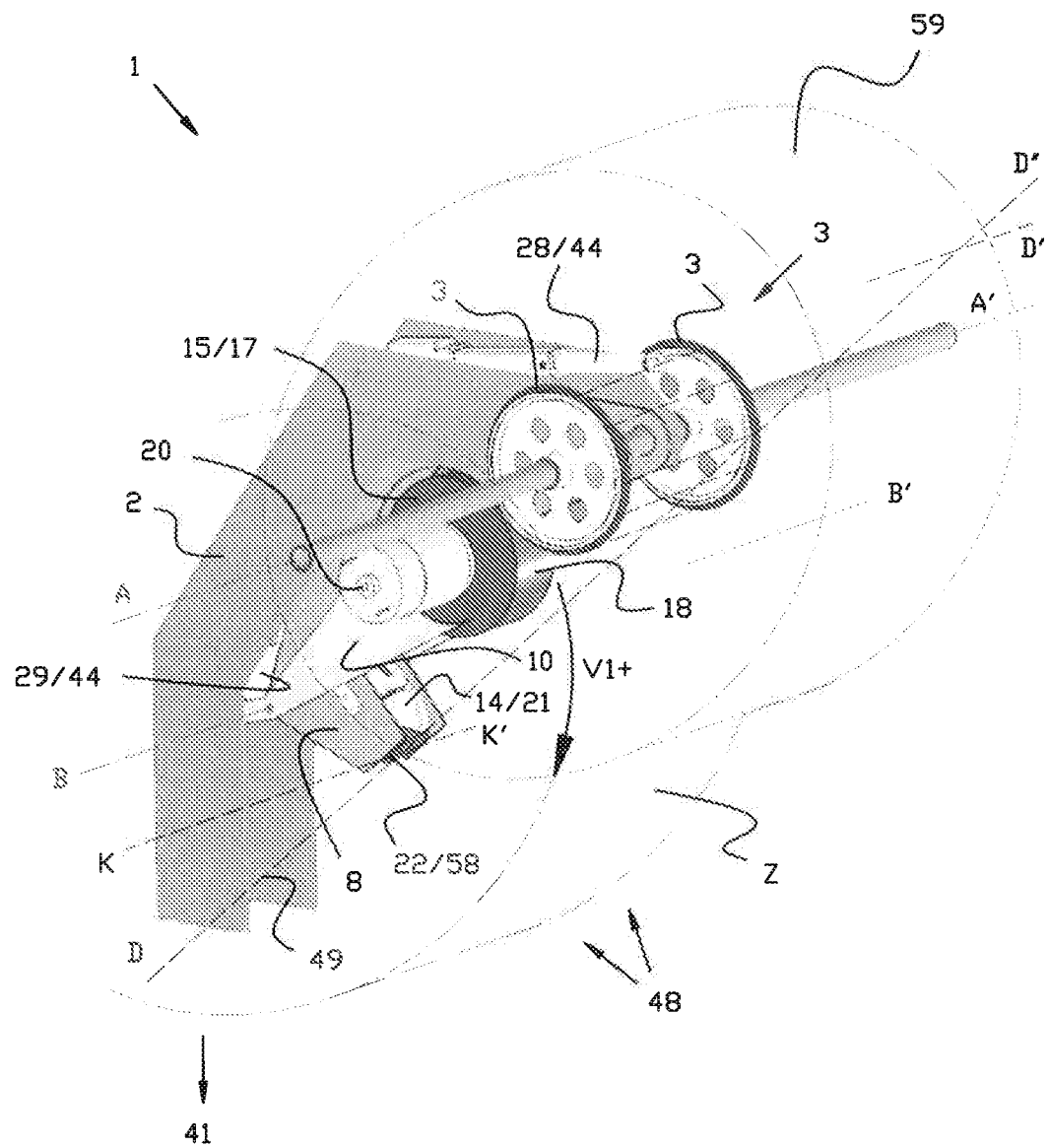
FIG. 21 shows a perspective view another embodiment of a mechanism according to the present disclosure.
Figure 22:
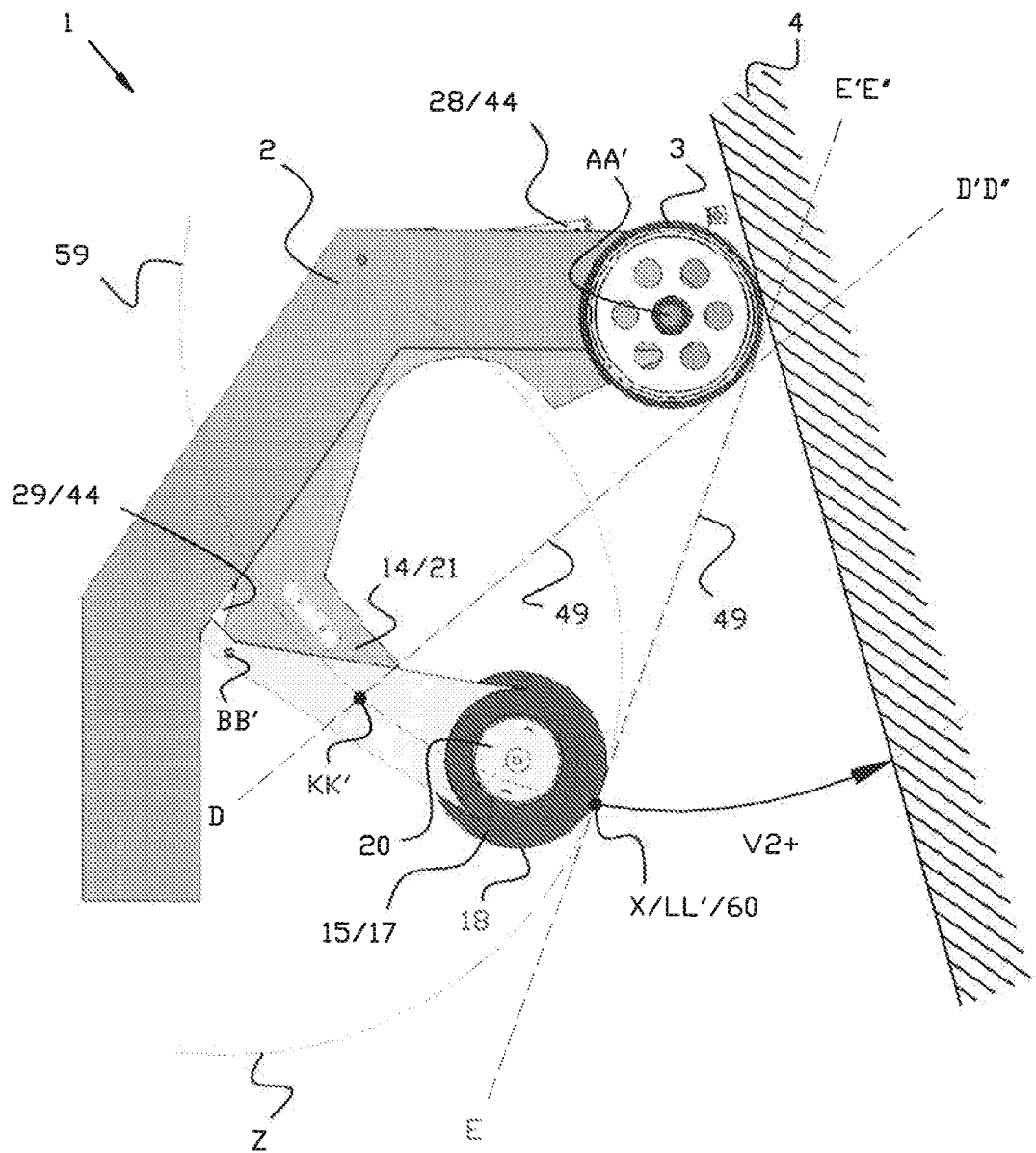
FIG. 22 illustrates the mechanism from FIG. 21 in a consecutive position during the operation thereof.
Figure 23:
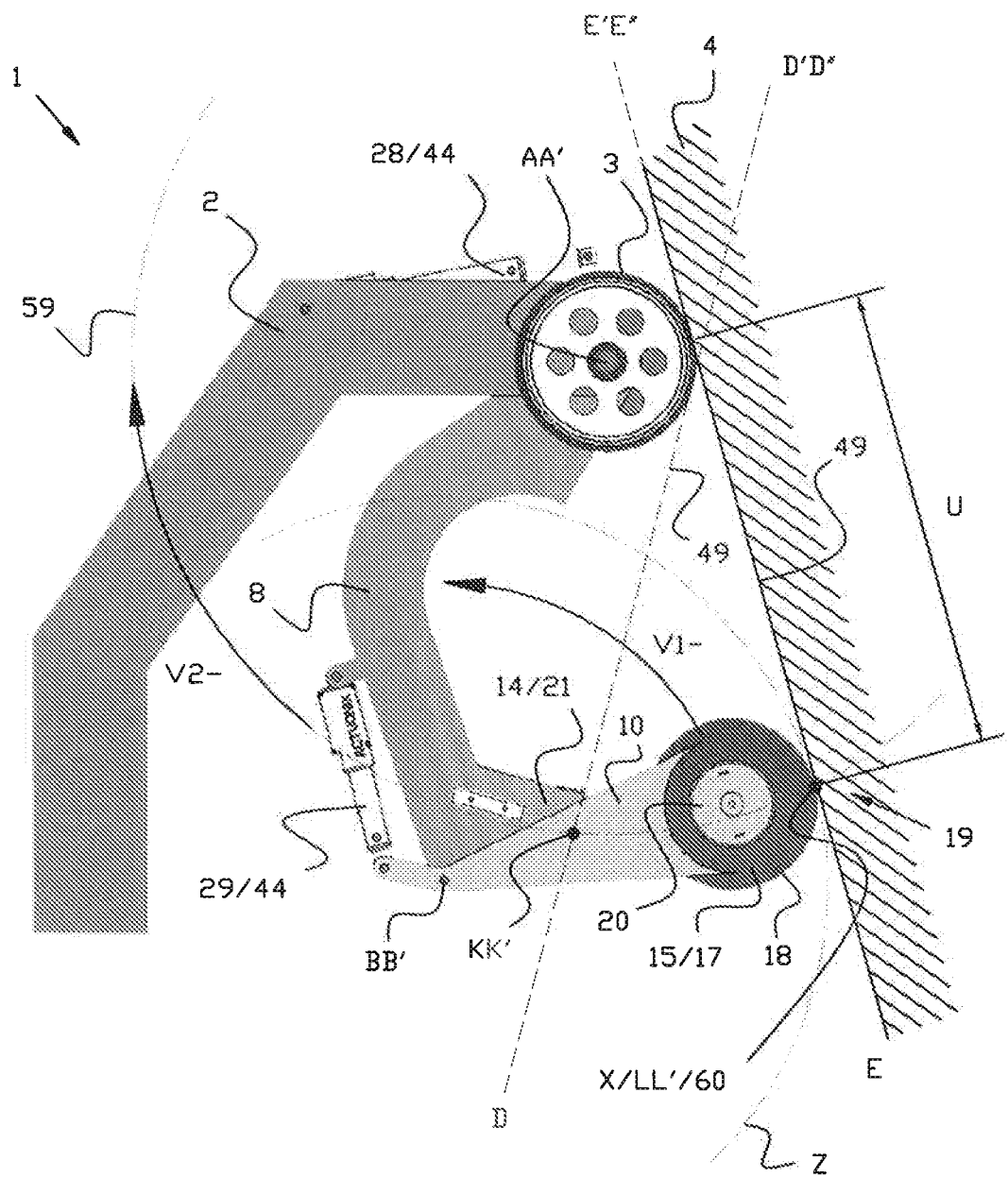
FIG. 23 illustrates the mechanism from FIG. 22 in a consecutive position during the operation thereof.
Figure 24:
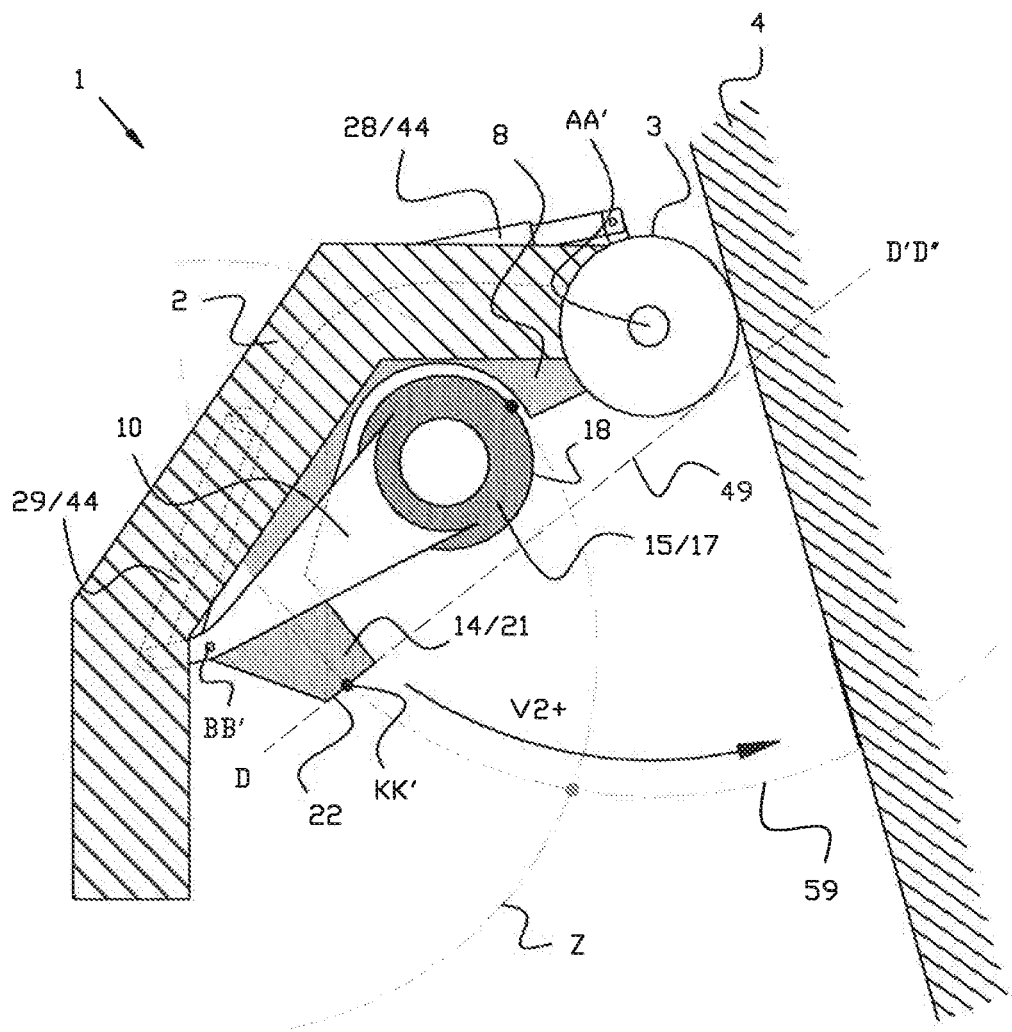
FIG. 24 illustrates the mechanism from FIG. 23 in a consecutive position during the operation thereof.
Figure 25:
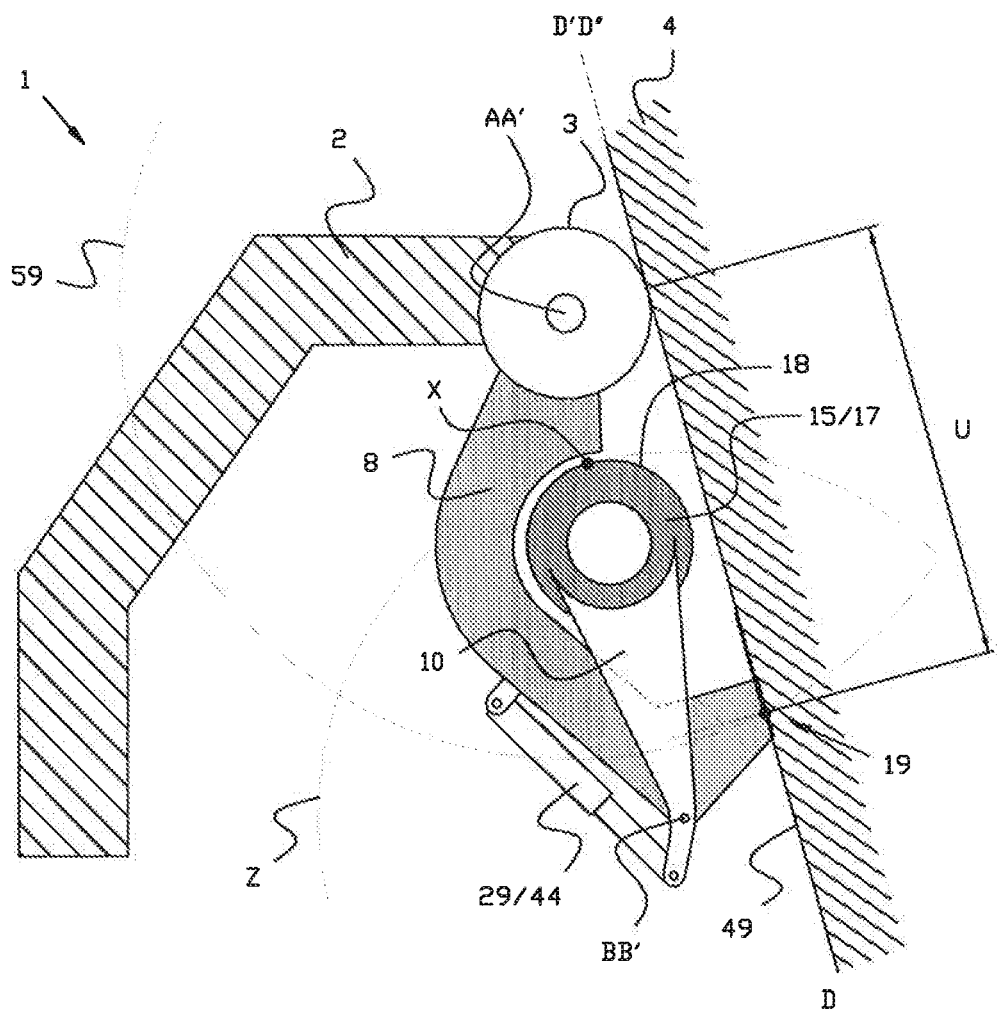
FIG. 25 illustrates the mechanism from FIG. 24 in a consecutive position during the operation thereof.

A rotation of the third body 10 relative to the second body 8 can move the second tool 15 between a retracted position, which is shown for example in FIGS. 21, 24 and 25, and an operational position, which is shown in FIGS. 22 and 23.

In the retracted position of the second tool 15, the extended operating surface 49 of the first tool 14 can be brought without obstruction adjoiningly against the wall or surface 4, against which the mechanism 1 supports with the support wheels 3.

In an operational position of the second tool 15 a tangent plane E-E'-E" extends tangentially to the measuring surface 22 of the second tool 15 on the support wheels 3, whereby such tangent plane E-E'-E" which is also tangential to the support wheels 3 is called the extended operating surface 49 of the second tool 15.

On the one hand, a centreline KK' of the section 58 of the extended operating surface 49 or tangent plane D-D'-D" of the first tool 14 which coincides with the measuring surface 22 or the machining surface 18 thereof, forms a descriptive line which upon movement of the second body 8 around the central shaft AA' of the support wheels 3 describes a cylindrical ruled surface 59.

This section 58 of the extended operating surface 49 is in this case the entire measuring surface 22 of the first tool 14, as the relevant measuring surface 22 is flat and fully encompassed by the extended operating surface 49.

On the other hand, the second tool 15 has a machining surface 18 or a measuring surface 22 which on the level of a tangent X is tangential to a cylinder surface Z which has the rotation shaft BB' of the third body 10 for rotation around the second body 8 as central shaft.

In the operational position, the extended operating surface 49 of the second tool 15 intersects the cylindrical ruled surface 59 on the level of a tangent X which also forms a centreline LL' of the section 60 of the extended operating surface 49 which coincides with the measuring surface 22 or the machining surface 18 of the second tool 15.

In the example shown, the aforementioned section 60 only comprises the tangent X or centreline LL' itself, as the machining surface 18 of the grinding wheel or sanding disk 17 is cylindrical and only on the level of a line X coincides with the extended operating surface 49.

In some embodiments, other tools can be applied, the measuring surface 22 or machining surface of which is entirely different, and comprises several discrete sections, for example, or includes a combination of flat and curved sections and the like, for example.

The operation of a mechanism 1 as shown in the FIGS. 21 to 25 is very similar to that of the previous embodiments and as follows.

FIG. 21 shows a condition of the mechanism 1 whereby the second tool 15 is brought in a retracted position using the second driving means 29 by a rotation of the third body 10 relative to the second body 8 around the rotation shaft BB' and whereby the second body 8 is brought in a position close to the first body 2 using the first driving means 28 by a rotation around the central shaft AA' of the support wheels 3.

To be able to first perform a sanding or grinding operation with the second tool 15, the second tool 15 is first brought in an operational position with the second driving means 29, which is shown in FIG. 22, by a rotation around the rotation shaft BB' according to the arrow V1+.

In a next step, the second tool 15 is brought to the wall or surface 4 on the level of a surface section 19 at a distance U from the location where the support wheels 3 support on the wall or surface 4 by performing a rotation of the second body 8 relative to the first body 2 around the central shaft AA' with the first driving means 28, indicated with the arrow V2+0.0

The obtained position is shown in FIG. 23. By activation of the second tool 15, the sanding or grinding operation can be performed on the level of the surface section 19.

In the following steps the initial condition, which is shown in FIG. 24, can be obtained again by performing a reverse movement according to the arrow V2− and thereafter a reverse movement according to the arrow V1−.

Finally, in a next step the first tool 14 is brought up against the wall or surface 4 by performing another rotation of the second body 8 relative to the first body 8 around the central shaft AA' according to arrow V2+, such that a measurement can be performed with the first tool 14 which in this case is an ultrasound sensor 21.

FIGS. 26 to 30 illustrate an alternative embodiment of a mechanism 1 according to the present disclosure which in a sense is a somewhat more sophisticated version of the embodiment illustrated in FIGS. 16 to 20.

Indeed, in this case it is ensured that only one tool 14 or 15 of the mechanism 1 at a time is brought into contact with the wall or surface 4, which was not the case in the embodiment of FIGS. 16 to 20, as in that embodiment all tools are always brought up against the wall or surface 4, but only those tools which are in an operational position are activated for performing an operation or measurement.

In the embodiment of FIGS. 26 to 30 discussed here the second body 8 is again rotatably mounted around the central shaft AA' of the support wheels 3 on the first body 2 and the third body 10 is also attached movably to the second body 8 reciprocatingly (or up and down).

The third body 10 is hereby executed as a kind of cassette 61 which is movable reciprocatingly in a hollow section 62 of the second body 8 by means of second driving means 29 which in this case are executed reasonably similar to the embodiment of FIGS. 16 to 20, whereby a gear rack 57 of the third body 10 which moves over pins 53 of the second body 8 has a toothing 56 which engages on a gearwheel 55 which is rotatably provided on the second body 8.

Another important difference with the embodiment of FIGS. 16 to 20 is that all tools 14 and 15 of the mechanism 1, are mounted movably up and down (or reciprocatingly) with one end 63, which is executed as a kind of piston in the third body 10 of the mechanism 1 in oblong passages 64 provided in the cassette 61.

The tools 14 and 15 are thus not, as in the embodiment of FIGS. 16 to 20, fixedly provided on the third body 10.

The tools 14 and 15 are hereby executed as straight-guided followers 65 which can move up and down or reciprocatingly in the cassette 61 according to a direction MM' perpendicular to the direction NN' in which the third body 10 or the cassette 61 is movable relative to the second body 10 in the hollow section 62.

One free end 66 of the straight-guided followers 65 is cushioned against an undulated plane 67 of the second body 8 using springs 68.

This undulated plane 67 is such that, when a tool 14 or 15 is brought by a linear movement of the third body 10 or the cassette 61 relative to the second body 8 according to the direction NN' up to an operational position at a radial distance R1 from the central shaft AA' of the support wheels 3, according to an operational position, the extended operating surface 49 of the tool 14 or 15 forms a tangent plane D-D'-D" or E-E'-E" on the support wheels 3.

However, when a tool 14 or 15 is brought by a linear movement of the third body 10 or the cassette 61 relative to the second body 8 up to a certain radial distance R2, which differs from the operational radial distance R1, from the central shaft AA' of the support wheels 3, according to a retracted position, the relevant tool 14 or 15 in the third body 10 by supporting on the undulated plane 64, moves into a position whereby the extended operating surface 49 of the tool 14 or 15 shows a certain offset O relative to the aforementioned tangent plane D-D'-D" or E-E'-E" on the at least one support wheel 3.

Figure 26:
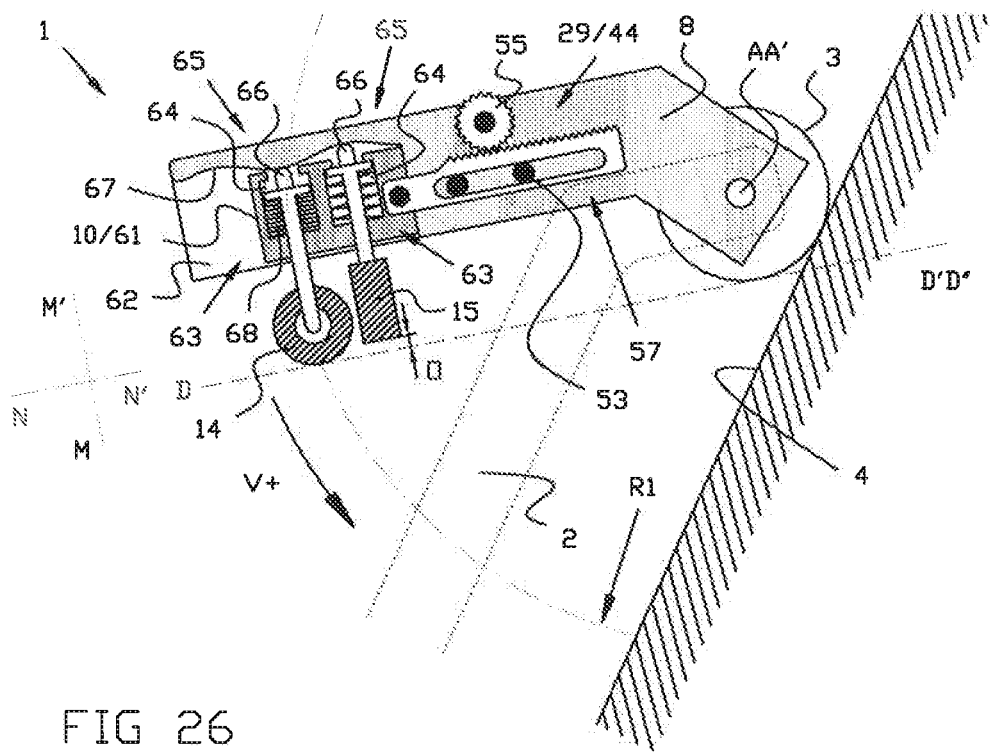
FIG. 26 schematically shows a side view of yet another embodiment of a mechanism according to the present disclosure.

All this is illustrated in FIGS. 26 to 30, whereby in FIG. 26 a first tool 14, which serves as grinding wheel or sanding disk 17, is in an operational radial position R1 and thus is brought by the undulated plane 67 into an outward position with the extended operating surface D-D'-D" tangent to the support wheels 3.

Figure 27:
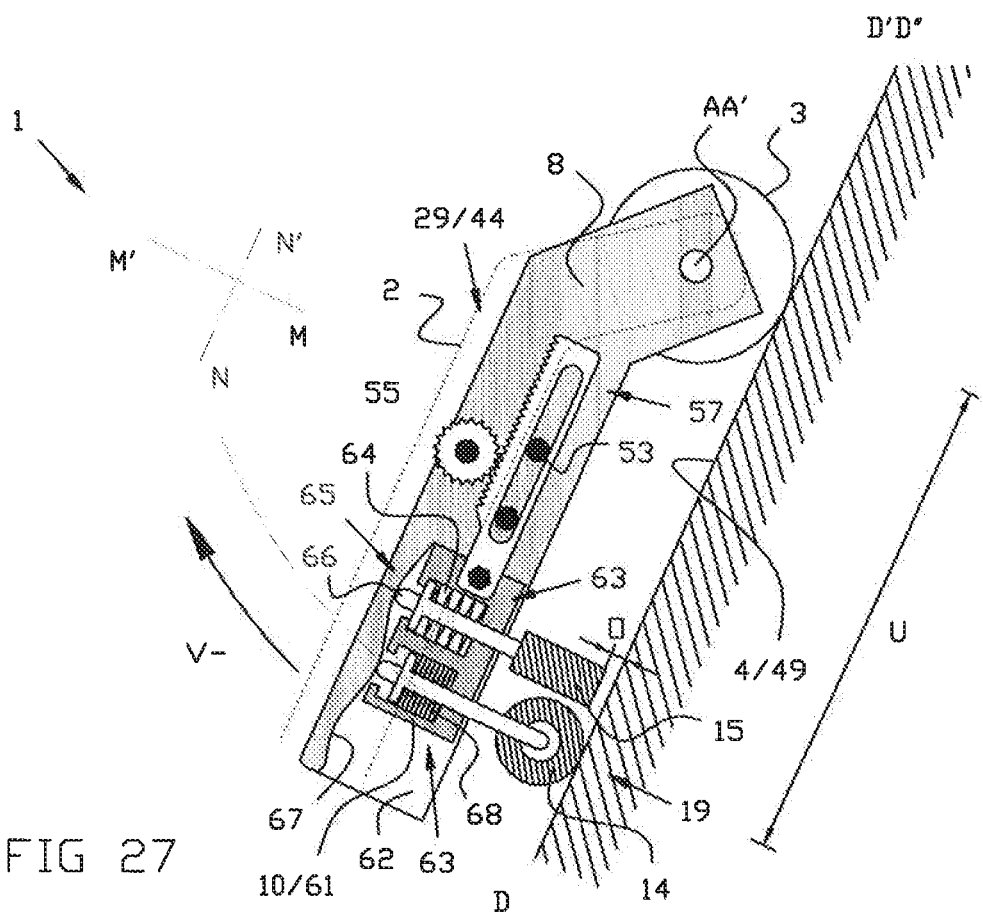
FIG. 27 shows the mechanism from FIG. 26 in a position during operation thereof.

By a rotation of the second body 8 relative to the first body 2 according to the arrow V+ using the first driving means 28, the tool 14 is brought against the wall or surface 4 to perform the sanding or grinding operation, which is shown in FIG. 27. Only the first tool 14 hereby comes into contact with the surface or wall 4.

Figure 28:
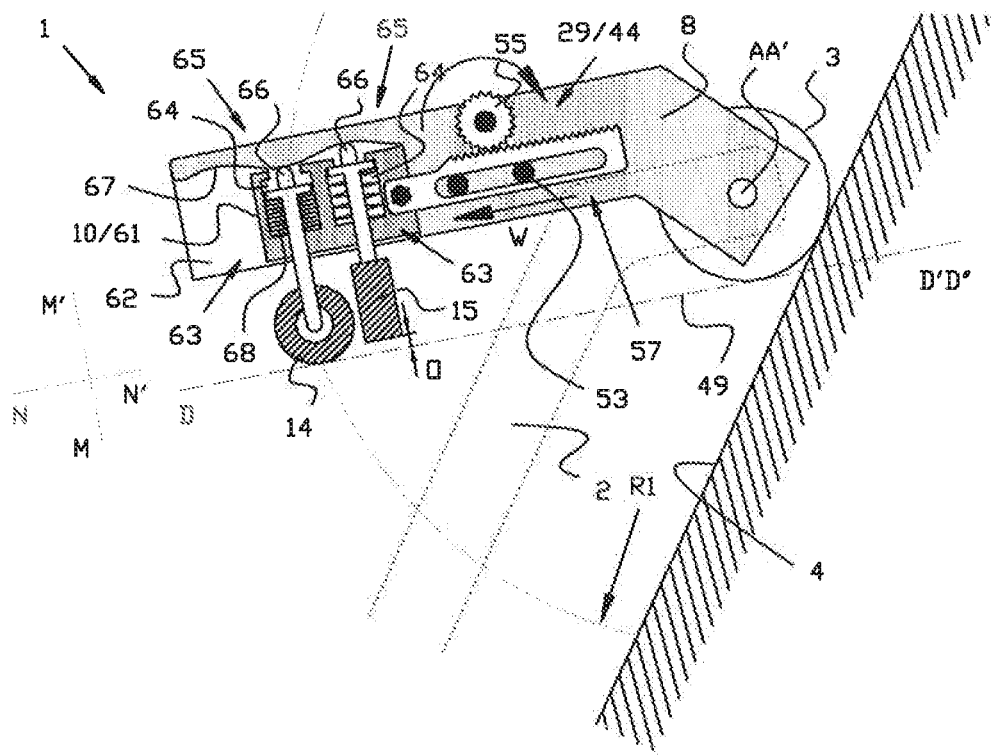
FIG. 28 shows the mechanism from FIG. 27 in a consecutive position during operation thereof.

The reverse movement according to arrow V− returns the tool 14 to the initial position, which is shown in FIG. 28.

In this position the second driving means 29 are activated to move the cassette 61 or the third body 10 somewhat outward according to the direction NN' out of the hollow section 62 in the second body 8, which is indicated with the arrow W in FIG. 28.

The first tool 14 is hereby brought from the operational radial position R1 to a non-operational position at distance R2 from the shaft AA', whereas the second tool 15, which serves as an ultrasound sensor 21, is brought this time to the operational radial position at a distance R1 from the shaft AA'.

The profile of the undulated plane 67 of the second body 8, against which the free ends 66 of the tools 14 and 15 which are executed as followers 65, support, moves the second tool 15 out of the cassette 61 into a position whereby the tangent plane E-E'-E" is tangent to the support wheels 3, whereas the first tool simultaneously moves inward into the cassette 61 into a position whereby its extended operating surface 49 shows an offset O relative to the aforementioned tangent plane E-E'-E".

Figure 29:
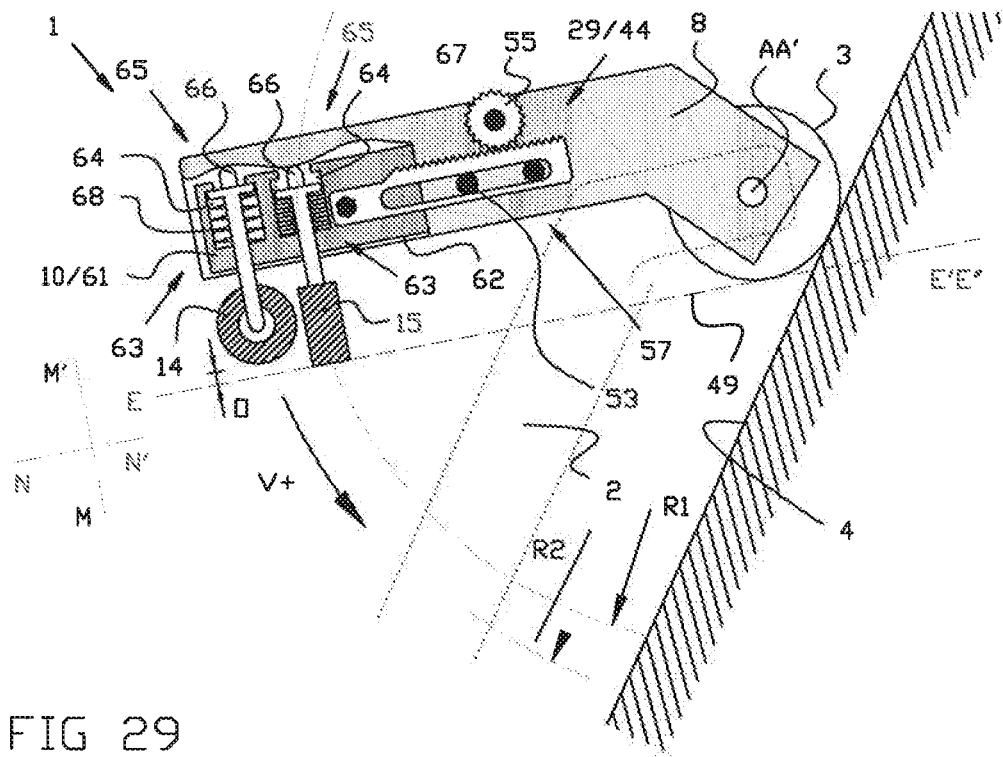
FIG. 29 shows the mechanism from FIG. 28 in a consecutive position during operation thereof.
Figure 30:
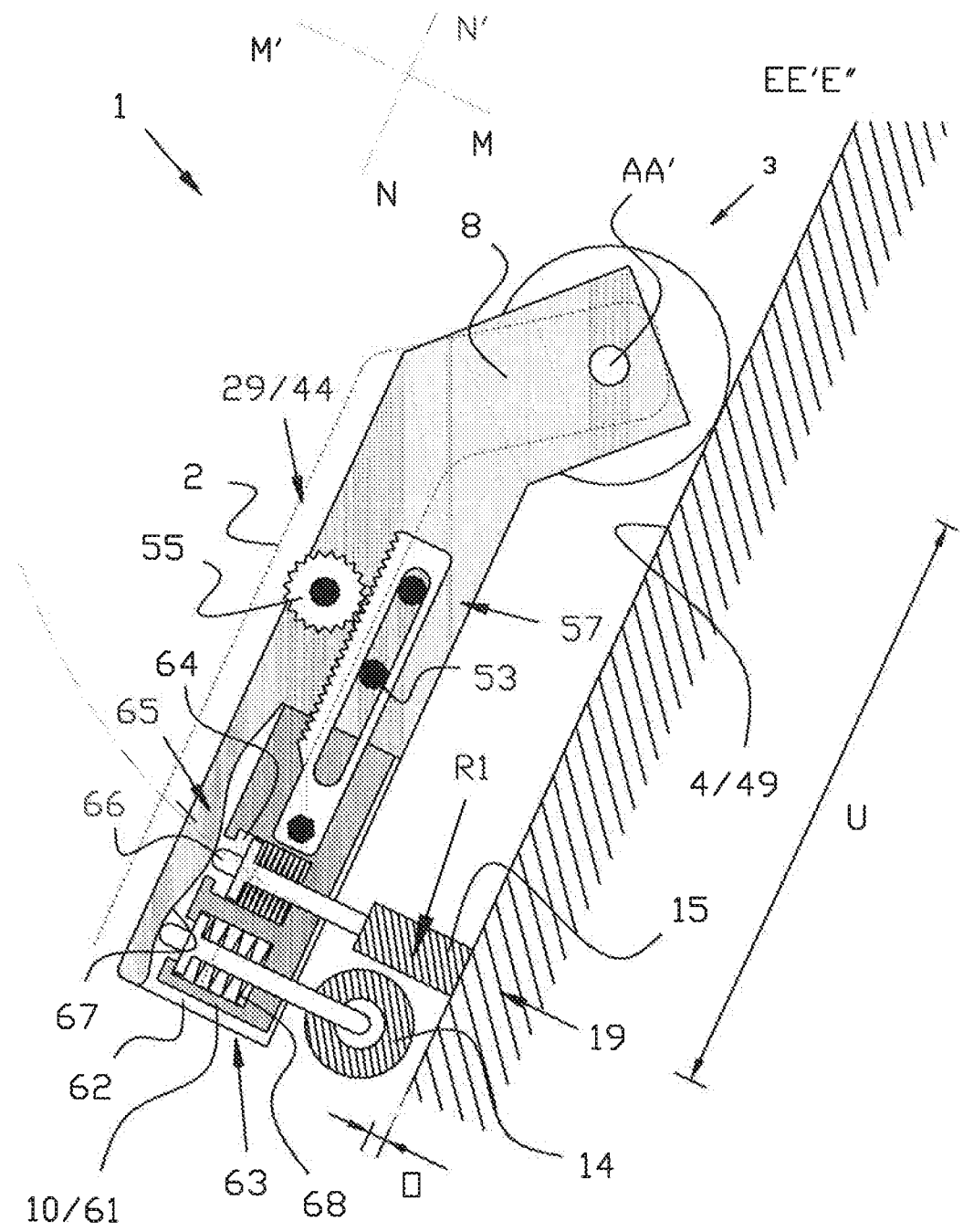
FIG. 30 shows the mechanism from FIG. 29 in a consecutive position during operation thereof.

This condition is shown in FIG. 29 and by a rotation according to arrow V+ of the second body 8 relative to the first body 2 the second tool 15 is this time brought against the wall or surface 4, whereas the first tool 14 does not make contact with the wall or surface. This condition is shown in FIG. 30.

FIGS. 31 to 34 show yet another embodiment of a mechanism 1 according to the present disclosure which in many aspects is different from the embodiments discussed above.

A first important aspect is that the mechanism 1 comprises a first body 2 in the form of a skeleton or frame 69 which this time, however, is provided with two pairs 70 and 71 of support wheels 3 which are rotatably mounted at a distance V from each other on the first body 2.

The first pair 70 of the pairs 70 and 71 of support wheels 3 is rotatable in the first body 2 around the central shaft AA' of the aforementioned at least one support wheel 3.

A second pair 71 of the pairs 70 and 71 of support wheels 3 is rotatable in the first body 2 around an additional central shaft PP' which is parallel to the aforementioned central shaft AA' of the first pair 70 of support wheels 3.

The intention is that the mechanism 1 with the two pairs 70 and 71 of support wheels 3 of the first body 2 (which form the support section 3 thereof) is supported on the surface or wall 4 and consequently the first body 2 is automatically oriented relative to the wall or surface 4.

Thus between the support points 72 to 75 of the support wheels 3 a bearing surface SS'S" is defined that coincides with the surface or wall 4 when the mechanism 1 is supported against the wall or surface 4.

An aspect of such embodiment of a mechanism 1 according to the present disclosure is that it is known beforehand to which plane SS'S" the extended operating surface 49 of the different tools 14, 15, etc. mounted thereon, needs to be brought and this regardless of the orientation of the wall or surface 4, which makes other forms of mechanisms 1 possible.

In all the previous embodiments of a mechanism 1 according to the present disclosure it was only known that the surface or wall 4 is always tangent to the at least one support wheel 3 during the support, but it was not known beforehand which angle the wall or surface 4 will make with the first body 2 during the support.

The mechanism 1 of FIGS. 31 to 34 still contains an assembly of elements 48 with two degrees of freedom which comprise a second body 8 and a third body 10 which are movably arranged relative to a first body 2 or support section 3.

The second body 8 is executed similarly as was the case for example in the embodiment of FIGS. 26 to 30, whereby the second body 8 is rotatable around the central shaft AA' of the first pair 70 of support wheels 3.

This time the third body 10 is directly but movably connected to the first body 2, whereby in this case the third body 10 is more specifically rotatable around the shaft PP' of the second pair 71 of support wheels 3.

Further, a first tool 14 is fixedly applied on the second body 8, such that it can only be oriented or positioned by a movement of the second body 8 around the shaft AA', whereas a second tool 15 is fixedly applied on the third body 10 and can only be oriented or positioned relative to the first body 2 by a movement of the third body 10.

A tangent plane D-D'-D" on the relevant machining surface 18 or the relevant measuring surface 22 of the aforementioned first tool 14 is hereby tangent to the first pair 70 of support wheels 3, and a tangent plane E-E'-E" on the relevant machining surface 18 or the relevant measuring surface 22 of the aforementioned second tool 15 is tangent to the second pair 71 of support wheels 3 of the mechanism 1.

The section that includes the second body 8, the first body 2 and the third body 10 is practically symmetrically executed relative to a bisection plane GG' perpendicular to the bearing surface S-S'-S" and in the middle between the shafts AA' and PP'.

The tools 14 and 15 are also mounted on the second body 8 and the third body 10 respectively in such a way that upon rotation up to the bearing surface SS'S" they are centred with their middle between the pairs 70 and 71 of the support wheels 3.

First driving means 28, which for example is an electric motor which is not shown in the figures, rotate the second body 8 relative to the first body 2 and second driving means 29, which for example is an electric motor which is not shown in the figures, directly move the third body 10 relative to the first body 2.

As illustrated in FIGS. 31 to 34, the first driving means 28 and the second driving means 29 are controlled by the control means of the mechanism 1 for a rotation of the second body 8 or the third body 10 respectively relative to the first body 2, such that the extended operating surface 49 of the first tool 14 and the extended operating surface 49 of the second tool 15 are alternately rotated into the bearing surface S-S'-S" of the mechanism 1.

Figure 31:
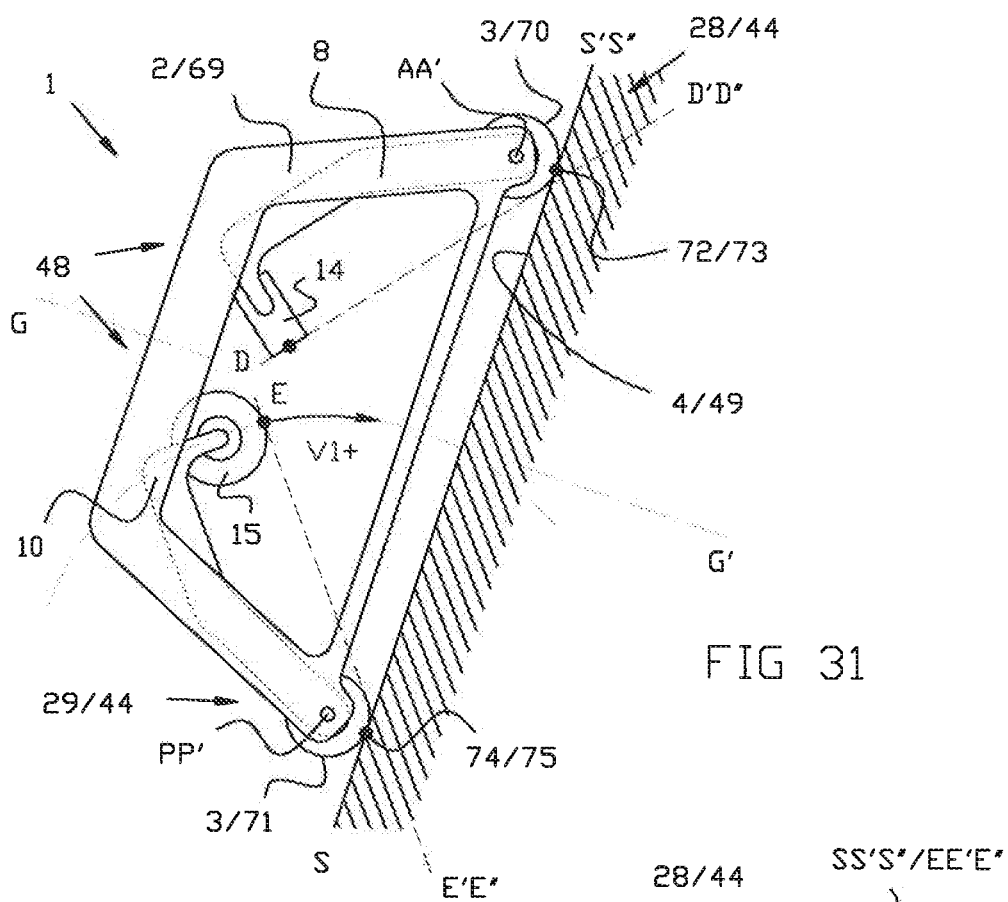
FIG. 31 schematically shows a side view of yet another embodiment of a mechanism according to the present disclosure in a position during operation thereof.

From a position shown in FIG. 31, whereby both tools 14 and 15 are rotated away from the bearing surface S-S'-S" into a retracted position, a rotation according to the arrow V1+ around the shaft PP' first brings the third body 10 with the second tool 15, which in this case assumes the role of a grinding wheel or sanding disk 17, to the bearing surface SS'S".

Figure 32:
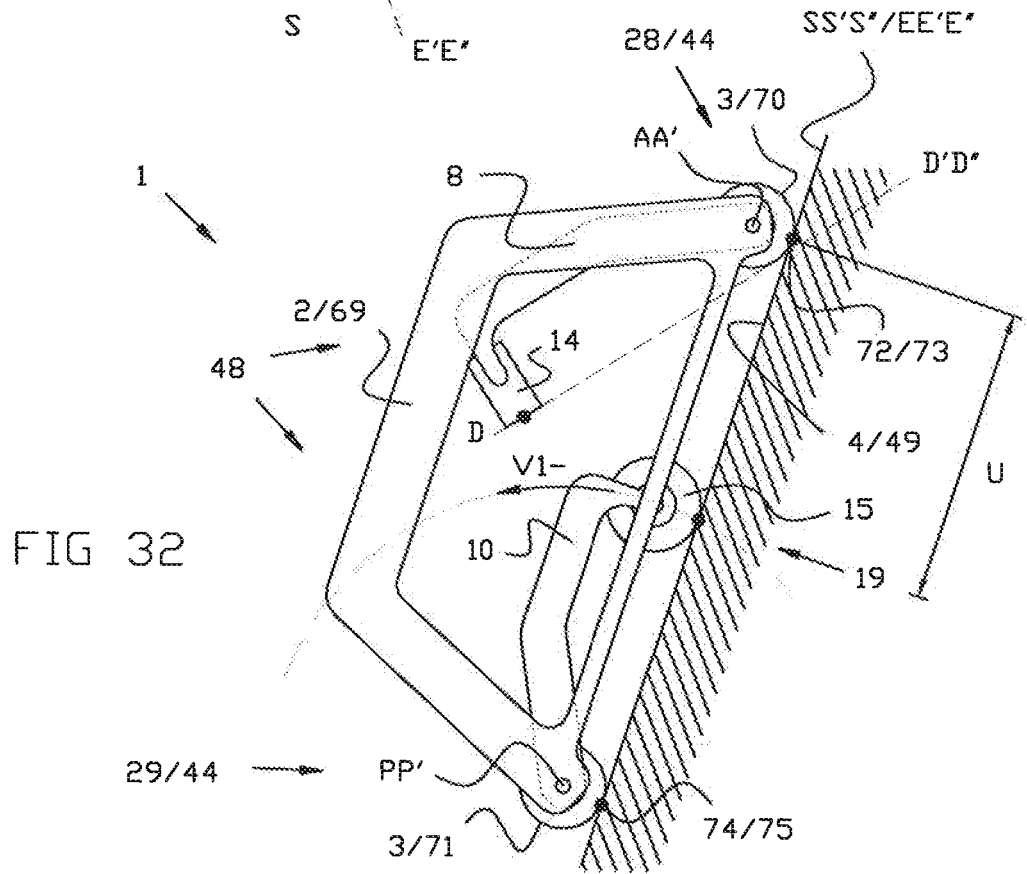
FIG. 32 schematically shows a side view of yet another embodiment of a mechanism according to the present disclosure in a consecutive position during operation thereof.
Figure 33:
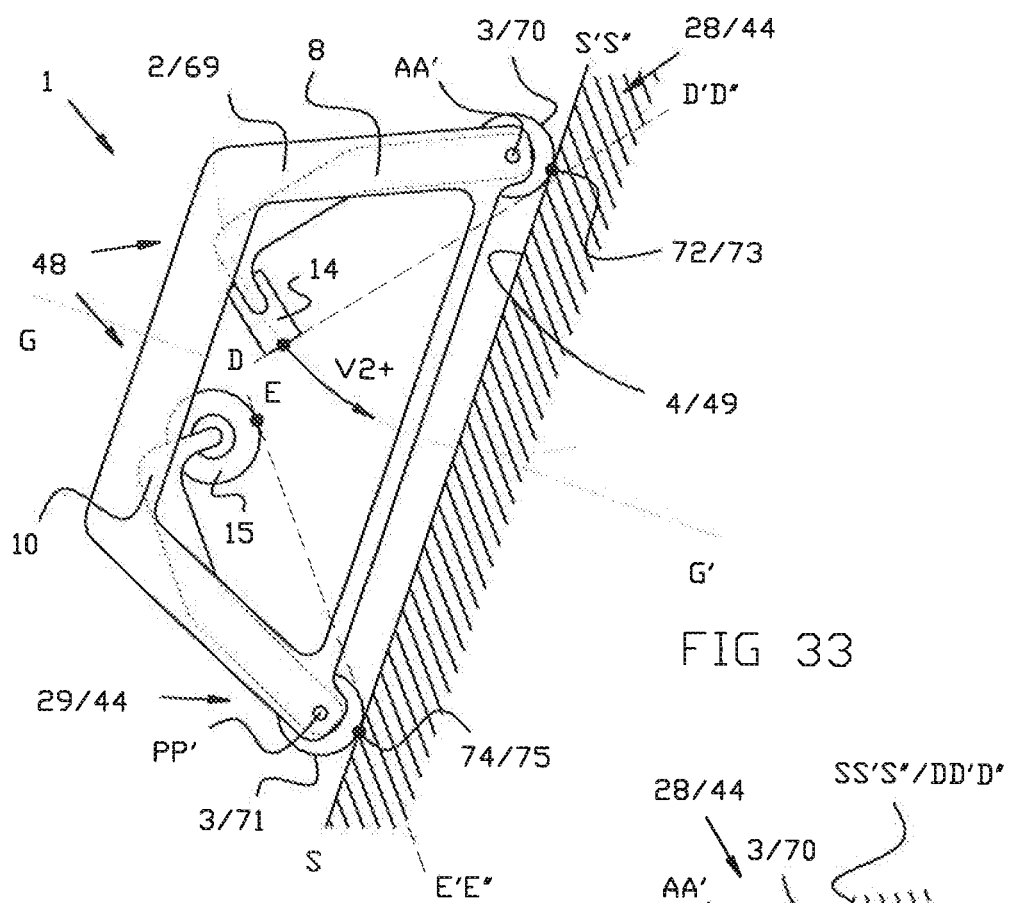
FIG. 33 schematically shows a side view of yet another embodiment of a mechanism according to the present disclosure in a consecutive position during operation thereof.
Figure 34:
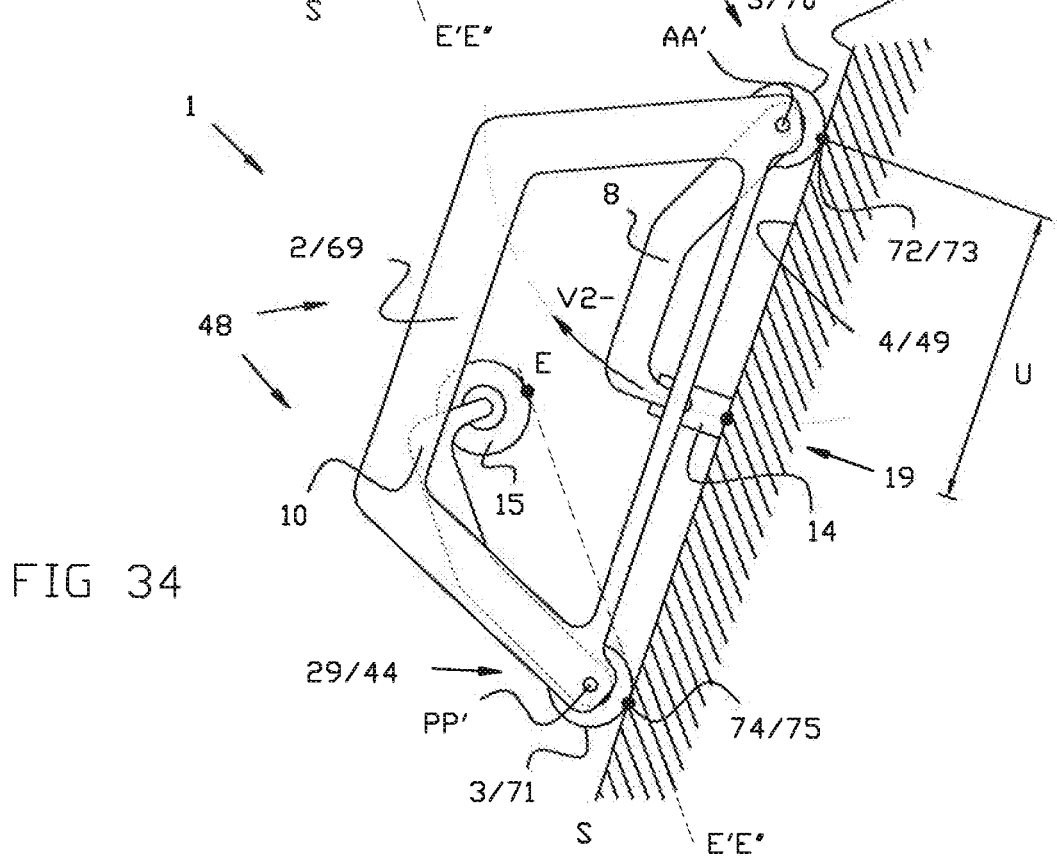
FIG. 34 schematically shows a side view of yet another embodiment of a mechanism according to the present disclosure in a consecutive position during operation thereof.

This condition is shown in FIG. 32, whereby the second tool 15 is centred and can operate on a surface section 19 which is located at a distance U from the pair 70 of support wheels 3 and by a reverse movement according to arrow V1− the tool 15 is brought back in the initial position, as shown in FIG. 33.

Finally, by performing a similar rotation of the second body 8 towards the bearing surface SS'S" according to arrow V2+, the first tool 14 can be brought up to the wall or surface 4 and a measurement with the sensor can be performed.

It is understood that such embodiment of a mechanism 1 according to the present disclosure is very simple and practical in use.

Figure 35:
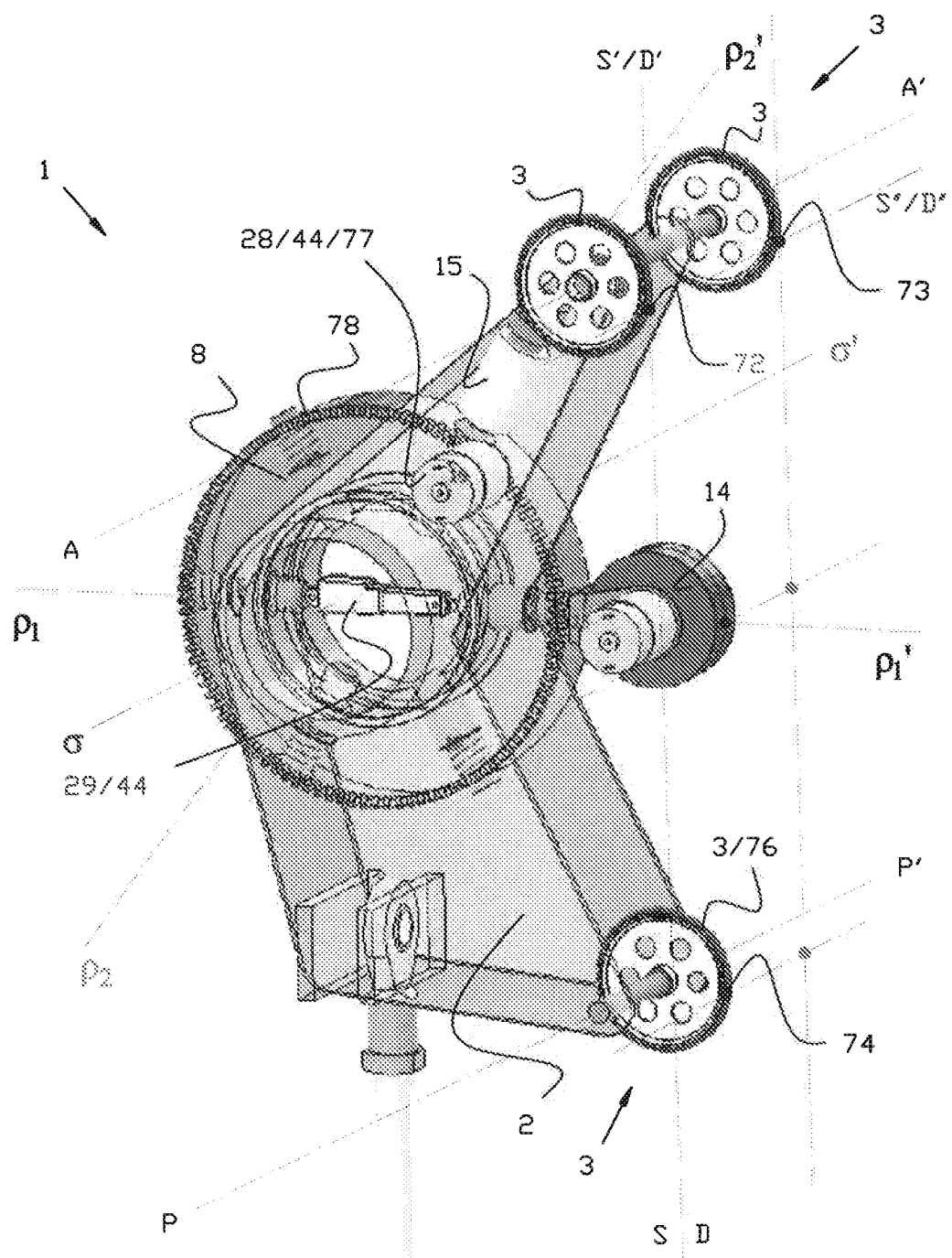
FIG. 35 shows a perspective side view of yet another embodiment of a mechanism according to the present disclosure.
Figure 36:
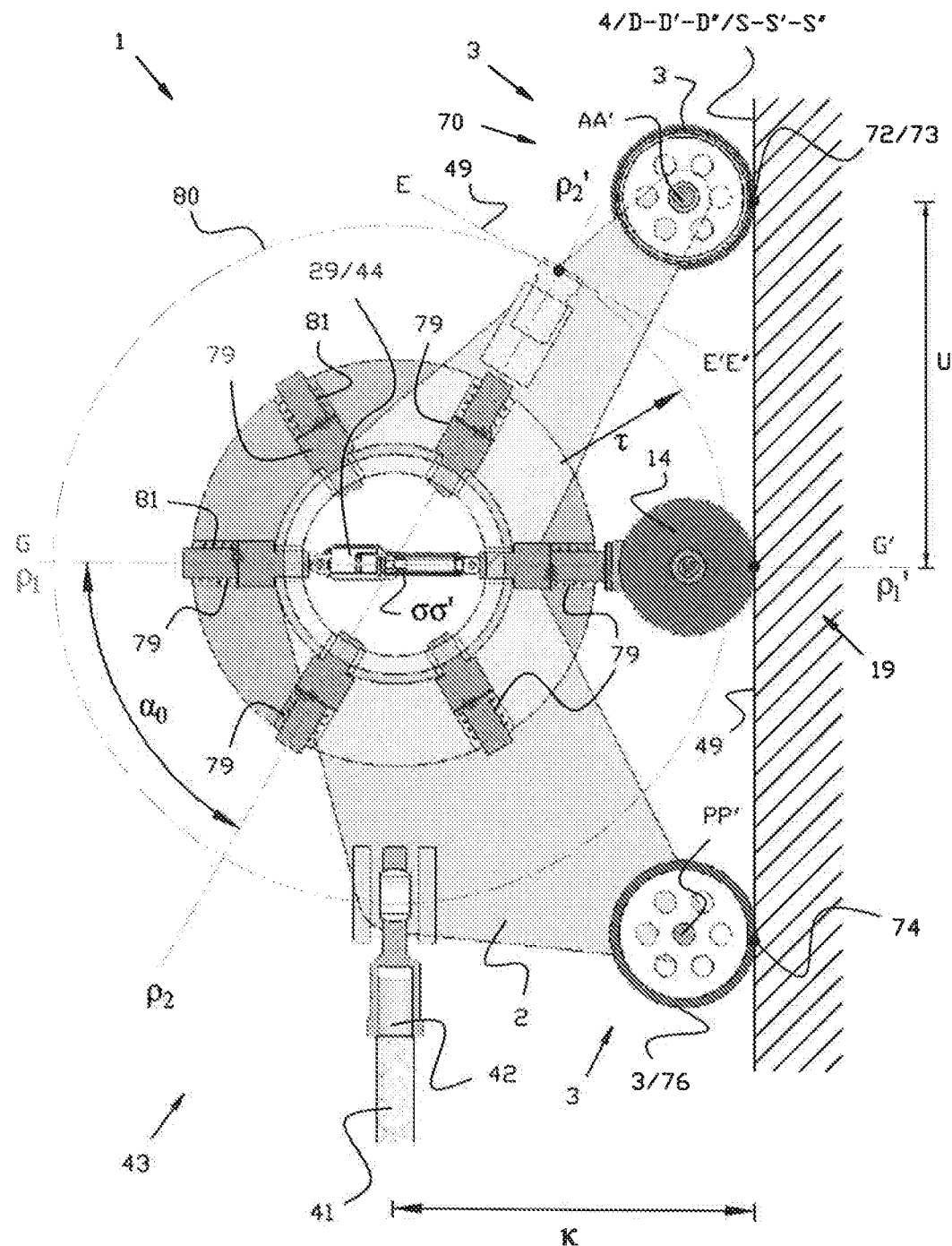
FIG. 36 shows a side view of the mechanism of FIG. 35 according to the present disclosure.

In FIGS. 35 and 36 yet another embodiment of a mechanism 1 according to the present disclosure is shown whereby its first body 2 is supported this time by a support section 3 with three support wheels 3, more specifically by a first pair 70 of support wheels 3, like in the previous embodiment and by an additional support wheel 76, whereby a first pair of support wheels 3 is again rotatable around a central shaft AA' in the first body 2 of the mechanism 1.

The additional support wheel 76 is rotatable around an additional central shaft PP' which is parallel to the aforementioned central shaft AA' of the first pair 70 of support wheels 3.

This embodiment of a mechanism 1 according to the present disclosure is also special, because it is only provided with a second body 8 and thus not an assembly of movable elements 48 with two degrees of freedom on or between which the tools 14, 15, etc. are applied and with which the tools 14, 15, etc. are moved, which was the case in the previous embodiments.

This time the second body 8 is executed cylindrically or in a ring-shaped way and mounted rotatably in the first body 2 around a central shaft σ-σ' which is parallel to the bearing surface S-S'-S" of the mechanism 1 and is located in the bisection plane GG' between the shafts PP' and AA'.

First driving means 28 drive the second body 8 for a rotation around the central shaft σ-σ' and includes an electric motor 77 which is mounted around the first body 2 and which drives a pinion which engages on a toothing 78 which is provided on the contour of the ring-shaped second body 8.

In the cylindrical second body 8, passages 79 are provided which are spread at regular distances from each other along the contour of the second body and which extend according to radial directions $\rho_1$-$\rho_1'$, $\rho_2$-$\rho_2'$, $\rho_3$-$\rho_3'$, etc. from the central shaft σ-σ'.

In two or several of the passages 79 (in this case two), tools 14 and 15 are mounted which are movable reciprocatingly according to the relevant radial directions $\rho_1$-$\rho_1'$, $\rho_2$-$\rho_2'$, $\rho_3$-$\rho_3'$, etc. between a retracted position more inward in the second body 8 and an extended position more outward from the second body 8.

In the retracted position of the tools 14 and 15, a tangent plane D-D'-D" or E-E'-E" on the machining surface 18 or measuring surface 22 of each tool 14 or 15 which is provided on the second body, tangent to a cylindrical body of revolution 80 which as central shaft also has the central shaft σ-σ' and whereby the radius τ of the cylindrical body of revolution 80 is less than the distance κ of the central shaft up to the bearing surface S-S'-S".

The tools 14 and 15 are cushioned using springs 81 in the passages 79 of the second body 8 to bring or hold them into a retracted position in the second body 8.

The mechanism 1 is also provided with second driving means 29 which are only attached to the first body 2 and which chiefly extend in the bisection plane GG' between the two shafts AA' and PP' of the support wheels 3 of the mechanism 1.

These second driving means 29 are linear driving means which can directly act on each one of the tools 14 and 15 for a linear outward and inward movement according to a perpendicular line perpendicular to the bearing surface S-S'-S" of the mechanism 1.

A tool 14 or 15 is hereby brought into an extended or operational position and a retracted position respectively.

In the case of FIG. 36 the tool 14 is in an operational, extended position, whereas the tool 15 is in a retracted position.

The mechanism 1 further has control means, which are not shown in the figures and which are such that they control the driving means 28 and 29 such that the tools 14 and 15 are alternately brought in the bearing surface S-S'-S" of the mechanism 1 with their extended operating surface 49 to operate on the level of a surface section 19 at a distance U from the pair 70 of support wheels 3.

This is realised more specifically by using the first driving means 28 to move the second body 8, from a condition in which all tools are in the retracted position, into a position whereby a tool 14 or 15 comes to be directly opposite the second driving means 29 and by using the second driving means 29 to push the relevant tool 14 or 15 via an outward movement from the retracted position into an operational position in the direction $\rho_1$-$\rho_1'$ of the bearing surface S-S'-S" for performing the relevant operation.

Thereafter, the relevant tool 14 or 15 is brought back in the retracted position via a reverse ingoing movement by an inward movement of the driving means 29 and by the spring force of the springs 81, after which a next tool 14 or 15 can be brought up to the second driving means 29 by rotation of the ring-shaped second body 8 with the first driving means 28.

In some embodiments, the tools 14, 15, etc. are mounted at a regular distance from each other on the cylindrical or ring-shaped second body 8, whereby consecutive tools 14, 15, etc. make a fixed angle $\alpha_0$ relative to each other and the first driving means 28 are controlled in such a way that they always rotate the second body 8 over a fixed angle $\alpha_0$ or a plurality thereof into a position whereby a tool 14, 15, etc. comes to stand directly opposite the second driving means 29.

In FIGS. 37 to 41 yet another embodiment of a mechanism 1 according to the present disclosure is shown.

This mechanism 1 is again provided with a first body 2 which is supported by a support section 3 that comprises two pairs 70 and 71 of support wheels 3 which are rotatable around a central shaft AA' and a central shaft PP' respectively and whereby the support points 72 to 75 of the support wheels 3 on a surface 4 determine a bearing surface S-S'-S" of the mechanism 1a.

Another similarity with the previous embodiment of a mechanism 1 according to the present disclosure is that again there is no assembly 48 of moving elements with two degrees of freedom for controlling tools 14 and 15, but again only a second body 8 is provided in the first body 2.

This second body 8 of the mechanism 1 is not rotatably suspended in the first body 2 in this embodiment, but is movable reciprocatingly (or up and down) according to a linear direction in the first body 2 of the mechanism 1, and more specifically in a direction AA' parallel to the bearing surface S-S'-S".

The second body 8 is movable reciprocatingly in the first body 2 using first driving means 28 which in this example are again formed by an electric motor (which is provided on the first body 2 and which is not shown in the figures), which drives gearwheels 55 which engage on a toothing 56 of a gear rack 57 that is part of the second body 8.

In this example the second body 8 is beam-shaped, but this need not be the case, and it is suspended on pins 53 which extend from the first body 2 through oblong slots 54 in the gear rack(s) 57 of the second body 8.

Yet another similarity with the previous embodiment of FIGS. 35 and 36 is that the tools 14 and 15 are movable up and down or reciprocatingly in the second body 8 according to a direction μμ' perpendicular to the direction AA' and to this end are mounted in passages 79 which are provided in the second body 8.

The tools 14 and 15 are cushioned in the second body 8 using springs 81 to bring or hold them in a retracted position in the second body 8, at a distance v from the bearing surface S-S'-S".

The second driving means 29 are again linear driving means, for example in the form of a cylinder-piston system which is attached to the first body 2, and the second driving means 29 are located in the bisection plane GG' which is transverse to the bearing surface SS'S" and is located in the middle between the central shafts AA' and PP' of the pairs 70 and 71 of support wheels 3.

These second driving means 29 can push each of the tools 14 or 15 outwardly out of the relevant passage 79 in a direction μμ' perpendicular to the bearing surface SS'S" against the spring force of the springs 81.

Figure 37:
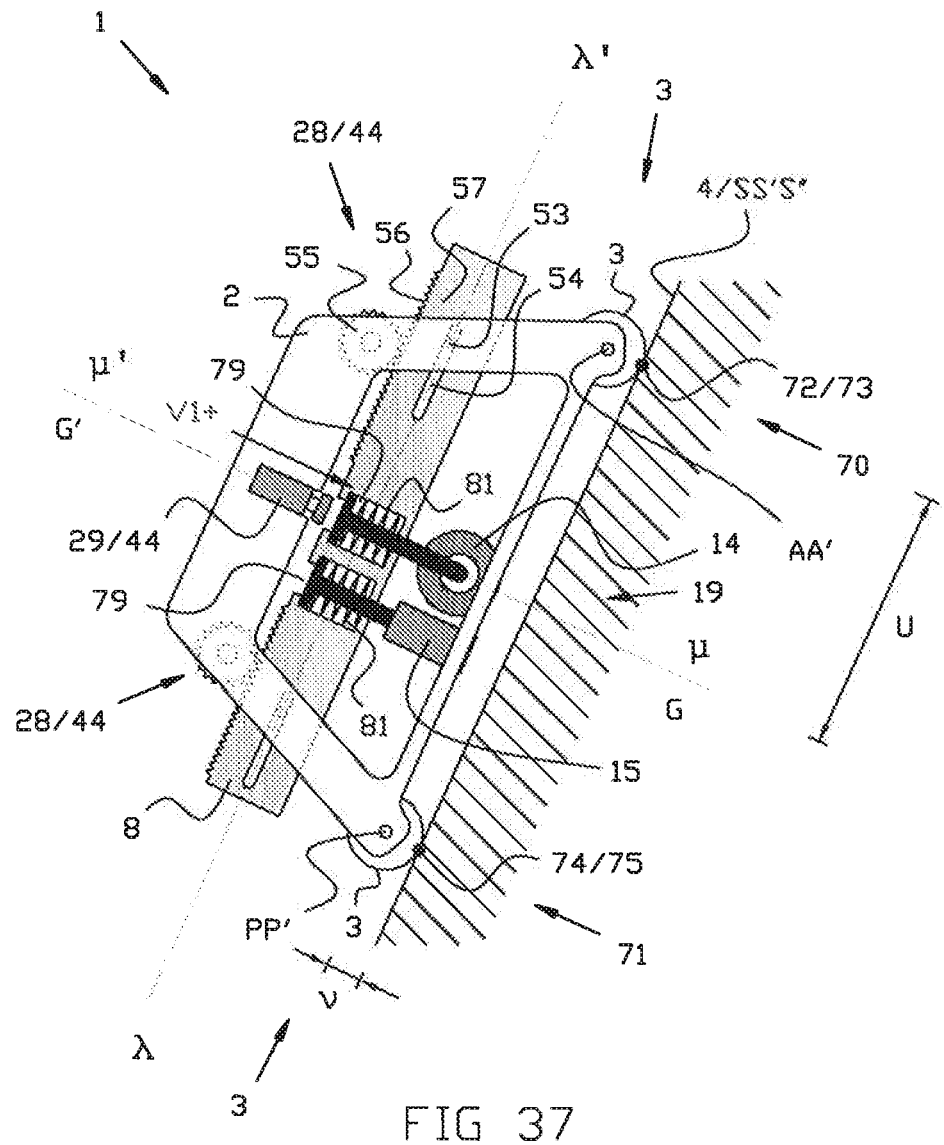
FIG. 37 schematically shows a side view of another embodiment of a mechanism according to the present disclosure in a position.

In FIG. 37 all the tools 14 and 15 of the mechanism are in a retracted position.

Hereby, the first tool 14 is located in a passage 79 which is directly opposite the second driving means 29 through a correct positioning of the second body 8 with the first driving means 28.

In a first step the second driving means 29 push the first tool outward out of the passage 79 according to the arrow V1+ into an operational position whereby the tangent plane D-D'-D" on the cylindrical machining surface 18 of the tool 14 is brought adjoiningly against the surface or wall 4.

Figure 38:
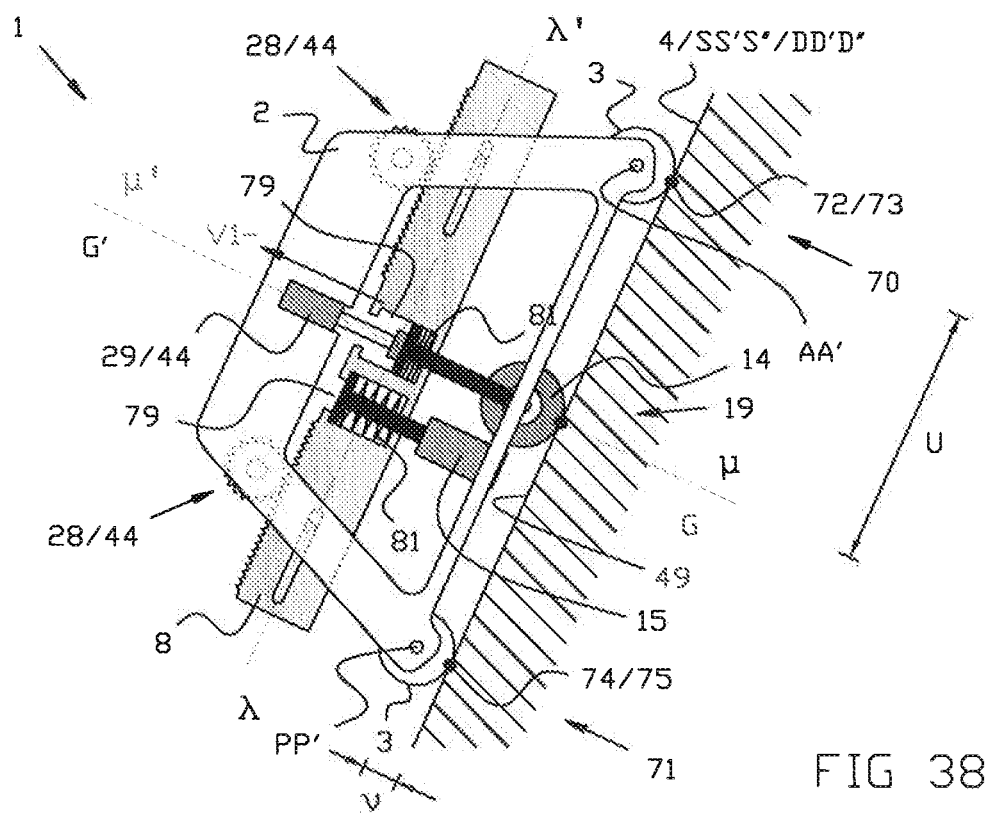
FIG. 38 schematically shows a side view of another embodiment of a mechanism according to the present disclosure in another position.

This position is shown in FIG. 38 and the first tool 14 is thus centred on a surface section 19 at some distance U from the pair 70 of support wheels 3 and can perform a sanding or grinding operation on the surface section 19.

Figure 39:
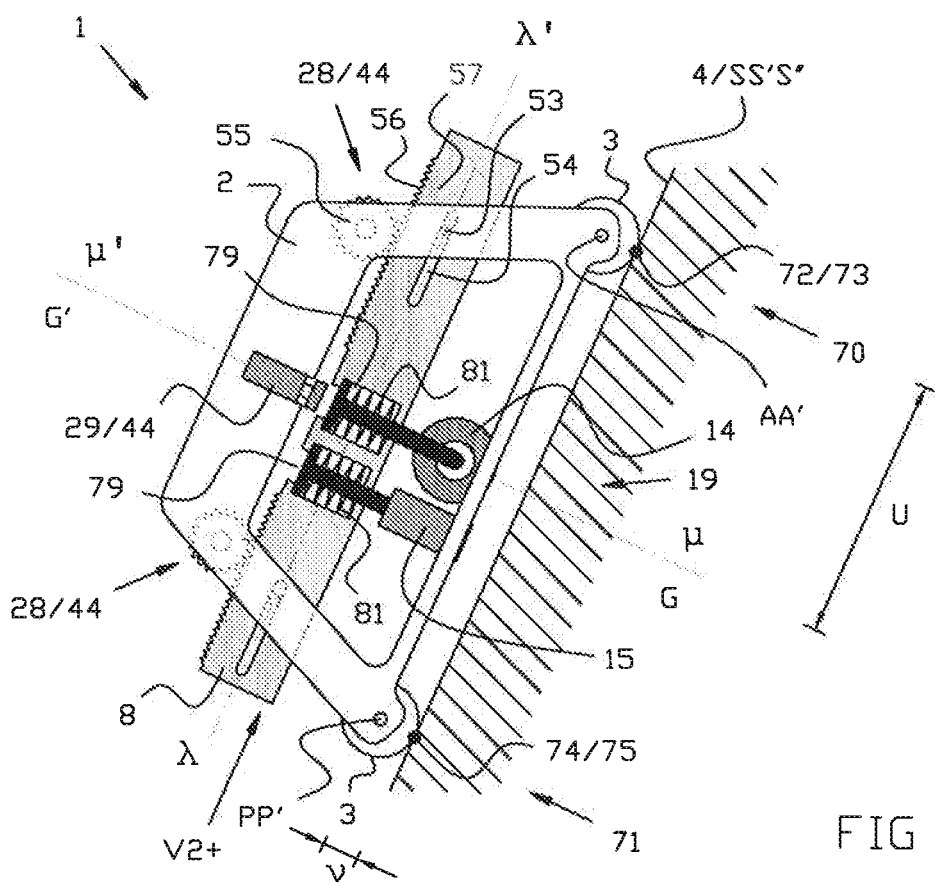
FIG. 39 schematically shows a side view of another embodiment of a mechanism according to the present disclosure in another position.

When the second driving means 29 move back inwards and the springs 81 push the tool 14 back inwards in a reverse movement according to the arrow V1−, the initial condition is obtained again, which is shown in FIG. 39.

For switching the tools 14 and 15, the second body 8 is moved using the first driving means 28 over a linear distance according to the distance between the passages 79, which is indicated in FIG. 39 with the arrow V2+, such that the second tool 15 is now centred on the bisection plane GG' and comes to lie directly opposite the second driving means 29.

Figure 40:
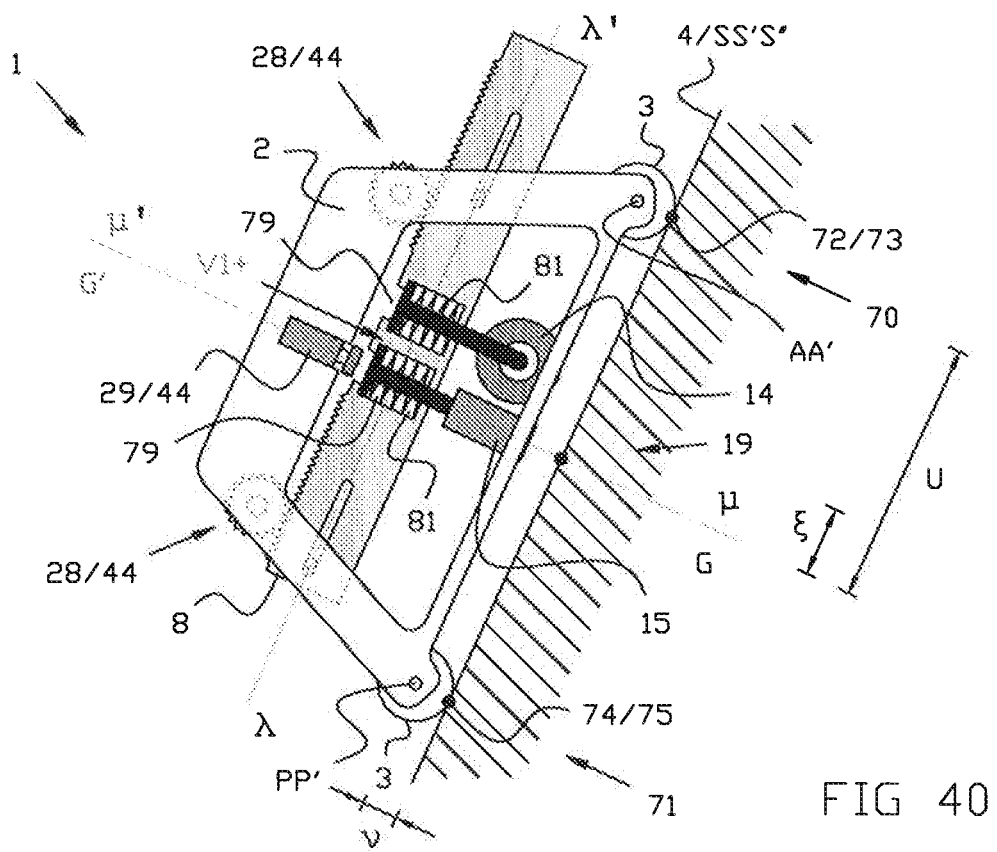
FIG. 40 schematically shows a side view of another embodiment of a mechanism according to the present disclosure in another position.
Figure 41:
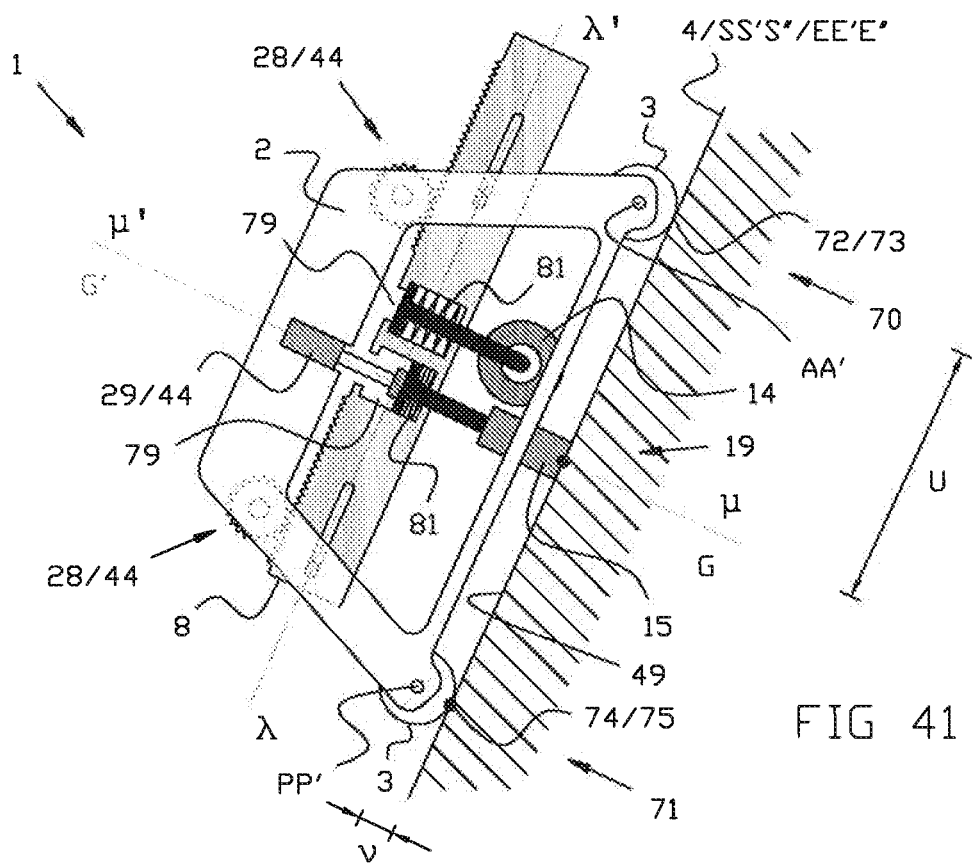
FIG. 41 schematically shows a side view of another embodiment of a mechanism according to the present disclosure in another position.

This is shown in FIG. 40.

Finally, the second tool 15 is brought against the surface or wall 4 by an outward movement according to the arrow V1+ using the second driving means 28, such that its extended operating surface 49 comes to lie adjoiningly against the surface or wall 4 for performing a measurement.

In some embodiments, several tools 14, 15, etc. can be provided on the second body 8 which are mounted at a regular distance ξ from each other on the beam-shaped second body 8, whereby consecutive tools 14, 15, etc. are mutually located at a fixed distance ξ relative to each other.

In some embodiments, the mechanism 1 is hereby provided with control means which control the first driving means 28 such that the second body 8 each time moves over the fixed distance ξ or a plurality thereof into a position whereby a tool 14, 15, etc. comes to be directly opposite the second driving means 29.

Some general principles of a mechanism 1 in accordance with the present disclosure can furthermore be described as follows:

A mechanism 1 in accordance with the present disclosure can be such that the control means control the driving means 44 such that the tools 14, 15 or 45-47 are alternately brought with their extended operating surface 49 in the bearing surface S-S'-S" of the mechanism 1 to operate thereon, more specifically by moving the second body 8 with the first driving means 28 from a condition in which all tools 14, 15 or 45-47 are in the retracted position into a position whereby a tool 14, 15 or 45-47 comes to be directly opposite the second driving means 29 and by pushing the relevant tool 14, 15 or 45-47 with the second driving means 29 via an outward movement from the retracted position into an operational position in the direction μμ' or $\rho_1\rho_1$' of the bearing surface S-S'-S" for performing the relevant operation and thereafter bringing the relevant tool 14, 15 or 45-47 via a reverse inward movement back in the retracted position.

A mechanism 1 in accordance with the present disclosure can be such that the second body 8 is cylindrical or ring shaped and is rotatably mounted in the first body 2 around a central shaft σσ' which is parallel to the bearing surface S-S'-S" of the mechanism (1) and is located in the bisection plane GG' between the two central shafts AA' and PP' of the support wheels 3, whereby the first driving means 28 drive the second body 8 for a rotation $\alpha_0$ around the central shaft σσ', and whereby the tools 14, 15 or 45-47 are movable reciprocatingly in the second body 8 according to a radial direction $\rho_1\rho_1$', $\rho_2\rho_2$', etc. from the central shaft σσ', whereby a tangent plane D-D'-D" or E-E'-E" on the machining surface 18 or measuring surface 22 of every tool 14, 15 or 45-47 in the retracted position is tangent to a cylindrical body of revolution 80 which as its central shaft also has the aforementioned central shaft σσ' and whereby the radius τ of the cylindrical body of revolution 80 is less than the distance κ from the central shaft σσ' up to the bearing surface S-S'-S".

A mechanism 1 in accordance with the present disclosure can be such that the driving means 44 comprise first driving means 28 and second driving means 29 respectively for moving the second body 8 relative to the first body 2 and for moving the third body 10 relative to the second body 8 or the first body 2 or for directly driving tools 14, 15 or 45-47, whereby the first driving means 28 and second driving means 29 comprise at least one of the following elements:

a linear driving means with a movable section that can move over a certain maximum length $Lmax_1$ or $Lmax_2$ between a fully retracted position and a fully extended position;

a rotating driving means that can rotate the relevant driven sections over an angle β relative to each other into a random position between a minimum angle position $\beta_{min}$ and a maximum angle position $\beta_{max}$;
a pneumatic or hydraulic cylinder;
an electric linear motor;
an electric rotating motor;
an ironless linear motor; and/or,
a stepper motor.

A mechanism 1 in accordance with the present disclosure can be such that a tool 15 is one of the following implements or measuring instruments:
a spectroscope;
a camera;
a multi-spectral camera;
a paint thickness meter;
a light;
a microscope; or,
a photographic device.

The present disclosure is not limited to the embodiments of a mechanism 1 and a device 35 according to the present disclosure described by way of example and illustrated with reference to the figures, but such mechanism 1 and device 35 can be realised in all sorts of other ways without departing from the scope of the present disclosure.

The invention claimed is:

1. A mechanism for positioning two or several tools, for example in the form of an implement or a measuring instrument, on a wall or surface, the mechanism comprises:
a first body comprising a support section with which the mechanism can support and/or drive on a surface or wall;
at least two tools, which each have a machining surface or a measuring surface, which are movably arranged relative to the first body and the support section; and
driving means for moving the at least two tools relative to the support section and the first body;
wherein the at least two tools are movably arranged relative to the first body and the support section in such a way that a movement of the at least two tools relative to the support section, allows a tangent plane on the relevant machining surface or the relevant measuring surface, hereafter referred to as the extended operating surface of the at least two tools, to be brought adjoiningly against the wall or surface against which the mechanism is supported;
the mechanism further comprising:
control means for controlling the driving means and the at least two tools, which are such that, when the mechanism is supported with the support section in a fixed position on the wall or surface, by the driving means, at the at least two tools of the mechanism are or can be brought alternately with the aforementioned tangent plane on their relevant machining surface or their relevant measuring surface, adjoiningly against the wall or surface against which the mechanism is supported, whereby the relevant tools are alternately centered on a same surface section of the wall or surface which is located at a fixed distance of the support section and whereby the at least two tools operate or can operate alternately on the surface section.

2. The mechanism according to claim 1, wherein the at least two tools are movably arranged relative to the first body using an assembly of movable elements which has at least two degrees of freedom and whereby the driving means have at least two degrees of freedom for driving the movable elements.

3. The mechanism according to claim 1, wherein the support section of the first body takes on one of the following forms:
a) the support section comprises at least one support wheel which is rotatably mounted around a central shaft in the first body;
b) the support section comprises a pair of support wheels which are rotatably mounted around a central shaft in the first body;
c) the support section comprises a first pair of support wheels and an additional support wheel;
d) the support section comprises two pairs of support wheels which are rotatably mounted at a distance from each other on the first body;
e) the support section is formed by a sole or foot which is fixedly or mounted movably on the first section; or,
f) the support section is formed by a section with a support or support point.

4. The mechanism according to claim 1, wherein the mechanism comprises a second body which is movable relative to the first body and whereby the driving means comprise first driving means for moving the second body relative to the first body.

5. The mechanism according to claim 4, wherein the second body of the mechanism is rotatably attached around a shaft in the first body.

6. The mechanism according to claim 3, wherein the second body of the mechanism is rotatable around the central shaft of the at least one support wheel.

7. The mechanism according to claim 4, wherein the second body of the mechanism is movable up and down or reciprocatingly according to a linear direction in the first body of the mechanism.

8. The mechanism according to claim 4, wherein that the at least two tools of the mechanism are mounted movably reciprocatingly or up and down in the second body of the mechanism and whereby the at least two tools are directly moved by second driving means.

9. The mechanism according to claim 4, wherein the mechanism comprises a third body which is movable relative to the first body and whereby the driving means comprise a second driving means for moving the third body relative to the first body.

10. The mechanism according to claim 9, wherein at least one tool is fixedly mounted on the third body.

11. The mechanism according to claim 10, wherein the third body is mounted movably on the second body, such that the relevant at least one tool can be oriented or positioned relative to the first body by a combination of the movements of the second body and the third body and whereby the second driving means move the third body relative to the second body and thus indirectly also relative to the first body.

12. The mechanism according to claim 10, wherein the at least two tools of the mechanism are fixedly mounted on the third body, such that each relevant tool can be oriented or positioned relative to the first body by a combination of the movements of the second body and the third body and whereby the second driving means move the third body relative to the second body and thus indirectly also relative to the first body.

13. The mechanism according to claim 9, wherein the third body is rotatably attached around a rotation shaft to the second body.

14. The mechanism according claim 9, wherein the third body is movably attached up and down or reciprocatingly to the second body.

15. The mechanism according claim 9, wherein the at least two tools of the mechanism are mounted movably reciprocatingly or up and down in the third body of the mechanism.

16. The mechanism according to claim 4, wherein at least one tool is fixedly mounted on the second body, such that it can only be oriented or positioned by movement of the second body.

17. The mechanism according to claim 3, wherein a tangent plane on the relevant machining surface or the relevant measuring surface of the aforementioned at least one tool is tangent to the at least one support wheel of the mechanism, whereby the tangent plane is hereafter referred to as the extended operating surface of the relevant tool.

18. The mechanism according to claim 17, wherein the third body is directly but movably connected to the first body, whereby a second tool which is fixedly mounted on the third body can only be oriented or positioned relative to the first body by movement of the third body and whereby the second driving means directly move the third body relative to the first body.

19. The mechanism according to claim 3, wherein a first tool is fixedly mounted on the second body and a second tool is fixedly provided on the third body, whereby a rotation of the third body relative to the second body can move the second tool between a retracted position and an operational position, whereby in the retracted position of the second tool the extended operating surface of the first tool can be brought, without obstruction, adjoiningly against the wall or surface and whereby in an operational position of the second tool a tangent plane on the measuring surface or machining surface of the second tool, referred to as the extended operating surface of the second tool, extends tangentially to the at least one support wheel.

20. The mechanism according to claim 6, wherein a first tool is fixedly provided on the second body and the second tool is fixedly provided on the third body, whereby a tangent plane on the machining surface or measuring surface of the first tool is tangent to the first pair of support wheels of the mechanism, whereby the tangent plane, hereafter is referred to as the extended operating surface of the first tool, whereby a tangent plane on the machining surface or measuring surface of the second tool is tangent to the additional support wheel or the second pair of support wheels of the mechanism, whereby the tangent plane, hereafter is referred to as the extended operating surface of the second tool and whereby the first driving means and the second driving means are controlled by the control means for a rotation of the second body or the third body respectively relative to the first body, such that the extended operating surface of the first tool and the extended operating surface of the second tool are alternately rotated into the bearing surface of the mechanism.

* * * * *